US008392395B2

(12) United States Patent
Goldman et al.

(10) Patent No.: US 8,392,395 B2
(45) Date of Patent: Mar. 5, 2013

(54) DETERMINING ADVERTISING PLACEMENT ON PREPROCESSED CONTENT

(75) Inventors: Neal Goldman, New York City, NY (US); Joseph Einhorn, New York City, NY (US)

(73) Assignee: News Distribution Network, Inc., Atlanta, GA (US)

( * ) Notice: Subject to any disclaimer, the term of this patent is extended or adjusted under 35 U.S.C. 154(b) by 12 days.

(21) Appl. No.: 12/875,976

(22) Filed: Sep. 3, 2010

(65) Prior Publication Data
US 2011/0112903 A1 May 12, 2011

Related U.S. Application Data

(63) Continuation of application No. 11/619,164, filed on Jan. 2, 2007, now abandoned, which is a continuation-in-part of application No. 11/151,115, filed on Jun. 13, 2005, now Pat. No. 7,451,135.

(51) Int. Cl.
*G06F 7/00* (2006.01)
(52) U.S. Cl. .......................... 707/706; 707/708; 707/748
(58) Field of Classification Search .................. 707/706, 707/708, 748
See application file for complete search history.

(56) References Cited

U.S. PATENT DOCUMENTS

| 5,418,951 | A | 5/1995 | Damashek |
| 5,740,549 | A | 4/1998 | Reilly et al. |
| 5,768,528 | A | 6/1998 | Stumm |
| 6,651,253 | B2 | 11/2003 | Dudkiewicz et al. |
| 6,839,742 | B1 | 1/2005 | Dyer et al. |
| 7,031,961 | B2 | 4/2006 | Pitkow et al. |
| 7,089,229 | B2 | 8/2006 | Goldman et al. |
| 7,136,845 | B2 | 11/2006 | Chandrasekar et al. |
| 7,716,161 | B2 | 5/2010 | Dean et al. |
| 2002/0016786 | A1 | 2/2002 | Pitkow et al. |
| 2002/0052894 | A1 | 5/2002 | Bourdoncle et al. |
| 2003/0225745 | A1 | 12/2003 | Goldman et al. |
| 2004/0093327 | A1 | 5/2004 | Anderson et al. |
| 2005/0114324 | A1 | 5/2005 | Mayer |
| 2005/0177805 | A1 | 8/2005 | Lynch et al. |
| 2005/0222987 | A1 | 10/2005 | Vadon |
| 2005/0240550 | A1 | 10/2005 | Armes et al. |
| 2006/0020596 | A1 * | 1/2006 | Liu et al. ............................ 707/6 |
| 2006/0106792 | A1 | 5/2006 | Patterson |
| 2006/0122991 | A1 | 6/2006 | Chandrasekar et al. |
| 2006/0279799 | A1 | 12/2006 | Goldman |
| 2007/0150457 | A1 | 6/2007 | Goldman et al. |
| 2007/0150468 | A1 | 6/2007 | Goldman et al. |
| 2007/0150483 | A1 | 6/2007 | Goldman et al. |
| 2007/0150721 | A1 | 6/2007 | Goldman et al. |

(Continued)

OTHER PUBLICATIONS

"As I May Think ... Publish/Subscribe: Untapped paid-search opportunity" http://bobwyman.pubsub.com/main/2004/02/publishsubscrib.html, Feb. 20, 2004, last viewed Jul. 17, 2006, 3 pages.

(Continued)

*Primary Examiner* — Cindy Nguyen
(74) *Attorney, Agent, or Firm* — Jason A. Bernstein; Barnes & Thornburg LLP

(57) ABSTRACT

Relationships are determined by disambiguation for preprocessing content. A first canonical identifier associated with a first element that can be represented in content in a plurality of forms is defined. A second canonical identifier associated with a second element that can be represented in content in a plurality of forms is defined. A first content available over a network is retrieved. An entity name element associated with the first content is identified. The entity name element being able to represent the first element and the second element. The entity name element is associated with the first element or the second element based on context associated with the first content.

17 Claims, 30 Drawing Sheets

U.S. PATENT DOCUMENTS

2007/0162396 A1      7/2007    Goldman et al.

OTHER PUBLICATIONS

"Chase Norlin, Founder, Pixsy.com at Under the Radar," Hot from Silicon Valley, Jun. 7, 2006, 2 pages.

Franklin, C. "How Internet Search Engines Work," http://computer.howstuffworks.com/search-engine.htm/printable, last viewed Jul. 17, 2006, 6 pages.

Google Guide, www.googleguide.com, Jun. 2004, 7 pages.

Haav, H-M. et al. "A Survey of Concept-based Information Retrieval Tools on the Web," Institute of Cybernetics at Tallinn Technical University, undated, 11 pages.

Jensen, Mallory, A Brief History of Weblogs, Columbia Journalism Review, Sep. 2003, 3 pages.

Klapaftis, I., et al. "Google & WordNet based Word Sense Disambiguation," Department of Computer Science, The University of York, undated, 5 pages.

Luckhardt, H-D, "Approaches to sense disambiguation with respect to automatic indexing and machine translation," Virtuelles Handbuch Informationswissenschaft, 2006, 12 pages.

McCord, M. "Word Sense Disambiguation in a Slot Grammar Framework," Published in RC 23397 in 2004, 2 pages.

Murray, R. "The Symbiotic Relationship Between SEO and PPC," MediaPost's SearchInsider, The Inside Line on Search Marketing, Aug. 10, 2005, 3 pages.

Oard, D.W. "SIGIR-97 Tutorial. Cross-Language Information Retrieval," College of Library and Information Services, Jul. 27, 1997, 73 pages.

Peterson, E., "Contextual Adverts in Bloglines in 2005," http://www.readwriteweb.com/archives/contextual_adve.php, Dec. 21, 2004, 3 pages.

Pratt, W.M. "Dynamic Categorization: A Method for Decreasing Information Overload," Stanford University, Mar. 1999, 193 pages.

Sheth, A., et al. "Semantic Content Management for Enterprises and the Web," Semantic Content Management for Enterprises and the Web, undated, 19 pages.

Takeuchi, K., et al. "Building Disambiguation System for Compound Noun Analysis Based on Lexical Conceptual Structure," National Institute of Informatics (NII), undated, 8 pages.

U.S. Patent and Trademark Office Action dated Oct. 7, 2008 for U.S. Appl. No. 11/619,154.

U.S. Patent and Trademark Office Action dated Oct. 15, 2008 for U.S. Appl. No. 11/619,156.

U.S. Patent and Trademark Office Action dated Oct. 20, 2008 for U.S. Appl. No. 11/619,165.

Amendment and Responses to Office Action dated May 28, 2009 for U.S. Appl. No. 11/619,156.

Amendment and Responses to Office Action dated Oct. 15, 2009 for U.S. Appl. No. 11/619,156.

Amendment and Responses to Office Action dated Oct. 7, 2008 for U.S. Appl. No. 11/619,154.

Amendment and Responses to Office Action dated Oct. 20, 2008 for U.S. Appl. No. 11/619,165.

U.S. Patent and Trademark Office Action dated Mar. 2, 2010 for U.S. Appl. No. 11/619,158.

U.S. Patent and Trademark Office Action dated Sep. 14, 2009 for U.S. Appl. No. 11/619,156.

U.S. Patent and Trademark Office Action dated Mar. 5, 2010 for U.S. Appl. No. 11/619,164.

U.S. Patent and Trademark Office Action dated May 27, 2009 for U.S. Appl. No. 11/619,154.

http://www.google.com/search?sourceid=navclient&ie=UTF-8&rls=GGLD,GGLD:2004-3...02/18/2010.

http://www.google.com/search?sourceid=navclient&ie=UTF-8&Q=SIMILAR+PAGES+FEATURES+GOOGLE(1 of 3) Oct. 8, 2008 11:38:50AM.

http://web.archive.org/web/20040604062311/http://www.google.html(1 of 3) Oct. 8, 2008 3:57:50PM.

\* cited by examiner

| CategoryID | CategoryName | IsInteresting |
|---|---|---|
| 1 | CITY | 1 |
| 2 | COMPANY | 1 |
| 3 | COUNTRY | 1 |
| 4 | ORGANIZATION | 1 |
| 5 | PERSON | 1 |
| 7 | PLACE_OTHER | 1 |
| 8 | PLACE_POLIT | 1 |
| 9 | PLACE_REGION | 1 |
| 11 | STATE | 1 |
| 13 | PRODUCT | 1 |
| 14 | GN_REGION | 1 |
| 15 | ATTRACTION | 1 |
| 16 | COUNTY | 1 |

3:Data in Table 'CanonicalFinal' in 'TextProcessor' on 'DEVE...'

| CanonicalID | Name | CategoryID |
|---|---|---|
| 143801 | American Express Financial Corporation | 2 |

— 130

2:Data in Table 'Variant' in 'TextProcessor' on 'DEVEL...'

| ID | VariantName | CanonicalID |
|---|---|---|
| 100556 | American Express Centurion Bank | 143801 |
| 100555 | American Express Financial Services | 143801 |
| 100557 | American Express Publishing Corporation | 143801 |
| 100558 | American Express Tax and Business Services Inc. | 143801 |

Business News - Microsoft Internet Explorer

File  Edit  View  Favorites  Tools  Help

← Back ▾ → ▾  ⊗  🗋  🏠  🔍 Search  ★ Favorites  ⊗  🗋  🗋  🗋  🗋  🗋

Address: http://www.inform.com/Business

| Sources | Lead Business Story | Blogs |
|---|---|---|
| Thousands of your favorite news sources, all their content, simply organized. [+ADD] | Stocks fall after weak manufacturing data 🏴 Reuters🗋 + My News🗋 | CNN Reporter: Corporations, GOP Conspire to Keep Wages Low 🏴 NewsBusters 🗋 + MY News🗋 : 10/31/2006 related: stories subjects🗋 email🗋:iflag🗋 : |
| Subjects [+ADD] Track subjects with unparalleled precision from news across the web. | U.S. markets fell on Wednesday after a report showed manufacturing growth slowed to a near standstill, raising concerns the economy won't grow at a pace strong enough to support robust corporate profits. related: stories subject 🗋 email🗋:iflag🗋 : | NYMEX IPO That Much Closer 🏴 24/7 Wall St. + MYNews🗋 : 10/31/2006 related: stories subjects🗋 :iflag🗋 : |
| Feeds [+ADD] Add any RSS feed. | Garmin Reports Record Third Quarter; Revises Annual Guidance ← 350 Upward🗋 | USA Today Hypes Inflation, Downplays Wage Growth🏴 NewsBusters + MY News🗋 :3 Hours Ago |

Continuing Coverage
- North Korea Missile Test
- Natural Disasters
- War in Iraq
- School Shootings
- Iran Nuclear Standoff
- The NFL
- U.N. Security Council Activities
- The World Series
- College Football
- Stars in the News

Popular Subjects
- United Nations
- Saddam Hussein
- Microsoft Corporation
- Yahoo! Inc.
- Google Inc.
- Donald H. Rumsfeld
- Dick Cheney
- U.S. Republican Party
- Microsoft Office
- Valium Topics: Business, Marketing, Product Management, Product Launches, Company Activities and Information, Corporate Reporting, Earnings and Losses, Earnings and Loss Announcements, Corporate Accounting, Corporate Accounting Standards, Culture and Lifestyle, Holidays, Financial Markets, Stock Activity, Dividends, Public Finance, Taxes, Income Taxes, SEC Filings, Stock Splits, Media, Advertising, Knowledge Management, Currency Markets Industries: Professional Services Sector, Accounting and Payroll Services, Investment Services, Securities and Commodity Services, Electronics Sector, Navigation and Search Device Manufacturing Places: United States, Taiwan, Europe, Asia, North America, Cayman Islands, United Kingdom Organizations: Garmin Ltd., Sears, Roebuck and Co., PR Newswire Association LLC, U.S. Securities and Exchange Commission, Garmin Board of Directors People: Fevin Rauckman, Min H Kao

---

340

Free Writing Contest
Work with other teen fans for a chance to get your work published.
www.harperteenfanlit...

Best Movies and Music at Overstock.com
Always just $2.95 shipping! Every order, every day!
www.overstock.com PeoplePC Internet Access 50% Off Special
Get the 1st 3 mos 1/2 price at only $5.47/mo and surf up to 5X faster
www.peoplepc.com

Related Content About:
Time Warner's Quarterly Profit Nearly Triples ~730
Time Warner Inc.'s profit jumped nearly threefold over the last three months as the company sold off assets, benefited from rapid growth in its cable television operations and saw the glimmer of a turnaround at its troubled AOL subsidiary.
- Howard Schneider and Sara Kehaulani Goo RELATED TOPICS: ~734
- Telecommunications Sector
- Cable TV System Operators
- Cable and Satellite Broadcasting
- Cable Networks
- Television
- Media
- Advertising
- Mergers and Acquisitions
- Company Activities and Information
- Business RELATED ENTITIES ~738
- Telecommunications Sector
- Cable TV System Operators
- Cable and Satellite Broadcasting
- Cable Networks
- Television
- Media
- Advertising
- Mergers and Acquisitions
- Company Activities and Information
- Business powered by inform
E-mail This Page Ads by Google
Free Credit Score RELATED ARTICLES ON THE WEB ~742
- Comcast SportsNet (Sacramento Business Journal)
- Is it Time for Time Warner? (Motley Fool)
- Time Warner customers say e-mail problems persist (Dallas Morning News)
- AOL loses another 2.5M subscribers (MSN Money)
- In TV Distribution Bout, It's A Draw (MediaPost Publications)
- DreamWorks soars as media shares head lower (WallSt.net)
- Time Warner Cable Business Class gets stamp of approval (BizJournals)
- Comcast report rising profits (FOX 7 Miami - WSVN)
- Disney close to cable program deals: report (Washington Post)
- Time Warner Telecom completes Xspedius acquisition (BizJournals)

RELATED BLOGS ~746
- Comcast 1, Verizon 0 (CMCSA)(T)(VZ)(BLS) (24/7 Wall St.)
- Comcast 1, Verizon 0 (24/7 Wall St.)
- Cramer: Verizon is Back from the Dead (24/7 Wall St.)
- Comcast launches FEARnet on Halloween (TV Squad)

RELATED VIDEO ~750
No Results

RELATED AUDIO ~754
No Results

© 2006 The Washington Post Company

THE CHARLIE ROSE
SCIENCE SERIES

BEGINNING OCTOBER 31ST

Pfizer

FEATURED ADVERTISER LINKS

Refinance Rates As Low As 2.9% - FREE QUOTES!
$200,000 loan for $917/mo. Bad credit OK
Redskins Tickets, Wizards Tickets, Capitals Tickets
Lockwood MT, Vioxx, Mesothelioma, Vapor Intrusion
Promotional Pens, T-shirts, Custom Hats
Cool Gadgets, Great Deals, Visit CircuitCity.com
Investing basics for beginners Free Online
BLAST AWAY HIGH CHOLESTEROL: Lose 67 Points in 28 days. No Drugs. No Side effects.
Travel downtown to downtown only on Acela.

DETERMINING ADVERTISING PLACEMENT ON PREPROCESSED CONTENT

CROSS REFERENCES TO RELATED APPLICATIONS

This application is a continuation of, claims the benefit of, and priority to U.S. patent application Ser. No. 11/619,164, filed on Jan. 2, 2007 titled, "Disambiguation for Preprocessing Content to Determine Relationships", which is a continuation-in-part of, claims the benefit of, and priority to U.S. patent application Ser. No. 11/151,115, filed on Jun. 13, 2005, titled "System and Method for Retrieving and Displaying Information Relating to Electronic Documents Available from an Information Network", the disclosure of which is hereby incorporated herein by reference. This application also relates to four co-pending applications identified by entitled "A Network Service for Providing Related Content," U.S. patent application Ser. No. 11/619,514; entitled "Preprocessing Content to Determine Relationships," U.S. patent application Ser. No. 11/619,516; entitled "Determining Advertising Placement on Preprocessed Content," U.S. patent application Ser. No. 11/619,158; and entitled "Enabling One-Click Searching Based on Elements Related to Displayed Content," U.S. patent application Ser. No. 11/619,615, the disclosure of each is hereby incorporated herein by reference and all of which are assigned to the same entity.

TECHNOLOGICAL FIELD

The present invention relates to information technology. More particularly, the present invention relates to retrieving, organizing and displaying information relating to electronic documents available on a network

BACKGROUND

Current "on line" informational sources, such as on line newspapers and magazines, do not provide a user an easy means to navigate through a mass of information and quickly view a particular item of interest. Further, these sites typically only display the item of interest, and do not provide secondary material that may be related to the item of interest and which the user may be interested in also viewing. For example, if a user wishes to read a particular article, the user "clicks" on the article and only the article is displayed. However, if the user would like to find articles or related information on one aspect of an article, or read additional articles on the same subject, the user typically must type a keyword into a search engine located at the site, which produces a list of articles having the keyword. This is a tedious task, and often requires the user to sift through a long list of articles to determine relevancy.

Another disadvantage of conventional on line publications is that, in order for a user to read an entire publication or sections of a particular publication, the user must select an article and, after finished reading the article, click the back button and select another article. This two click function, if spread across a large volume of reading, is time consuming, particularly because it requires the loading of multiple pages before an entire section or publication can be read. Also, if a user wishes to read multiple publications, the user must access multiple websites, which is also time consuming. Additionally, each websites uses a different navigation method, and such inconsistency between websites is an impediment to reading large volumes of material quickly.

Further, tracking a particular interest is difficult to do online, and typically requires a keyword search. Websites offering a tracking feature typically send material on a particular subject to a user's e-mail, thereby often loading the user's inbox with large volumes of information.

Conventional products which attempt to address the above-mentioned disadvantages include RSS feeders and PDF readers. However, the content of RSS feeders depends on what the publisher chooses to put in the feed, and is typically incomplete. Also, such feeders do not allow a user to track interests or to simply conduct a search relating to elements mentioned in a news article. PDF readers require large file downloads and result in images which are often difficult to read because the size of the screen is typically different from the original publication.

Any problems or poor experiences encountered by a user become the same problems and issues for publishers, or more generally content providers, that provide on line newspapers and magazines. These content providers want a positive user experience, by providing web pages that make finding related content easy for the user and make the navigation experience easy and successful (e.g., find content of interest). These content providers want to provide their users an easier and richer experience so that the users will keep returning back to their sites. To create a system that provides such an experience, the content provider has to identify talent within its organization capable of developing the technology to provide this user experience. The content provider also needs to invest in developing its technology and infrastructure to handle these issues and has to deal with storing an ever increasing amount of content and related content available throughout the Internet.

SUMMARY

The techniques described herein provide, among other things, a service over a network (e.g., web services) that enables content providers to provide an easy and successful user experience without having to develop or maintain the complete infrastructure themselves. Advantageously, the content provider simply provides certain parameters to the service to obtain information to enrich their web pages. For example, through the use of the described services, the content provider obtains information about content related to a piece of content (e.g., a text article) that the content provider displays. This enables the content provider to display the related content (or links to the related content), which may be from the content provider's web pages, from the content provider's affiliate's web pages, and/or from other unrelated content provider's web pages. With this information received from the described web service, the content provider can enrich its displayed page with related content, advantageously resulting in a positive user experience and viewers returning in subsequent visits, all of which engender long-term loyalty. Such return viewers and increases in new viewers, due to ease of use and success in finding content in which the user has high interest, enable the content provider to have increased page views and potential for higher advertising revenues. Another advantage is that as multiple publishers use the described services, the experience for the user can become more consistent across any of the unrelated content provider's websites that use the services.

An aspect of the present invention provides a system and method for displaying information regarding electronic documents available from a variety of online sources, such as online newspapers and magazines, in an ordered format.

Another aspect of the present invention provides a system and method for users to conduct research on a topic of interest mentioned in an electronic document by providing access to other electronic documents and online resources that are related to the topic of interest.

Another aspect of the present invention provides a system and method for users to keep track of a topic of interest on an ongoing basis by providing the user the ability to define which type of electronic documents to be displayed.

Other objects and advantages of the present invention will become apparent from the following description.

One approach is retrieving and displaying information relating to electronic documents available from an informational network. In one aspect, there is a method for retrieving and displaying information relating to a plurality of electronic documents available from an informational network according to an exemplary embodiment of the invention including the steps of: retrieving information relating to location of each of the plurality of documents available on the informational network; identifying a plurality of elements in each of the plurality of documents, each of the plurality of elements being assigned to a descriptive category selected from a list of descriptive categories; applying a score to each of the plurality of elements in each of the plurality of documents based on relevance of each of the elements to its corresponding document; displaying at least one of the plurality of documents using the retrieved information relating to the location of the plurality of documents on the informational network; for each descriptive category, displaying a list of elements selected from the displayed document that have a score above a predetermined score; and for each element in each of the list of elements, providing a network link to a list of documents in which the element has a score above the predetermined score.

In at least one embodiment, the step of retrieving a plurality of electronic documents includes eliminating extraneous information from the documents that is not related to the text of the documents.

In at least one embodiment, for each document, the step of identifying a plurality of elements includes determining whether at least one of a plurality of entity names pre-listed in a name catalog appears in the document, the plurality of entity names being pre-categorized in the name catalog based on the plurality of descriptive categories.

In at least one embodiment, the step of determining whether at least one of a plurality of entity names pre-listed in the name catalog appears in the document includes determining whether an alias of at least one of the plurality of entity names appears in the document, the alias being pre-listed along with its associated entity name in the name catalog.

In at least one embodiment, the step of identifying each of the plurality of elements includes identifying at least one entity name by natural language processing.

In at least one embodiment, the method further includes a step of determining whether the at least one entity name identified by natural language processing should be added to the name catalog.

In at least one embodiment, the step of determining whether the at least one entity name identified by natural language processing should be added to the name catalog includes prompting a user to enter the at least one entity name to the name catalog.

In at least one embodiment, the plurality of descriptive categories includes people, places, products or companies.

In at least one embodiment, for each document, the step of identifying a plurality of elements includes identifying at least one element by applying a rule-based algorithm to the document to identify the at least one element.

In at least one embodiment, the at least one element identified using a rule-based algorithm is categorized according to descriptive categories including topics or industries.

In at least one embodiment, the step of applying a score to each of the plurality of elements includes determining a score for each element based on relative position or relative frequency of the element in comparison to other elements in its corresponding document.

In at least one embodiment, the method further comprises a step of grouping the plurality of electronic documents into a plurality of clusters, where the electronic documents in each cluster have at least one common element.

In at least one embodiment, the method further comprises a step of entitling each cluster based on the at least one common element in each cluster.

In at least one embodiment, the method further comprises displaying titles of each cluster and providing corresponding network links to those electronic documents within each cluster.

In at least one embodiment, the method further includes identifying at least one cluster having the most amount of electronic documents as a top story cluster.

In at least one embodiment, the method further comprises displaying the list of documents in which the element has a score above the predetermined score in a knowledge discovery display.

In at least one embodiment, the method further comprises ordering the list of documents in the knowledge discovery display based on credibility, relevance or recentness.

In at least one embodiment, the method further includes identifying a plurality of other elements that appears in the listed documents besides the element.

In at least one embodiment, each of the plurality of other elements is identified based on frequency of appearance in the list of documents or location in each of the documents in the list of documents.

In at least one embodiment, the method further includes displaying a list of the plurality of other elements in a table of contents section of the knowledge discovery display and providing, for each other element, a network link to another knowledge discovery display relating to the other element.

In at least one embodiment, the method further includes ordering the list of the plurality of other elements based on relatedness of each of the plurality of other elements to the element.

In at least one embodiment, the informational network is the Internet.

In at least one embodiment, the plurality of electronic documents are news articles.

In another aspect, there is a processor readable storage medium for retrieving and displaying information relating to electronic documents available from an informational network. According to the processor readable storage medium containing processor readable code for programming a processor to perform a method of displaying information relating to a plurality of electronic documents available from an informational network according to an exemplary embodiment of the invention, the method includes the steps of: retrieving information relating to location of each of the plurality of documents available on the informational network; identifying a plurality of elements in each of the plurality of documents, each of the plurality of elements being assigned to a descriptive category selected from a list of descriptive categories; applying a score to each of the plurality of elements in each of the plurality of documents based on relevance of each of the elements to its corresponding document; displaying at least one of the plurality of documents using the retrieved information relating to the location of the plurality of documents on the informational network; for each descriptive category, displaying a list of elements selected from the displayed document that have a score above a predetermined score; and for each element in each of the list of elements, providing a network link to a list of documents in which the element has a score above the predetermined score.

In another aspect, there is a computer-based system for retrieving and displaying information relating to electronic documents available from an informational network. The computer-based system for displaying information relating to a plurality of electronic documents available from an informational network according to an exemplary embodiment of the invention includes a network interface that communicates with the informational network; a document network location information retrieval system that retrieves information relating to location of each of the plurality of documents available on the informational network; an element identification system that identifies a plurality of elements in each of the plurality of documents and assigns each of the plurality of elements to a descriptive category selected from a list of descriptive categories; an element scoring engine that applies a score to each of the plurality of elements in each of the plurality of documents based on relevance of each of the elements to its corresponding document; and a display generator that generates a user interface on a client computer, the user interface displaying at least one of the plurality of documents using the retrieved information relating to the location of the plurality of documents on the informational network in a user interface, the user interface further displaying, for each descriptive category, a list of elements selected from the displayed document that have a score above a predetermined score and providing, for each element in each of the list of elements, a network link to a list of documents in which the element has a score above the predetermined score.

Another approach is a network service for providing related content. In one aspect, there is a method of providing related content. The method involves presenting information about one piece of content available over a network in response to a user requesting another piece of content. The first content is maintained in a repository. Each piece of content has associated elements, and a score is assigned to the association of the content and the elements. The elements themselves are associated with a category according to a taxonomy. In some implementations, elements are not just associated with categories, but are identical to categories or are pieces of content. A second piece of content is obtained from a content provider and elements associated with the second content are determined. Elements associated with the second content are often also associated with the first piece of content. A content provider requests information related to the second content, received via a web services interface (e.g., defined using a Web Service Definition Language). In response, an identifier is returned, the identifier being associated with the first piece of content based on the score assigned to the association of the first content and the element.

In some embodiments, the content provider is a single content provider. In other embodiments, the content provider is one of many, or multiple, content providers that publish ads, audio, video, and/or text to a network, e.g., the Internet.

Several options exist for determining an element associated with a piece of content. The element may already exist in an element repository, e.g., a name catalog, the element may be associated by a user via an administrative interface, or alternatively or additionally, the element may be determined via a natural language processing computer program that processes the content to determine elements. If the element does not exist in the name catalog, the element is typically added, beneficially making future element determinations easier.

In some versions, a score is assigned to the association of the second content and the element, much like the score assigned to the association of the first content and the element. In some versions the score is a relevancy score, based on the relevancy of the second content to the element. The element is often associated with a category as well, category typically being a topic, a person, a company, an industry, a place, or a product. When associating an element with a category, the category may already exist, or it may be created based on the content the element was determined from, e.g., from the first content. Often a category is associated with many pieces of content, e.g., the first category is associated with the first content, a second category is associated with the second content, and the two categories are the same category (or, alternatively the categories could be different categories). The first content can be or include advertisements.

Typically, content maintained in the repository, or the content obtained from the content provider includes, but is not limited to, an electronic document associated with the content provider's website, a syndicated news feed, an electronic document associated with a third-party website, an advertisement, an audio file, a video file, an electronic document associated with a weblog.

In some versions, when a user requests the second piece of content, the first content, or an identifier associated with the first content, is provided to the user. The identifier is typically a hyperlink, a navigational element, a metadata tag, a third piece of content, or any combination thereof. Advantageously, additional content related to the content the user is requesting is provided to the user. Beneficially, related content is provided without the user executing an additional keyword-type search; instead content is provided related to what the user has already requested.

Another approach to preprocessing content is preprocessing content to determine relationships. In one aspect, there is a method for preprocessing content to determine relationships. A first content available over a network is retrieved. The one or more first-type elements associated with the first content using a rule-based algorithm are identified. The one or more first-type elements are selected from a plurality of predefined elements associated with a topic and/or industry. A corresponding score is assigned to the one or more first-type elements based on relevancy. A top scored first-type element from the one or more first-type elements is identified. The first content is associated with the top scored first-type element.

In another aspect, there is a system for preprocessing content to determine relationships. The system includes one or more computing devices configured to preprocess content to determine relationships. A first content available over a network is retrieved. One or more first-type elements associated with the first content using a rule-based algorithm is identified. The one or more first-type elements are selected from a plurality of predefined elements associated with a topic and/or industry. A corresponding score is assigned to the one or more first-type elements based on relevancy. A top scored first-type element is identified from the one or more first-type elements. The first content is associated with the top scored first-type element.

In another aspect, there is a computer program product for preprocessing content to determine relationships. The computer program product is tangibly embodied in an information carrier. The computer program product including instructions being operable to cause a data processing apparatus to retrieve a first content available over a network. One or more first-type elements associated with the first content are identified using a rule-based algorithm. The one or more first-type elements selected from a plurality of predefined elements are associated with a topic and/or an industry. The corresponding score is assigned to the one or more first-type elements based on relevancy. A top scored first-type element is identified from the one or more first-type elements. The first content is associated with the top scored first-type element.

In another approach, determining advertising placement is based on preprocessed content. In another aspect, there is a method for determining advertising placement based on preprocessed content. A first content available over a network is retrieved. One or more first-type elements associated with the first content are identified using a rule-based algorithm. The one or more first-type elements are selected from a plurality of predefined elements associated with a topic and/or an industry. A corresponding score is assigned to the one or more first-type elements based on relevancy. A narrower scope of an ad related topic based on the corresponding scores of the one or more first-type elements is provided to increase the value of an ad placement.

In another aspect, there is a system for determining advertising placement based on preprocessed content. The system includes one or more computing devices configured to determine advertising placement based on preprocessed content. A first content available over a network is retrieved. One or more first-type elements associated with the first content using a rule-based algorithm is identified. The one or more first-type elements are selected from a plurality of predefined elements associated with a topic and/or an industry. A corresponding score is assigned to the one or more first-type elements based on relevancy. A narrower scope of an ad related topic is provided based on the corresponding scores of the one or more first-type elements to increase the value of an ad placement.

In another aspect, there is a computer program product for determining advertising placement based on preprocessed content. The computer program product is tangibly embodied in an information carrier. The computer program product including instructions being operable to cause a data processing apparatus to retrieve a first content available over a network. One or more first-type elements associated with the first content are identified using a rule-based algorithm. The one or more first-type elements selected from a plurality of predefined elements are associated with a topic and/or an industry. The corresponding score is assigned to the one or more first-type elements based on relevancy. A narrower scope of an ad related topic is provided based on the corresponding scores of the one or more first-type elements to increase the value of an ad placement.

In another approach, determining relationships is based on disambiguation for preprocessing content. In another aspect, there is a method for disambiguation for preprocessing content to determine relationships. A first canonical identifier associated with a first element that can be represented in content in a plurality of forms is defined. A second canonical identifier associated with a second element that can be represented in content in a plurality of forms is defined. A first content available over a network is retrieved. An entity name element associated with the first content is identified. The entity name element being able to represent the first element and the second element. The entity name element is associated with the first element or the second element based on context associated with the first content.

In another aspect, there is a system for disambiguation for preprocessing content to determine relationships. The system includes one or more computing devices configured to disambiguation for preprocessing content to determine relationships. A first canonical identifier associated with a first element that can be represented in content in a plurality of forms is defined. A second canonical identifier associated with a second element that can be represented in content in a plurality of forms is defined. A first content available over a network is retrieved. An entity name element associated with the first content is identified. The entity name element being able to represent the first element and the second element. The entity name element is associated with the first element or the second element based on context associated with the first content.

In another aspect, there is a computer program product for disambiguation for preprocessing content to determine relationships. The computer program product is tangibly embodied in an information carrier. The computer program product including instructions being operable to cause a data processing apparatus to define a first canonical identifier associated with a first element that can be represented in content in a plurality of forms. A second canonical identifier associated with a second element that can be represented in content in a plurality of forms is defined. A first content available over a network is retrieved. An entity name element associated with the first content is identified. The entity name element being able to represent the first element and the second element. The entity name element is associated with the first element or the second element based on context associated with the first content.

In another approach, enabling one-click searching is based on elements related to displayed content. In another aspect, there is a method for enabling one-click searching based on elements related to displayed content. A first content available over a network is retrieved. One or more first-type elements associated with the first content using a rule-based algorithm is identified. The one or more first-type elements are selected from a plurality of predefined elements associated with a topic and/or an industry. One or more entity name elements associated with the first content are identified. At least a portion of the first content is displayed. One or more links associated with at least one of the one or more first-type elements and one or more links associated with at least one of the one or more entity name elements associated with the first content are displayed. When a displayed link is single clicked, then a search for a plurality of content based on text of that clicked link is executed.

In another aspect, there is a system for enabling one-click searching based on elements related to displayed content. The system includes one or more computing devices configured to enable one-click searching based on elements related to displayed content. A first content available over a network is retrieved. One or more first-type elements associated with the first content using a rule-based algorithm is identified. The one or more first-type elements are selected from a plurality of predefined elements associated with a topic and/or an industry. One or more entity name elements associated with the first content are identified. At least a portion of the first content is displayed. One or more links associated with at least one of the one or more first-type elements and one or more links associated with at least one of the one or more entity name elements associated with the first content are displayed. When a displayed link is single clicked, then a search for a plurality of content based on text of that clicked link is executed.

In another aspect, there is a computer program product for enabling one-click searching based on elements related to displayed content. The computer program product is tangibly embodied in an information carrier. The computer program product including instructions being operable to cause a data processing apparatus to retrieve a first content available over a network. One or more first-type elements associated with the first content using a rule-based algorithm is identified. The one or more first-type elements are selected from a plurality of predefined elements associated with a topic and/or an industry. One or more entity name elements associated with the first content are identified. At least a portion of the first content is displayed. One or more links associated with at least one of the one or more first-type elements and one or more links associated with at least one of the one or more entity name elements associated with the first content are displayed. When a displayed link is single clicked, then a search for a plurality of content based on text of that clicked link is executed.

In other examples, any of the aspects above can include one or more of the following features. One or more entity name elements associated with the first content are identified. A corresponding score is assigned to the one or more entity name elements based on relevancy. The top scored entity name element from the one or more entity name elements is identified. The first content is associated with the top scored entity name element.

In yet other examples, the one or more entity name elements are associated with a person, place, company, and/or product. The identification of a top scored entity name element includes identifying a predefined number of highest scored entity name elements from the one or more entity name elements. The association of the first content with the top scored entity name element includes associating the first content with the predefined number of highest scored entity name elements.

In some examples, the association of the first content with the predefined number of highest scored entity name elements includes saving each association of the first content with a entity name element as a separate row in a database table. The predefined number is three.

In yet other examples, the association of the first content with the predefined number of highest scored entity name elements includes saving each association of the first content with a entity name element as a separate row in a database table. Each separate row in the database table includes, for example, an identifier associated with the top scored first-type element.

In some examples, a determination is made whether associating one or more entity name elements is required for the top scored first-type element. If associating one or more entity name elements is required for the top scored first-type element, then one or more entity name elements associated with the first content are identified. A corresponding score to the one or more entity name elements is assigned based on relevancy. A top scored entity name element from the one or more entity name elements is identified. The first content is associated with the top scored entity name element.

In yet other examples, the plurality of predefined elements include a plurality of levels of specificity. The assigning a corresponding score to the one or more first-type elements includes assigning a corresponding score to the one or more first-type elements based on specificity. The assigning a corresponding score to the one or more first-type elements includes multiplying relevancy by specificity. The plurality of predefined elements are based on a predefined taxonomy. The associating of the first content includes associating the first content with the top scored entity name element in a database.

In some examples, a plurality of content available over a network is retrieved. For each piece of content in the plurality, one or more first-type elements associated with a piece of content using a rule-based algorithm is identified. The one or more first-type elements are selected from a plurality of predefined elements associated with a topic and/or an industry. A corresponding score is assigned to the one or more first-type elements based on relevancy. A top scored first-type element is identified from the one or more first-type elements. The piece of content is associated with the top scored first-type element.

In yet other examples, other content related to the first content based on the top scored first-type element is identified. The other content includes blogs.

In some examples, the first content includes an electronic document associated with the content provider's web site, a syndicated news feed, an electronic document associated with a third-party web site, and/or an electronic document associated with a weblog.

In some examples, a narrower scope includes mapping the one or more first-type elements with one or more ad related topics. The one or more ad related topics include one or more topics defined by a content provider. Ad placement related services are provided to a plurality of content providers. Increased advertising revenues are generated based on access to aggregated page views of the plurality of content providers. The plurality of content providers are unrelated organizations.

In yet other examples, user interests are tracked across the plurality of content providers. A narrower scope of an ad related topic is provided and the ad related topic includes selecting an ad based on tracked user interests. Tracked user interests are maintained in a database. Tracking includes tracking user interests across the plurality of content providers using a cookie. A first user interest is weighed higher if an associated user selects such first user interest when presented with such user interest.

In some examples, an ad is selected for ad placement from a plurality of ad sources. The selection of an ad includes selecting an ad for ad placement based on maximizing revenue from that ad placement.

In yet other examples, the plurality of ad sources includes one or more external ad networks, internal inventory, and/or an ad network associated with a service provider providing the ad placement service.

In some examples, associations between the first content and the one or more first-type elements are saved in a database table.

In yet other examples, a top scored first-type element from the one or more first-type elements is identified. The first content is associated with the top scored first-type element.

In some examples, the first content includes an electronic document associated with the content provider's web site, a syndicated news feed, an electronic document associated with a third-party web site, and/or an electronic document associated with a weblog. The context associated with the first content includes an overall category of content typically served from a content provider providing the first content. The context associated with the first content includes an URL associated with the first content.

In yet other examples, the context associated with the first content includes localized usage of the entity name element associated with the content provider providing the first content. The context associated with the first content includes a rule from a rule database defining a chosen association between the entity name element and the first element or the second element.

In some examples, the context associated with the first content includes identifying one or more additional entity name elements associated with the first content and determining whether the entity name element and the one or more additional entity name elements co-occurred more often with the first element or the second element. The co-occurrence is determined based on tables in a database. The co-occurrence is determined based on a frequency of two elements occurring with each other.

In yet other examples, the context associated with the first content includes displaying the first element and the second element to a user, receiving a response indicating an action by the user, and determining if the entity name element is more likely associated with the first element or the second element based on the response. The displaying includes displaying the first element and the second element in a did-you-mean area. The displaying includes displaying the first element and the second element as links. The action by the user includes selecting one of the links.

In some examples, the context associated with the first content includes identifying one or more first-type elements associated with the first content using a rule-based algorithm. The one or more first-type elements are selected from a plurality of predefined elements associated with a topic and/or an industry. A corresponding score is assigned to the one or more first-type elements based on relevancy. A top scored first-type element is identified from the one or more first-type elements. A determination is made if the top scored first-type element is more likely associated with the first element or the second element.

In yet other examples, the displaying of one or more links includes displaying the plurality of links based on scores. The displaying of one or more links includes displaying the plurality of links in a pull-down menu. The displaying of one or more links includes displaying the plurality of links in a text box adjacent to the at least a portion of the first content. A first one of the one or more first-type elements is displayed in a top portion of a Web page.

In some examples, a corresponding score is assigned to the one or more first-type elements based on relevancy. A top scored first-type element from the one or more first-type elements is identified. The first one of the one or more first-type elements includes the top scored first-type element.

In yet other examples, the displaying of one or more links includes displaying at least a portion of the links adjacent the first one of the one or more first-type elements. The displaying of the at least a portion of the links includes displaying the at least a portion of the links in an area associated with refining by related subjects. The executing a search includes, upon a single click of a displayed link being displayed in the at least a portion of the links, executing a search for a plurality of content based on a join of text of that clicked link and the first one of the one or more first-type elements.

In some examples, the at least a portion of the links co-occurred with the first one of the one or more first-type elements in a plurality of content. The co-occurrence is determined based on tables in a database. The co-occurrence is determined based on frequency two elements occur with each other.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The above and related objects, features and advantages of the present invention will be more fully understood by reference to the following, detailed description of the preferred, albeit illustrative, embodiment of the present invention when taken in conjunction with the accompanying figures, wherein:

FIG. 8 shows a name catalog according to an exemplary embodiment of the present invention;

FIG. 12 is a screenshot of a main navigational page according to an exemplary embodiment of the present invention configured with a publication selected;

FIG. 15 is a screenshot of a knowledge discovery display according to an exemplary embodiment of the present invention;

FIG. 16 is a screenshot of a knowledge discovery display according to an exemplary embodiment of the present invention showing linked elements of interest;

FIGS. 17-19 are screenshots of user interface tools enabling searching for related content with a single click;

FIGS. 21-26 are screenshots showing the display of related content provided to a publisher using a network service;

FIGS. 29-31 are block diagrams and screenshots showing advertising techniques using the system.

DETAILED DESCRIPTION

Figure 1:
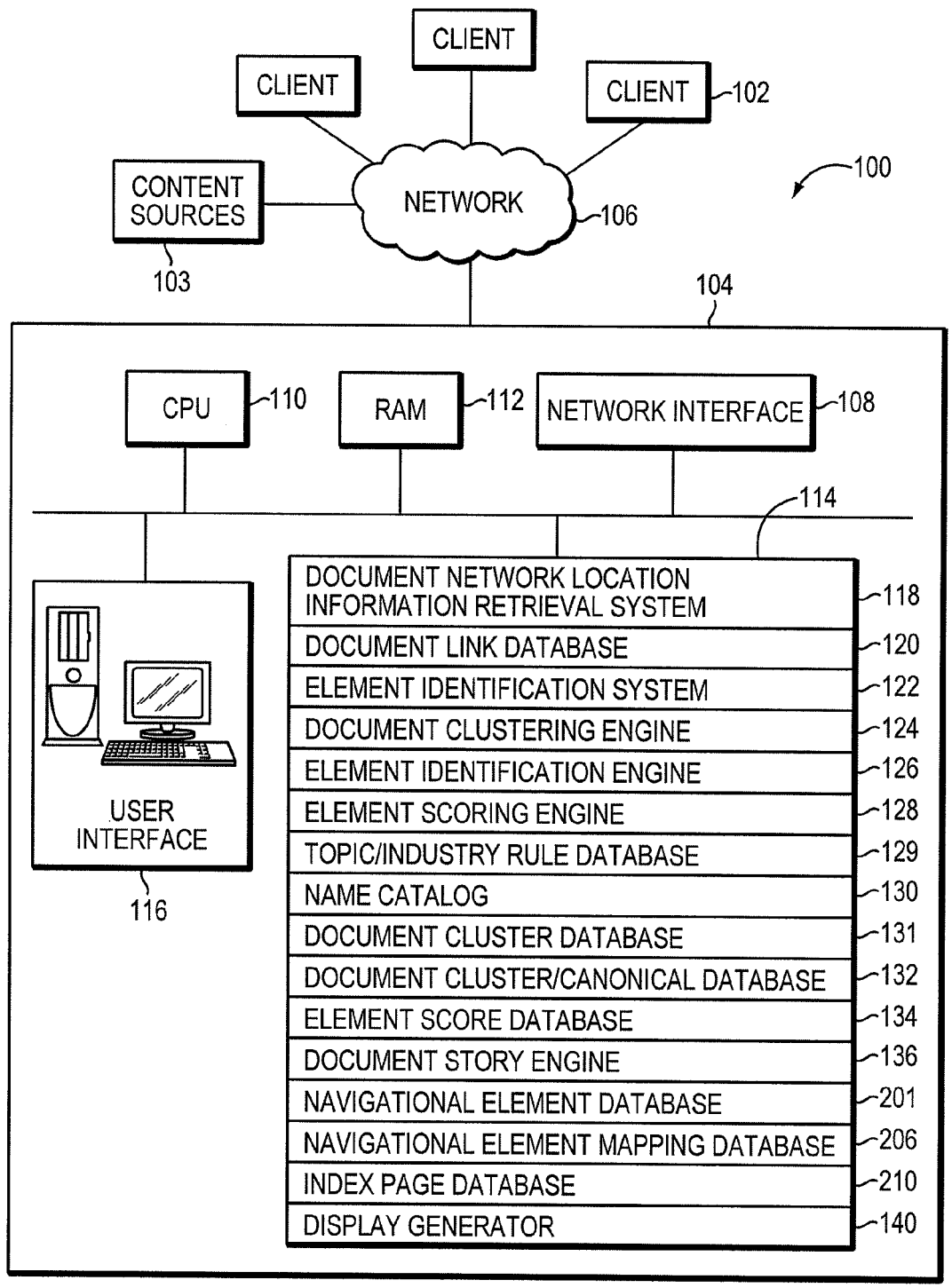
FIG. 1 is a block diagram of a system for retrieving, organizing and displaying information relating to an electronic document available from an informational network according to an exemplary embodiment of the present invention.

FIG. 1 shows a computer-based system 100 for retrieving, organizing and displaying information relating to an electronic document available from an informational network according to an exemplary embodiment of the present invention. In various exemplary embodiments, the electronic documents may be news articles available from a variety of Internet-accessible sources, such as, for example, magazines or newspapers "published" on the Internet, or RSS feeds. Although the present invention will be described herein within the general context of retrieving and displaying news articles available from the Internet, it should be appreciated that the various aspects of the invention may be equally applied to retrieving and displaying any other types of electronic documents, such as any webpage, from a distributed network, such as an intranet, local area network (LAN) or wide area network (WAN). In the following description, the terms "document" and "article" are used interchangeably, although it should be appreciated that an "article" is merely an example of a type of "document."

As shown in FIG. 1, the system 100 of the present invention includes a plurality of client computers 102 connected to at least one server computer 104 over a network 106. A group of client computers 102 may be located within a common LAN and connected to a LAN server. In a preferred embodiment, each of the client computers 102 are connected to the server computer 104 via the Internet. Content sources 103, such as, for example, RSS feeds and electronic publishers, are connected to the network 106.

The server computer 104 includes a network interface 108, a central processing unit 110, a primary memory (i.e., random access memory) 112, a secondary memory 114, and a user interface 116. The network interface 108 is preferably an Internet interface for communication with the client computers 102 via the Internet. The secondary memory 114 is preferably disk storage. Code is stored in the secondary memory for performing a plurality of processes, executable by a processor, which function together to retrieve, organize and display information relating to documents "published" on the Internet. Alternatively, each of the processes may run on a separate hardware element of the server computer 104. Each of these processes will now be described with reference to the flow charts and databases shown in FIGS. 2-10.

Figure 2:
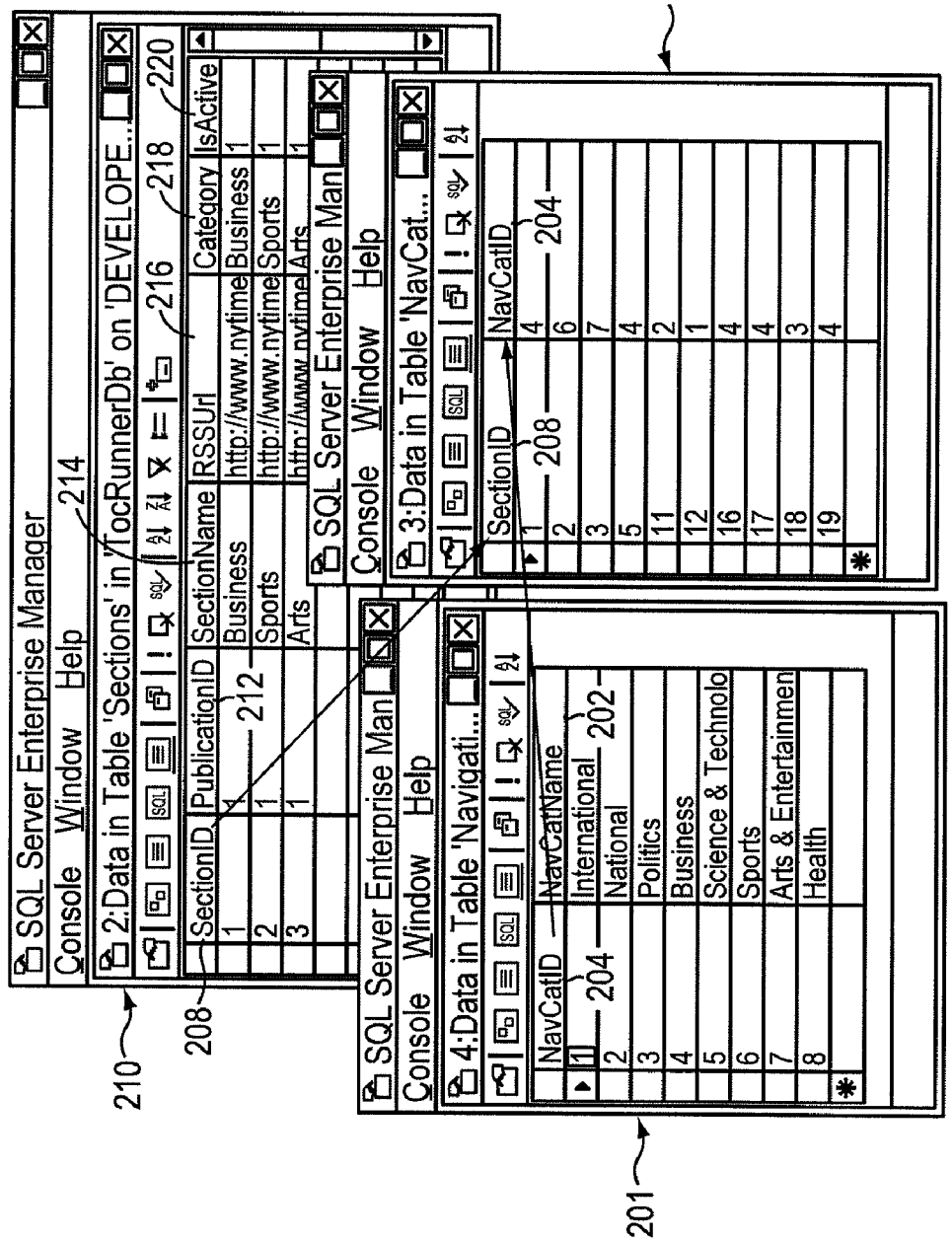
FIG. 2 shows a navigational element database 201 according to an exemplary embodiment of the present invention.

Initially, as shown in FIG. 2, a system administrator compiles a navigational element database 201 which lists navigational elements 202 and corresponding Navigational Element ID numbers 204. For example, database 201 shows International, National, Politics, Business, Science and Technology, Sports, Arts and Entertainment and Health as possible navigational elements, each assigned Navigational Element ID numbers 1-8, respectively. The system administrator also compiles, for each publication, a navigational element mapping database 206 which lists sections of a publication by assigning a Section ID 208 to each section, in addition to each section's corresponding Navigational Element ID 204. Thus, for example, as shown in FIG. 2, the business section of the N.Y. Times may be assigned a Section ID of "1" and defined by the "Business" Navigational Element ID of "4". Thus, each section of each publication is essentially mapped to a previously defined navigational element. Using the navigational element database 201 and the mapping databases 206, the system administrator also compiles an index page database 210 which lists publications by corresponding Publication IDS 212, and, for each section in a particular publication, a Section ID 208, a Section Name 214, the section's website address 216 (i.e., URL), the section's Category 218 (which corresponds to the section's corresponding Navigational Element ID), and the sections' active status 220.

In an alternative embodiment of the invention, additional navigational elements 202 may be predefined to create "channels" in a child-parent format. For example, a "politics" channel may have "Republican Party" and "Democratic Party" sub-channels. These navigational element channels may be predefined by choosing navigational topics from a pull-down menu. The pull-down menu may be populated by only those topics that have a minimum amount of content available.

An electronic document network location information retrieval system 118 enters each of the index pages of a publication as databases in the index page database 210 and retrieves the network address and title of each of the documents in the index page. For example, the system 118 is capable of retrieving the URLs of all the news articles within the business section of a newspaper published over the Internet.

Figure 3:
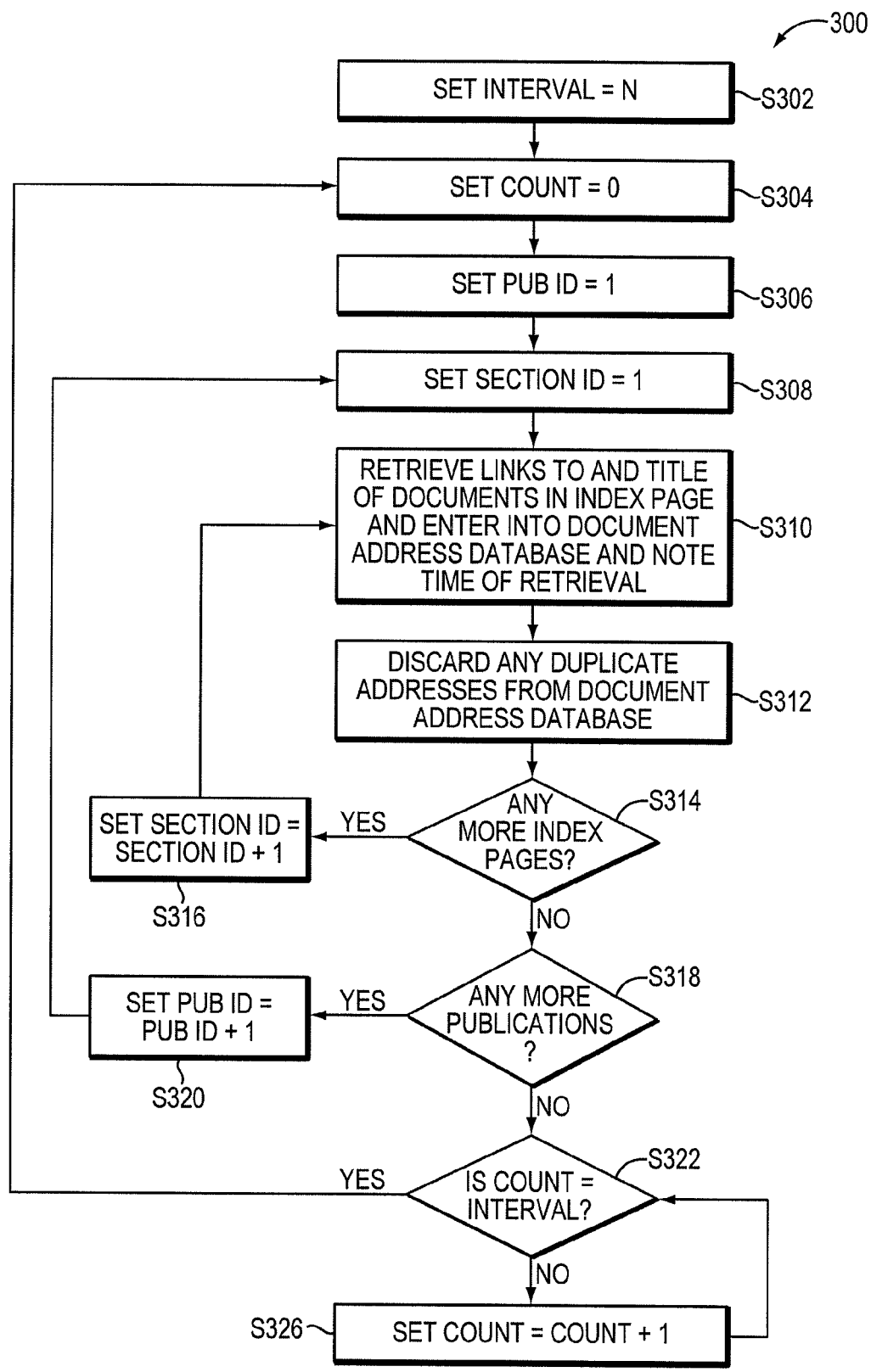
FIG. 3 is a flowchart showing various steps of a process for retrieving information related to documents within index pages of a number of publications according to an exemplary embodiment of the present invention.

FIG. 3 is a flowchart showing the various steps of a process 300 for retrieving information related to documents within index pages of a number of publications, as implemented by the system 118 according to an exemplary embodiment of the invention. In step S302 of the process 300, the interval of time which the system 118 will wait before retrieving new information is set by a system administrator. This is done by setting the variable INTERVAL equal to some number N, where N is the number of hours, minutes or seconds in the interval. Thus, for example, if the system clock of the system 118 is set to run in intervals of minutes and it is desired to wait 15 minutes to retrieve new information, the number N would be set at 15. At step S304, the variable COUNT is set equal to zero. Next, at step S306, the variable PUB ID is set equal to 1, indicating that the system will initially retrieve information relating to the publication assigned a Publication ID 212 of 1 in the index page database 210. Then, at step S308, the variable SECTION ID will be set equal to 1, indicating that the system will initially retrieve information relating to the index page assigned a Section ID 208 of 1 in the index page database 210. Thus, initially, the system 118 will retrieve information relating to the index page assigned a Section ID of 1 in the publication assigned a Publication ID of 1.

Next, at step S310, the system 118 retrieves the link (i.e., URL) and title of each document within the index page and enters this information into the document link database 120. Index pages may include advertisements and other extraneous elements. Thus, the system 118 must be able to discriminate between links to extraneous elements and links to the actual documents of interest. In exemplary embodiments of the invention, the system 118 is able to perform this task by analyzing the source code of the index page to determine where the documents of interest are located on the index page. The source code may be examined to determine the logic used by the developer that made the page/site to infer how to programmatically identify a link to an article. For instance, sometimes a link will be in a particular font or color, or the area in which the links appear has its own formatting convention that eases the task of determining where to focus code-differentiation. Further, sometimes a publication will include a "tag", which is a specific identifier with no presentation value but rather identifies where a link may exist. Additionally, the storage methodology for an article as compared to that of other types of content is specific and can be used to identify the article link.

At step S312, any duplicate links are discarded from the document link database 120. At step S314, the system 118 determines if there are any more index pages in the publication. If there are more index pages, then the process proceeds to step S316, where the SECTION ID is set equal to SECTION ID+1. The process will then return to step S310, where the links and titles of documents in the next index page is retrieved. In step S314, if it is determined that there are no more index pages in the publication, the process continues to step S318, where the system 118 determines if there are any more publications. If so, then the process continues to step S320, where the PUB ID is set equal to PUB ID+1. The process then returns to step S3308, where the SECTION ID is set back to 1, so that the links and titles of each index page in the next publication can be retrieved. In step S318, if it is determined that there are no more publications, the process continues to step S322, where the system 118 determines whether the variable COUNT is equal to INTERVAL. If COUNT does not equal to INTERVAL, then the process will continue to step S326, where COUNT is set equal to COUNT+1. If COUNT is equal to INTERVAL, meaning that some amount of time N has gone by, then the process returns to step S304, where the variable COUNT is set back to zero. The process repeats in this manner to periodically retrieve the links and titles on each index page of each publication.

It should now be evident that, by iterating through the above process, the system 118 is able to automatically populate the document link database 120 with, for each document, at least a document title and a URL. In this regard, each of the documents is preferably assigned a Document or Article ID for ease of identification. In a preferred embodiment, the date and time of the initial instance that a link is retrieved is also stored in the document link database 120.

Figure 4:
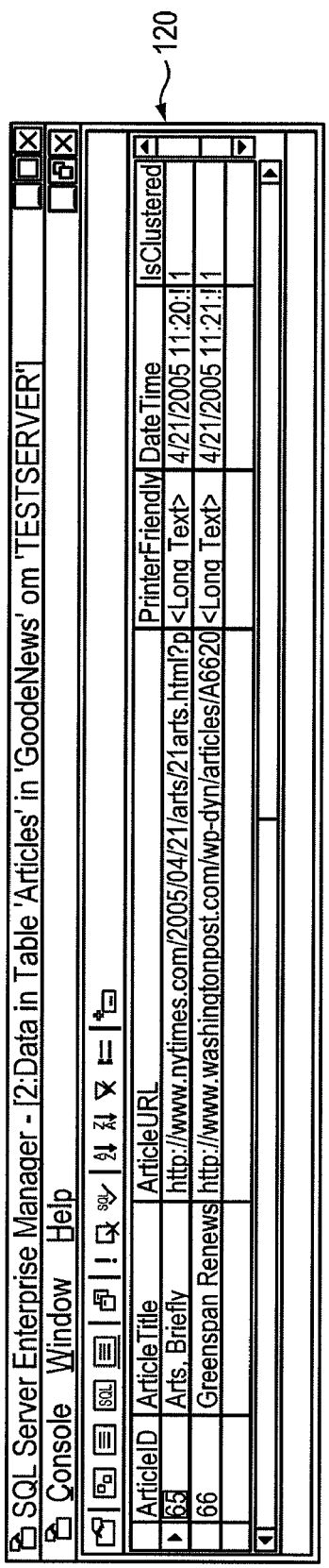
FIG. 4 shows a portion of a document link database according to an exemplary embodiment of the present invention.

The information obtained by the system 118 is preferably stored in a document link database 120. FIG. 4 shows a portion of an exemplary document link database 120, as applied to news articles, including, for each article, an Article ID, an Article Title, the Article URL and the Time/Date of the article. In addition, the document link database 120 preferably includes, for each document, a corresponding category based on the previously mentioned navigational elements, which is the same Category 218 as that assigned to the document's corresponding index page as listed in the index page database 210. Thus, within the context of news articles, the document link database 120 is able to provide a list of articles and their corresponding navigational element.

There may be some instances when an article is included in multiple sections of a publication. Thus, in at least one embodiment of the invention, only one instance of the title, link and elements of a particular article are retained in the document link database 120 and that instance is related to each of the sections in the site in which the article appears.

The above-described process 300 performed by the system 118 can be modified for increased speed and efficiency. For example, in at least one embodiment, the system administrator may assign each publication a priority ranking of 1 to 5, 1 being the most important. When numerous links are available for processing at any one time, the system 118 is able to prioritize link retrieval using the priority rankings. Also, the priority rankings can be used to determine how often links from a particular publication should be retrieved.

Figure 5:
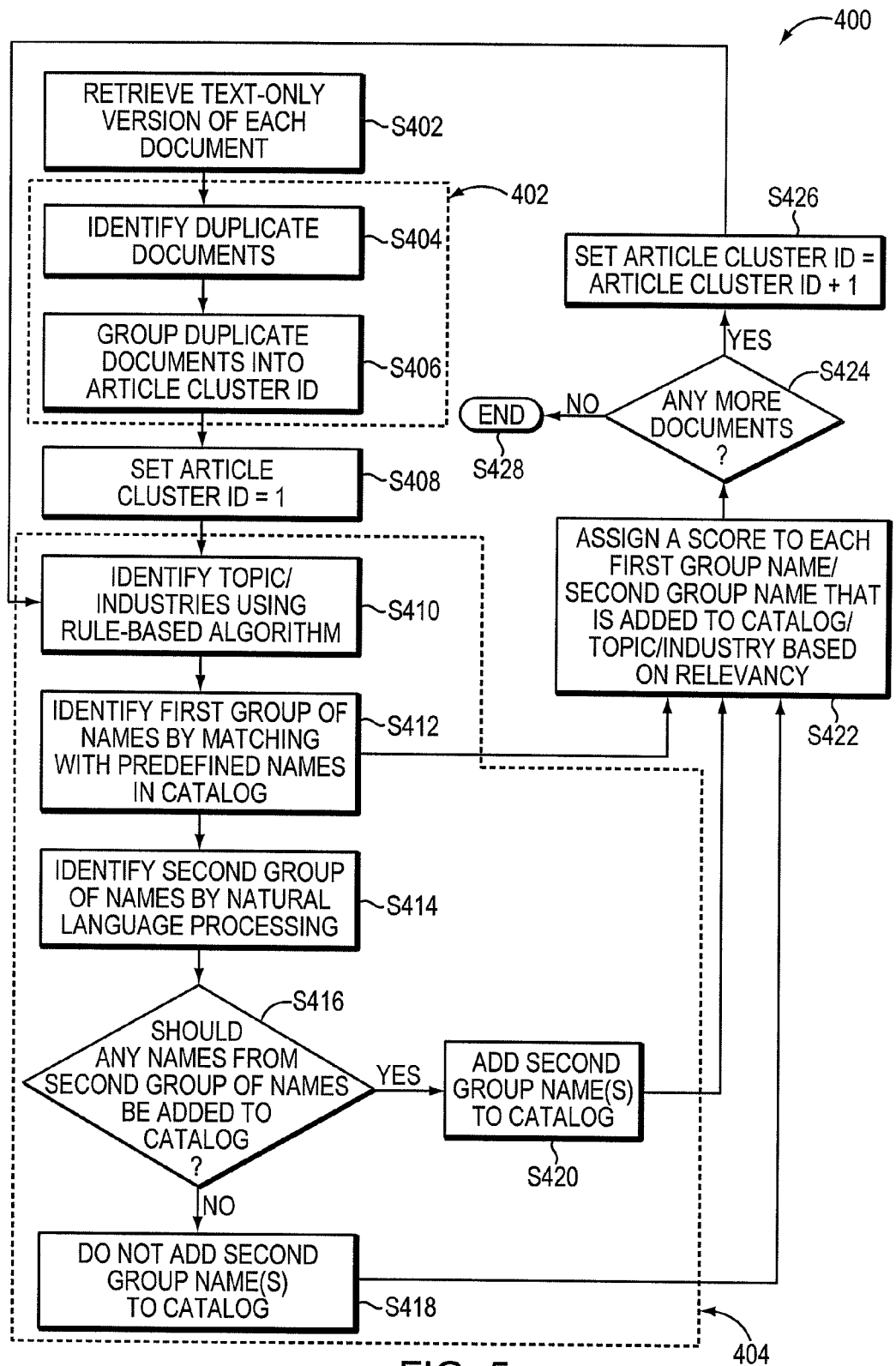
FIG. 5 is a flowchart showing various steps of a process for extracting elements from documents according to an exemplary embodiment of the present invention.

An electronic document element identification system 122 extracts elements from documents and assigns a score to each of the elements based on the element's relevancy to its corresponding document. FIG. 5 is a flowchart showing a process 400 for extracting elements from documents according to an exemplary embodiment of the invention, as implemented by the element identification system 122. In step S402 of the process 400, a text-only version of each document is retrieved using the document link database 120. For example, in some cases, a link to a "printer friendly" version of the document is available on the document web page. "Printer-friendly" versions of documents are typically text-only. Thus, in step S402, a text-only version of a document may be easily obtained by locating the link to the "printer friendly" version of the document and retrieving the "printer-friendly" version. Alternatively, if there is no "printer friendly" version of the document, code may be implemented to piece together just the text of the document from the document webpage. An example of such code is provided in Listing 1, shown below:

Listing 1: Exemplary code for retrieving text-only version of a document.

```
private string GetPrintText(string input)
{
    string html="";
    try
    {
        objMatchTag = Regex.Match(input, RegexPrintText,
            RegexOptions.IgnoreCase | RegexOptions.Multiline);
        //Checks for the returned boolean value
        while (objMatchTag.Success)
        {
            //checks for the group containing text.
            Group             objTextGroup =
            objMatchTag.Groups["articletext"];
            html = html + objTextGroup.Value.ToString( );
            objMatchTag=objMatchTag.NextMatch( );
        }
        html = Regex.Replace(html, @".*?\(CNN\)\s*?-{2, } " , " ",
            RegexOptions.Multiline | RegexOptions.IgnoreCase);
        html = Regex.Replace(html, @"<h\d>(.|\s)*?</h\d>", " ",
            RegexOptions.Multiline | RegexOptions.IgnoreCase);
        html = Regex.Replace(html, @"<i>(.| \s)*?</i>", " ",
        html = ParseLib__New.ParseLib.StripAllHtmlTags(html);
        html =
        ParseLib__New.ParseLib.RemoveSpecialCharacters(html);
    }
    catch(Exception ex)
    {
        Applog.WriteToLog("GetPrintText", "p.aspx.cs", ex.Message);
    }
    return html;
}
```

The code used to retrieve a text-only version of a document is modified based on the publication from which the document is retrieved, since each publication has its own source code. In at least one exemplary embodiment, the code may have the ability to identify tags located at the beginning and end of the text areas of a document.

Figure 6:
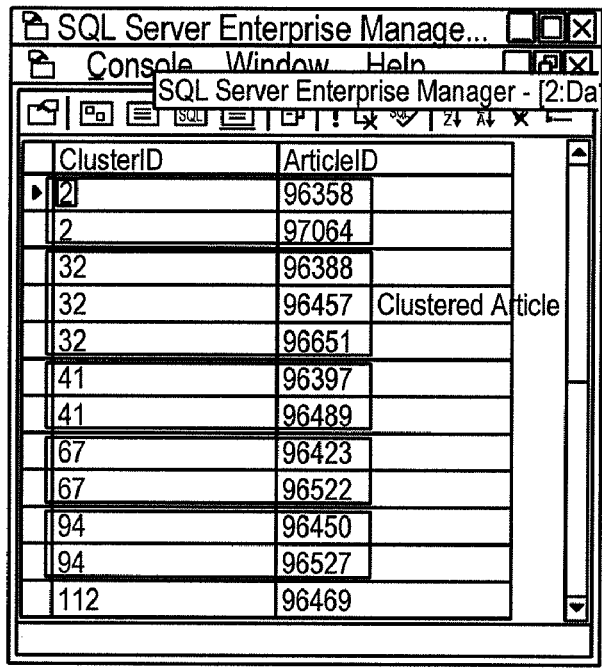
FIG. 6 shows a document cluster database according to an exemplary embodiment of the present invention.

In step S404, duplicate documents are identified using the text-only versions of the documents retrieved in step S402. This step is necessary because, in the case of news articles, many publications run the same article due to their use of the same Associated Press or United Press content. The system 122 may include an electronic document clustering engine 124 which implements this step. Preferably, clustering engine 124 runs a rule-based comparison algorithm 402 to identify duplicate documents. For example, in one embodiment of the invention, if at least some percentage of words in the first two sentences of a document are the same as those in the first two sentences of another article, than the clustering engine 124 determines that the two articles are the same. In step S406, the clustering engine 124 groups identical publications into clusters, and assigns a Document Cluster ID to each cluster of publications. Each document's Document ID and Document Cluster ID may then be entered into the electronic document cluster database 131, as shown in FIG. 6.

In step S408, the Document Cluster ID is set equal to 1, meaning that the process 400 initial runs using the document cluster having a Document Cluster ID of 1. The process 400 then continues to steps S410-S420, in which an element identification engine 126 identifies elements in the document cluster by implementing an element identification process 404. For the purposes of the present description, the term "element" should be interpreted to encompass an entity name appearing within a document cluster as well as a particular topic or industry mentioned in a document cluster. For example, an element may be "NBA", "Michael Jordan", and "Chicago Bulls", which are entity names, or "Basketball", "Sports", "All-Stars", which are topics/industries.

Figure 7:
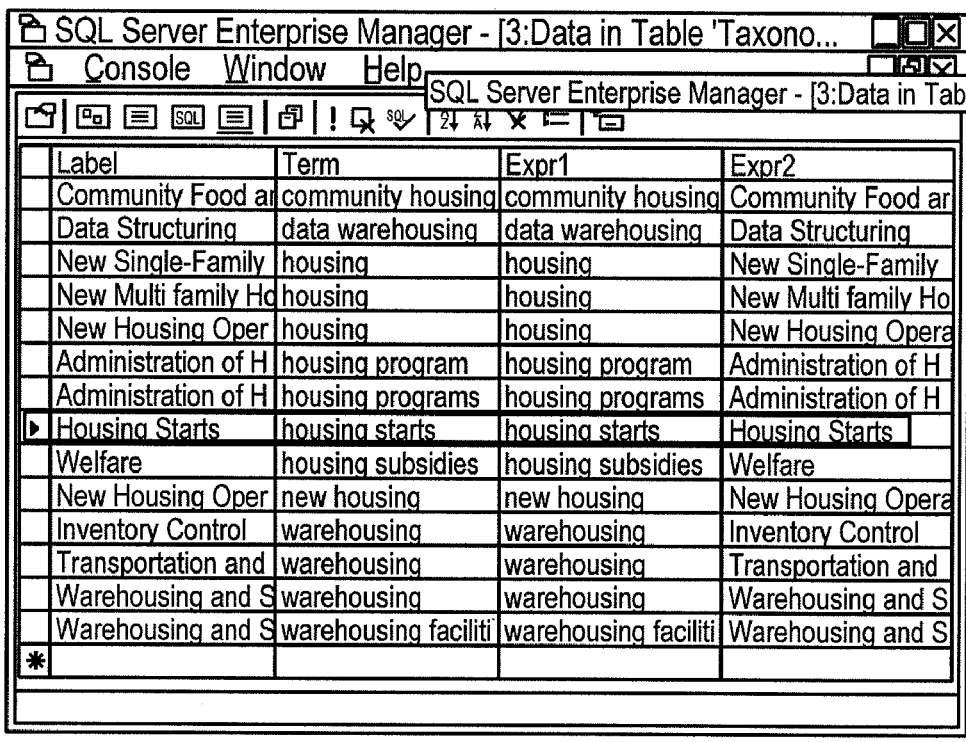
FIG. 7 shows a topic/industry rule database according to an exemplary embodiment of the present invention.

In step S410, topic/industry elements are identified in the document cluster. This step may be implemented using a rule-based algorithm. For example, topics and industries may be identified using a set of rules such as: 1) "must include any of the following words . . . "; 2) "must include the following word string . . . "; 3) must not include any of the following words . . . "; 4) must not include the following word string . . . "; 5) match case; 6) "a word . . . must appear within X words of the word . . . ", etc. Thus, numerous topics and industries may be predefined based on a set of rules, and the topics and industries and their corresponding rule elements may be listed in a topic/industry rule database 129, as shown in FIG. 7. The element identification engine 126 refers to the topic/industry rule database 129 to identify any topic/industry elements in the document cluster.

The process 400 then continues to step S412, where the element identification engine 126 identifies a first group of entity name elements. This step may be implemented by referring to a pre-populated name catalog to determine if any of the entries in the name catalog appear in the document cluster. FIG. 8 shows a name catalog 130 useable with an exemplary embodiment of the present invention. The name catalog 130 includes a list of canonical names, aliases, or variations, of the canonical names, an Element Category ID, and a Canonical ID. The list of canonical names and aliases, and their corresponding Element Category IDS and Canonical IDS are entered into the name catalog 130 manually by a system administrator. The Element Category ID identifies the particular category to which the canonical entity name relates. For example, the entity name may be matched to one of the following categories: 1) Person; 2) Company; 3) Places; and 4) Product, where each of the categories is assigned an element Category ID. In the example shown in FIG. 8, the canonical entity name "American Express Financial Corporation" is assigned to the Element Category ID of "2", which indicates that this canonical entity name is categorized as a Company. The Canonical IDS identify the canonical entity names by identification numbers. The Canonical IDS are also matched with variants, or aliases, of corresponding canonical entity names in an alias catalog 131. For example, as shown in FIG. 8, the alias catalog 131 may include aliases of the canonical entity name "American Express Financial Corporation", such as, for example, "American Express Centurion Bank", "American Express Financial Services", etc. Each one of the aliases is also assigned a corresponding alias ID, as shown in the alias catalog 131.

There may sometimes be different Canonical IDs for the same terms or aliases. For example, Bush may belong to several Canonical IDs and so a disambiguation process is needed. Some examples include a contextual disambiguation process. For example, if the article being processed is from a sports content provider, such as ESPN (which can be determined for example because the article is from the URL www.espn.com), then Bush is resolved to Reggie Bush, the football player. If the article is from the politics section of CNN (which can be determined for example because the article is from the URL www.cnn.com/politics), then Bush is resolved to George W. Bush. Another type of contextual disambiguation is the use of other terms. For example, if Bush accompanies Cheney or Iraq, the Bush will be resolved to George W. Bush. Bush with football with resolve to Reggie Bush. Mustang with car will resolve to the Ford car and not a horse. User interfaces, such as a drop down menu or a "Did you mean?" list as described below, can also be used for manual disambiguation.

Other examples include a localizing disambiguation, which can be, for example, part of the rules. For example, a publisher of a local newspaper in Oklahoma may have an associated rule that the term Oklahoma is generally used to refer to the football team, the Sooners, and not to the state. Some examples include a learning module that disambiguates based on learned patterns. The administrator can program rules to disambiguate.

After step S414, the process 400 continues to step S416, where a second group of entity names is identified by natural language processing (NLP). In this regard, the element identification engine 126 may recognize sentence structure to identify this second group of entity names. Suitable NLP software used to perform this step is commercially available from, for example, Inxight, of Sunnyvale, Calif., The process then continues to step S416, where it is determined whether any of the entity names identified by NLP should be added to the name catalog 130. Preferably, this step is accomplished by prompting the system administrator to perform one of the following tasks: 1) create a new entity name entry in the name catalog 130 by entering a canonical name based on the name found by NLP and defining some aliases; 2) add the name found by NLP to the name catalog 130 as an alias to an already-existing canonical entity name; or 3) discard the found name as an inappropriate addition to the name catalog 130, The element identification system 122 preferably has the ability to suggest aliases of a found canonical entity name using a database of synonyms of first names, company names, etc., such as "William"="Bill"="Will" and "Corporation"="Corp.". If it is determined that an entity name identified using NLP should be added to the name catalog 130, the entity name is added to the name catalog 130 at step S420.

In an embodiment of the invention, the element identification engine 126 may place elements identified by NLP into a queue so that the user can later review the identified elements for possible inclusion in the name catalog 130. Further, the element identification engine 126 may use certain rules to automatically eliminate certain elements found by NLP. For example, the following types of elements may be discarded: 1) one word names; 2) company names that consist of one word which matches the first word of any of the other elements identified in the same article; or 3) an element used in a certain context that does not appear to be consistent (e.g., if "Clinton" is identified as a place in an article in which "William Jefferson Clinton" has already been identified, then "Clinton" may be eliminated.)

After the element identification system 126 identifies elements in a document cluster, the process proceeds to step S422, where an element scoring engine 128 assigns a score to each of the identified elements. The score of each element is based on the element's relevancy to its corresponding document cluster, which depends on a variety of factors. For example, a score assigned to an entity name may depend on how many other entity names appear in the document cluster, how many times each name entity was mentioned in the document cluster, and the length of the documents making up the document cluster. A formula using these factors may be used to determine a relevancy score for each entity name element. An example of such a formula may be O/M, where O=the number of occurrences of a particular canonical and M=the number of occurrences of all canonicals of the same type. Thus, if a person is mentioned 5 times and the total number of "people mentions" is 10, the person would receive a relevance score of 0.5. Alternatively, a score may be computed by calculating O/M', where M'=occurrences of all elements of all types (people, companies, places, products) added together, so now 0's score lessens the more things (in general) are mentioned in the article.

The relevancy score assigned to a particular topic/industry element may be obtained by weighting the rules used to identify the topic/industry. A formula may then be used that takes into account which rules were satisfied in identifying the topic/industry element and the weight of each rule. Suitable scoring formulas using these factors are known from, for example, software available from Inxight, particularly Inxight Smart Discovery Version 4.1

At step S424, it is determined whether there are any more document clusters. If so, then the process 400 continues to step S426, where Article Cluster ID is set equal to Article Cluster ID+1, meaning that elements will then be identified in the next article cluster using the name catalog 130, rule-based topic/industry algorithm and NLP. Otherwise, the process ends at step S428.

Figure 9:
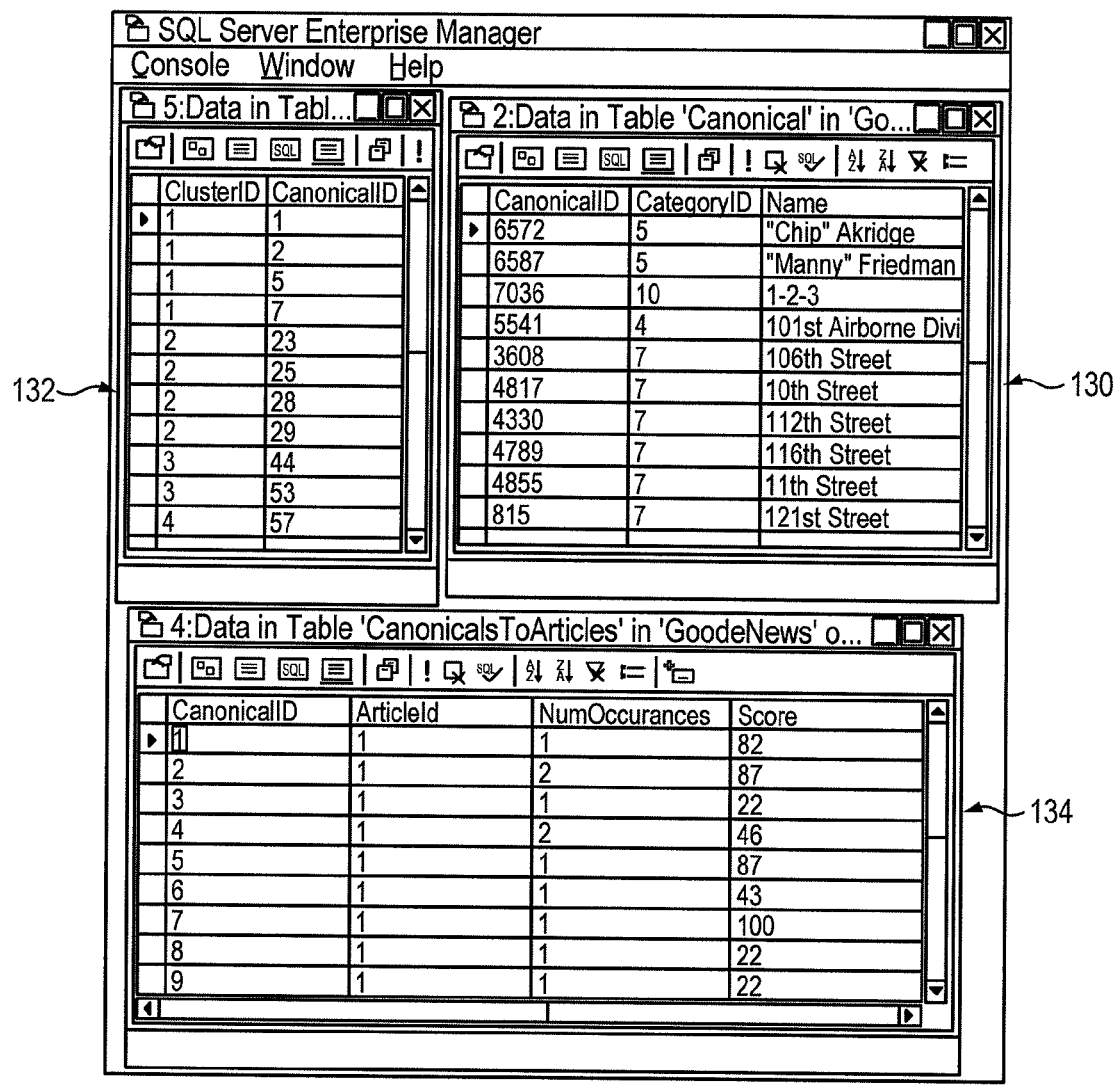
FIG. 9 shows an element score database according to an exemplary embodiment of the invention.

It should be evident that, by iterating through the process 400, each document cluster can be matched to an element identified in the document cluster. For example, FIG. 9 shows a document cluster/canonical database 132 that lists document clusters identified by Article Cluster IDS along with Canonical IDS matching the name entities identified in the document clusters. The database 132 can then be used in conjunction with the name catalog 130 and the document cluster database 131 to generate an element score database 134, as shown in FIG. 9. The element score database 134 may list, among other things, the Article ID corresponding to each document, along with the entity name elements appearing in each document, the number of occurrences of each entity name element in each document, and the score of each entity name element in each document.

In an alternative embodiment of the invention, duplicate articles may be determined after all the elements are identified in all the articles retrieved by the system 104. For example, if each article in a group of articles have the same or similar elements, and those same or similar elements have the same or similar score, then those articles may be grouped under a single article cluster. In other words, if each article in the group of articles contain similarly scored elements, then it can be assumed that those articles are identical.

Figure 10:
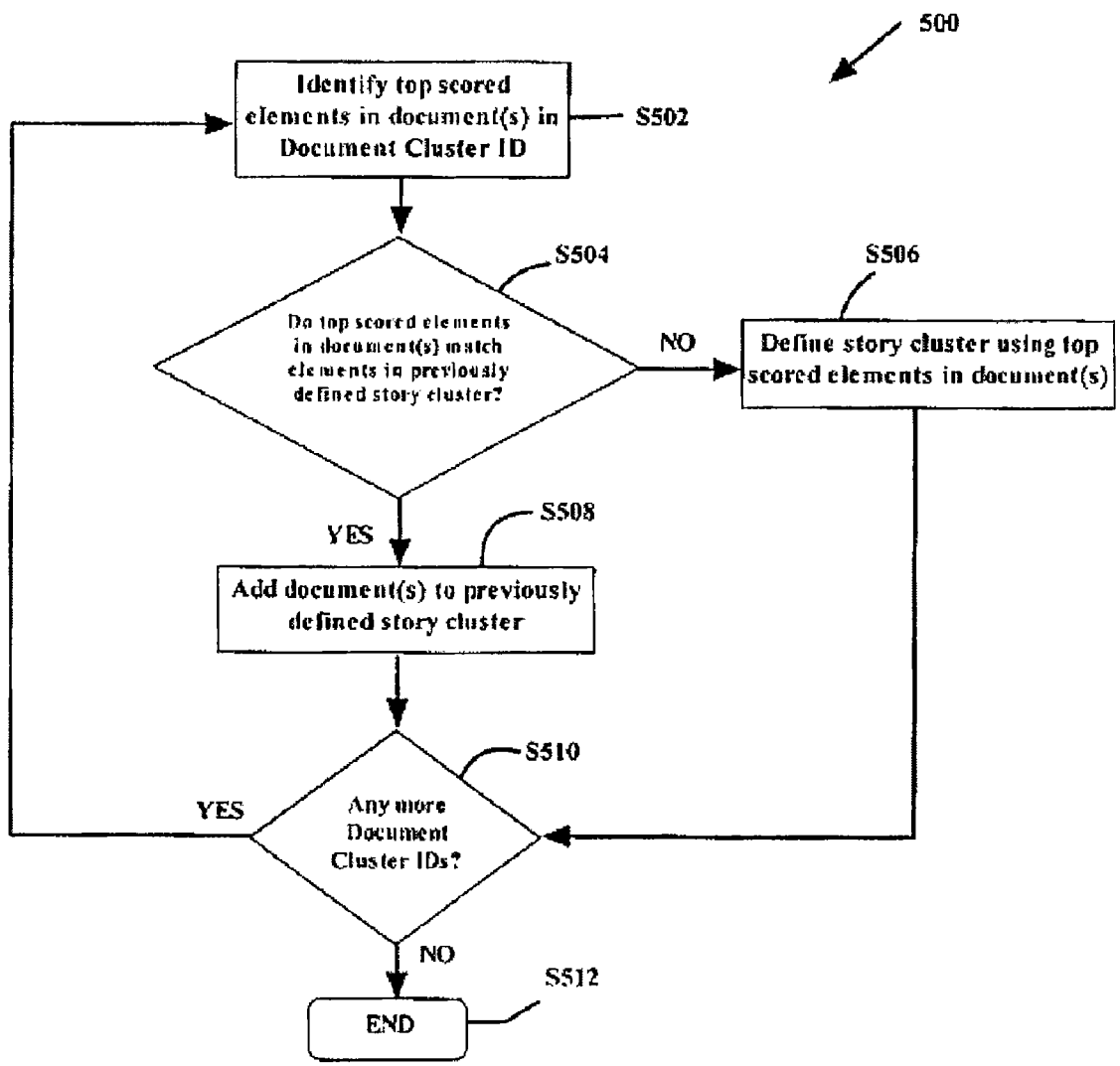
FIG. 10 is a flowchart showing various steps of a process for clustering documents to form stories according to an exemplary embodiment of the present invention.

An electronic document story engine 136 "clusters" related documents to form "stories". Story clusters may include, for example, multiple instances of different press covering the same news item. For example, if the documents are news articles, a number of the news articles may be commonly related to "Iraq" "oil" and "gasoline prices", in which case these news articles may be grouped under a story identified by the common elements. FIG. 10 shows a process 500 for clustering documents to form stories according to an exemplary embodiment of the invention, as implemented by the document story engine 136. In step S502 of the process 500, the top scored elements in a document cluster is identified using the element score database 134. For example, elements in the document cluster having a score above a predetermined score may be identified as "top" elements in step S502. In step S504, where it is determined whether the top scored elements in the document cluster match the elements which define a previously generated story cluster. If so, the document cluster is added to the previously defined story cluster at step S508. Otherwise, a new story cluster is generated and defined using the top scored elements in the document cluster at step S506. At step S510, it is determined whether there are any more document clusters. If so, the process 500 returns to step S502, where the top scored elements in the next document cluster are identified. Otherwise, the process 500 ends at step S512.

It should be evident that, by iterating through the process 500, any number of story clusters can be generated which are made up of document clusters and defined by the top elements in the document clusters. The story cluster having the most documents may be considered a "top story". Thus, for example, under each navigational element, the top stories may be listed first and duplicate stores may be eliminated.

Figure 11:
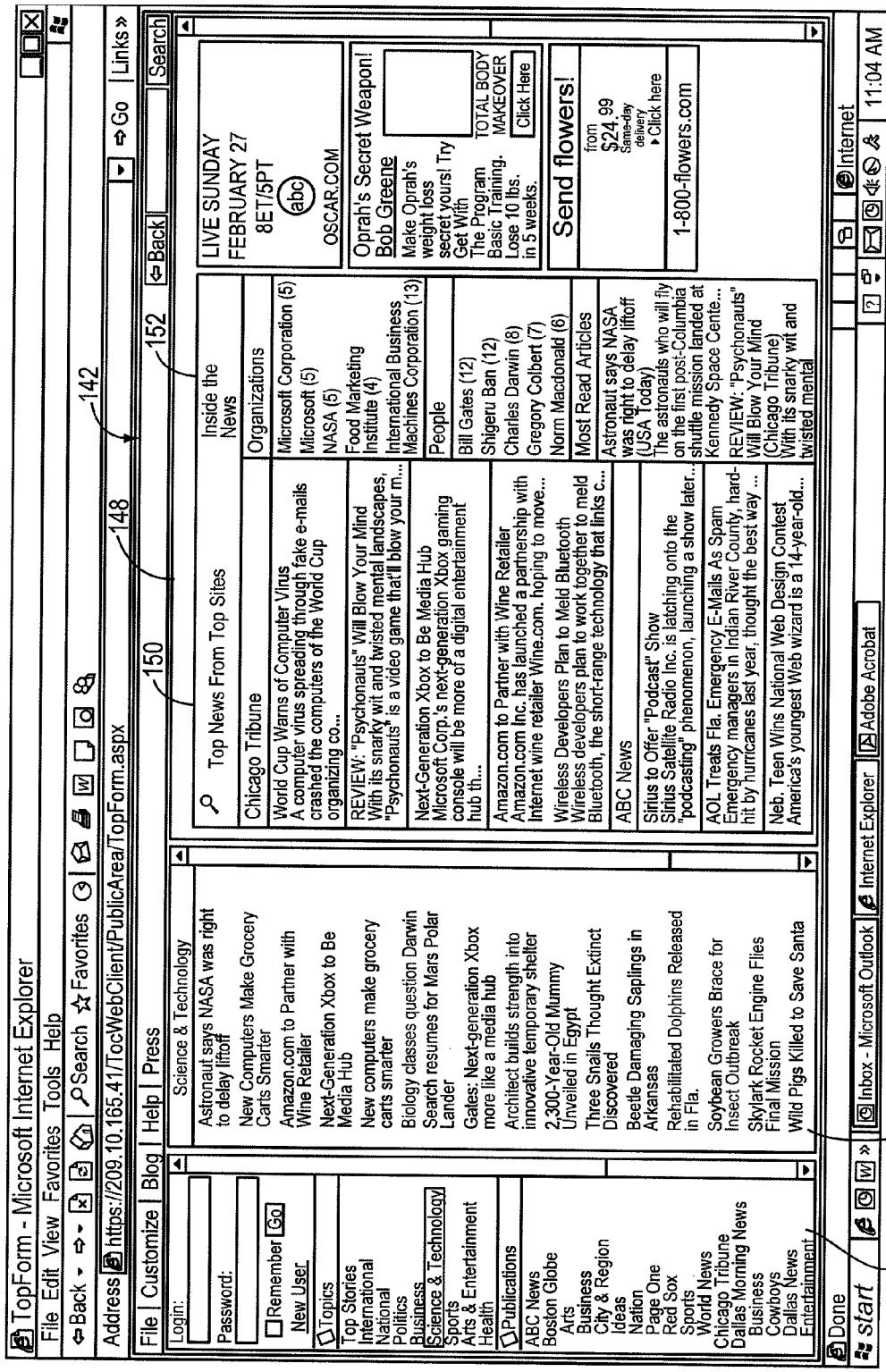
FIG. 11 is a screenshot of a main navigational page according to an exemplary embodiment of the present invention configured with a navigational element selected.

A display generator 140 uses the variety of information regarding the publications and documents retrieved and stored in the databases discussed above to generate navigational screens for viewing by a system user at a client computer 102. For example, FIG. 11 shows a main navigational page 142. The main navigational page 142 includes a first sidebar 144 that provides a list of "Topics" and "Publications". The "Topics" list includes "Top Stories" along with each of the previously mentioned navigational elements 202. The "Publications" list includes a list of selected publications, such as, for example, ABC News, Boston Globe, etc. A second sidebar 146 is disposed adjacent to the first sidebar 144. The contents of the second sidebar 146 depend on the user's selection from the list of "Topics" and "Publications". For example, if the user selects the "Science & Technology" navigational element from the "Topics" list, the second sidebar 146 is generated with a title of "Science & Technology" and populated with a list of articles related to this category using the document link database 120. That is, the display generator 140 retrieves the titles of all documents in the document link database 120 that fall under the "Science & Technology" category, and displays the titles in the second sidebar 146, as shown in FIG. 11. A hyperlink to each document is provided using the URLs of the documents listed in the document link database 120.

Similarly, if a user selects the "Top Stories" navigational element, the second sidebar 146 is generated with a title of "Top Stories". Articles from the story clusters having the most amount of article clusters are preferably listed in the "Top Stories" sidebar. Which articles are chosen to represent each "top story" in the list may be controlled by the system administrator. For example, only the first article that forms each "top story" cluster may be included, only the most recent article in each "top story" cluster may be included, or only articles from a particular publication in each "top story" cluster may be included.

Figure 12:
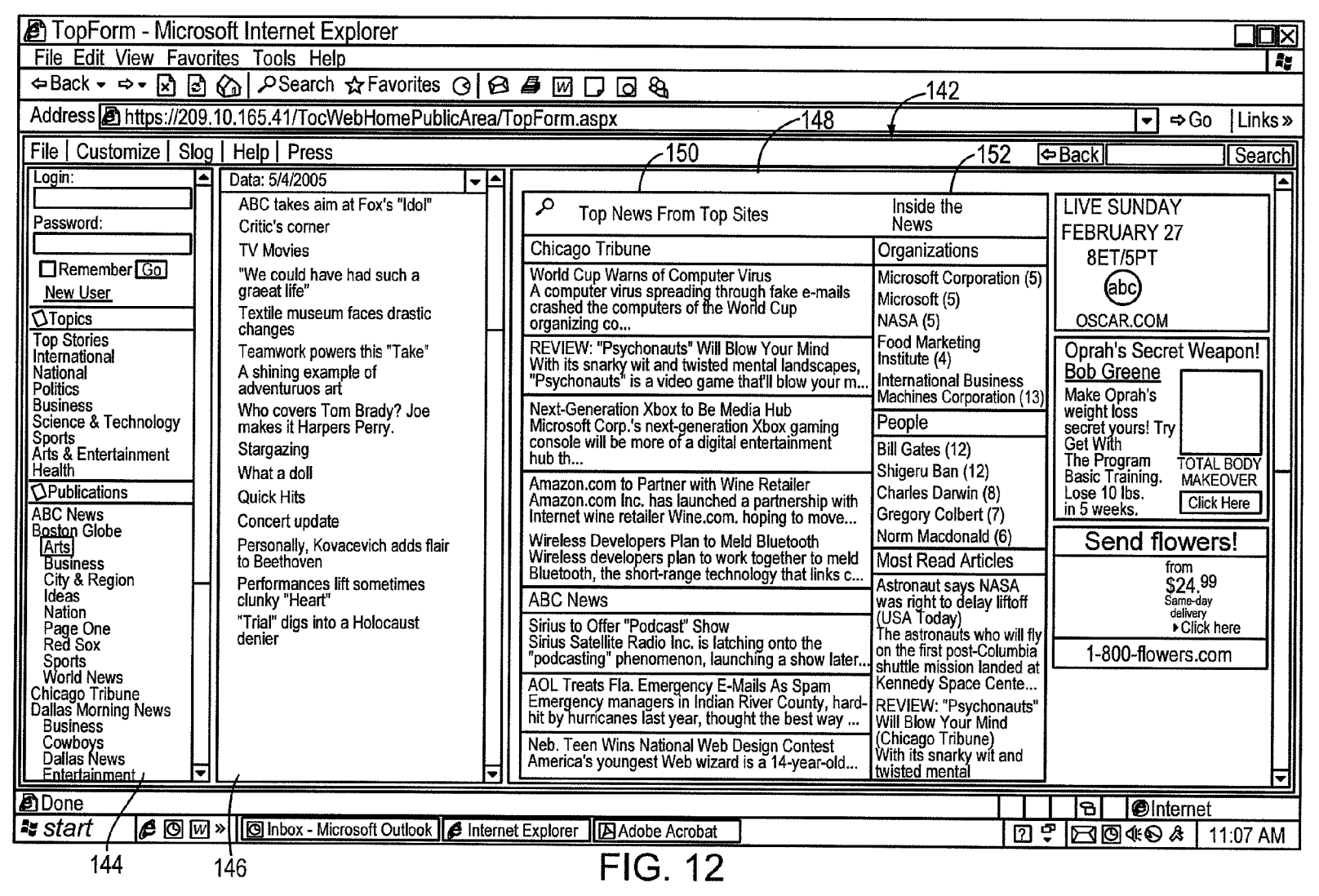

If a user selects one of the publications from the first sidebar 144, a submenu appears below each publication listing which allows the user to further select a particular section of the publication. Once the user selects a section of a publication, the display generator 140 retrieves all the articles in the particular section using the document link database 120 and displays the title of each document in the second sidebar 146. For example, as shown in FIG. 12, the user has selected the "Arts" section of the Boston Globe in the first sidebar 144, and thus the second sidebar 146 displays all the articles from this particular section.

The main navigational page 142 also provides a main display section 148 that initially includes a first main display sub-section 150 entitled "Top News From Top Sites" and a second main display sub-section 152 entitled "Inside the News". The first main display sub-section 150 lists the articles from particular publications that are related to the navigational element selected by the user. For example, if the user selects "Science & Technology", for each particular publication, the display generator 140 may retrieve the titles and first few words of the articles related to this category using the document link database 120 and displays the titles in the first main display sub-section 150. A hyperlink to each document is provided using the URLs of the documents listed in the document link database 120. Which publications to be listed in the first main display sub-section 150 may be chosen by the system administrator. In this regard, a publisher may pay a fee for their publication to be listed in the first main display sub-section 150, and/or pay a fee for their publication to be listed at the top of the list.

The second main display sub-section 152, entitled "Inside the News", provides an indication of which elements are appearing most in today's news. The system 104 may review all the articles under a particular navigational element, and determine the most frequently mentioned elements. The "Inside the News" section displays these elements, along with a count of how many times they appear and, for each element, a link to all articles that mention the element. In an embodiment of the invention, a section of the main display 148 may provide a list of the most popular articles, which may be determined by tracking the number of times articles are selected for viewing. In this regard, the system 104 may maintain an activity log for each user.

Figure 13:
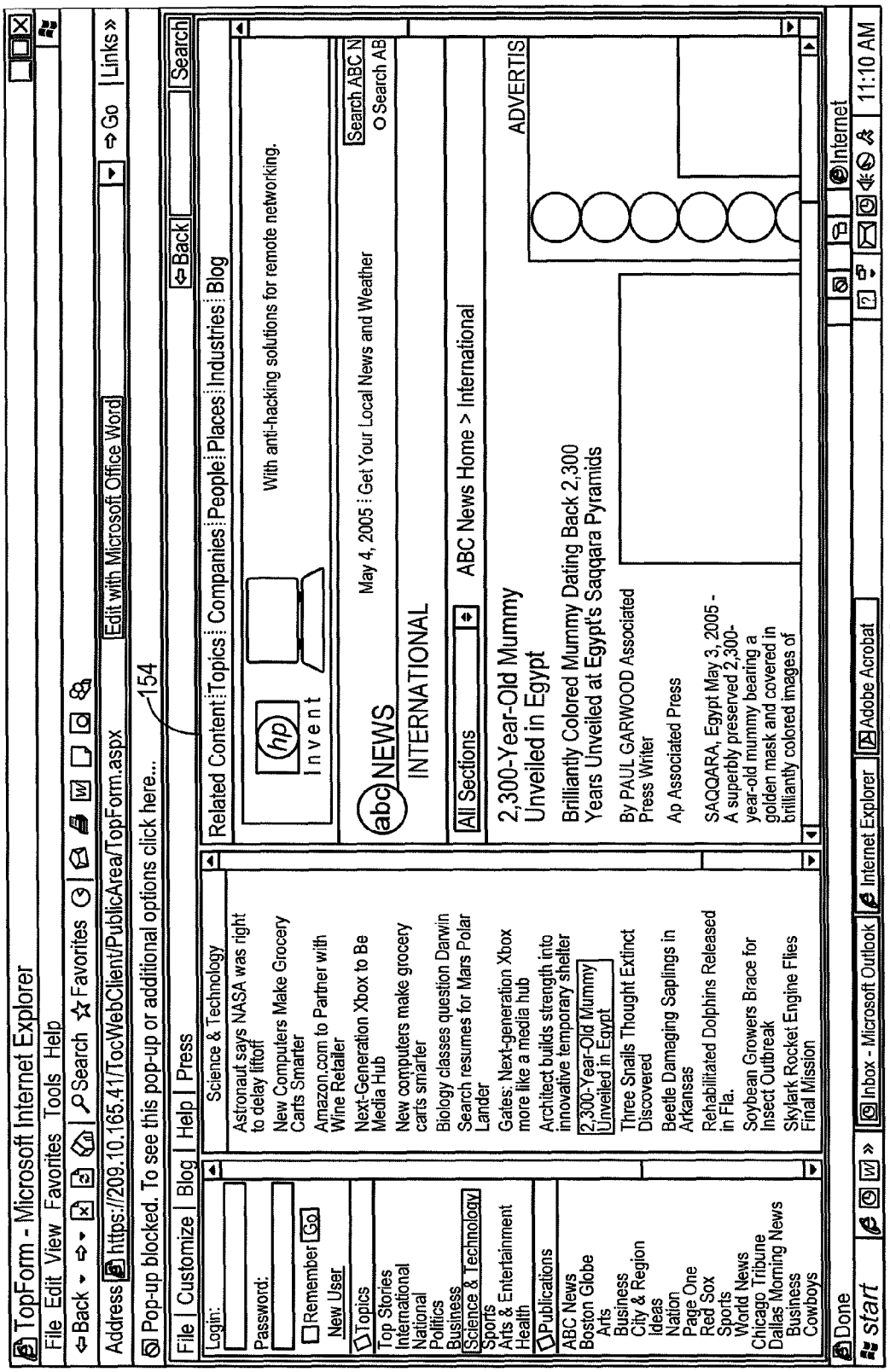
FIG. 13 is a screenshot of a main navigational page according to an exemplary embodiment of the present invention configured with an article selected for viewing.
Figure 14:
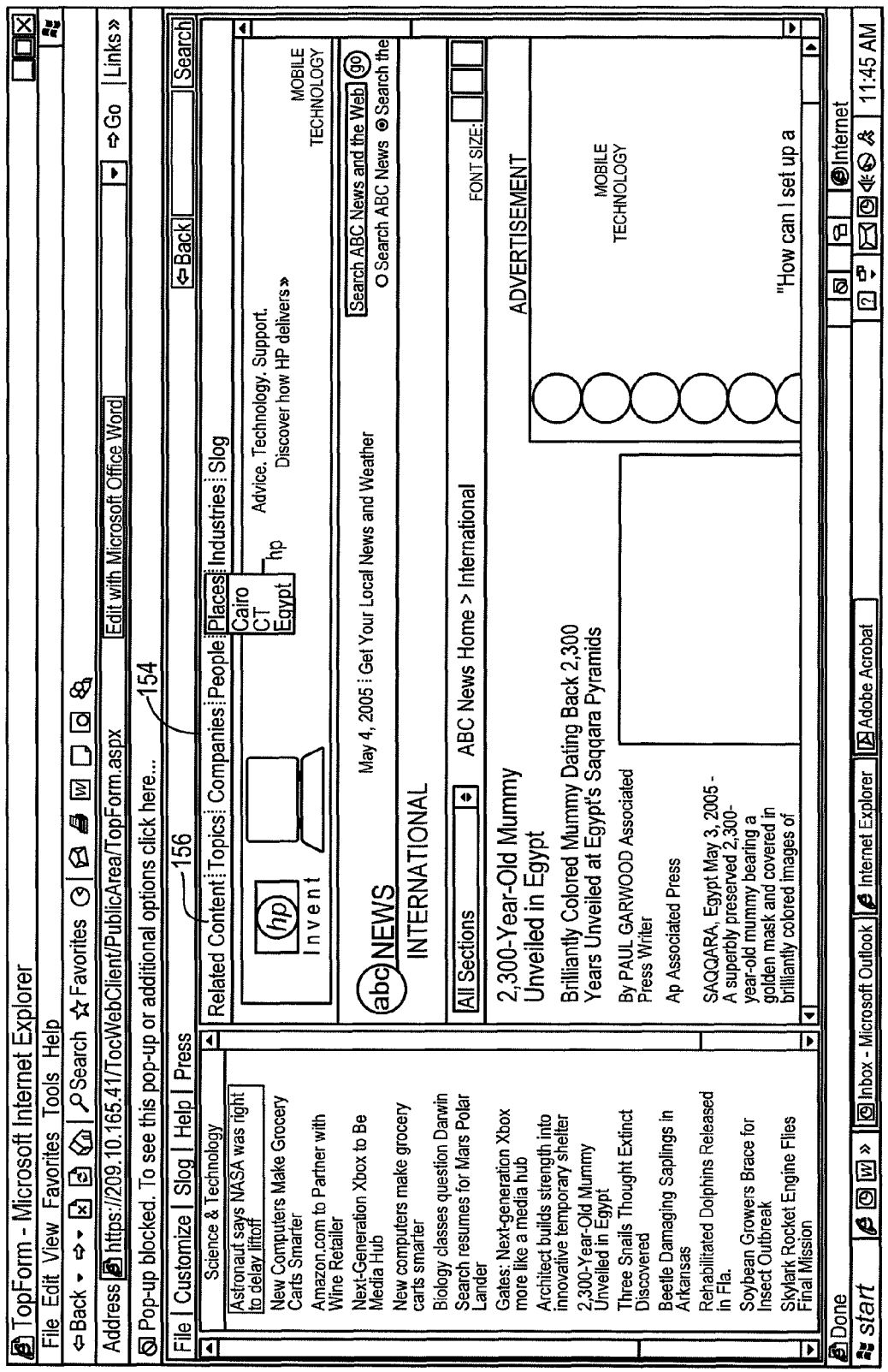
FIG. 14 is a screenshot of a main navigational page according to an exemplary embodiment of the present invention configured with an element pulldown menu selected.

When a user selects any one of the articles in the second side bar 146, first main display sub-section 150 or second main-display sub-section 152, the display generator 140 retrieves the article using the URL listed in the document link database 120, and displays the article in the main display section 148. For example, as shown in FIG. 13, the user has selected the article entitled "2,300-Year-Old Mummy Unveiled in Egypt" in the second sidebar 146, and thus the main display section 148 now displays the full text of that article. Pull-down menus 154 are provided above the article within the main display section 148. A pull-down menu 154 is provided for each element category (i.e., "Topics", "Industries", "People", "Places" and "Companies"). The element category pulldown menus 154 are populated using the element score database 134. For example, as shown in FIG. 14, when a user selects the "Places" pull-down menu, a list of elements in the article categorized as a "place" is provided using the element score database 134. In this particular example, the entity name elements "Cairo", "CT" and "Egypt" appear in the article, and thus these elements are listed in the "Places" pull-down menu. In at least one embodiment of the invention, only the elements having a score above a predetermined score is listed in each pull-down menu.

A "Related Content" button 156 may also be provided above the article within the main display section 148. Selecting the "Related Content" button results in a display of a list of articles and corresponding links that are similar to the currently viewed article. For example, the system 104 may determine that another article is similar to the currently viewed article if the elements in the other article match a certain percentage of the top elements in the currently viewed article.

Figure 15:
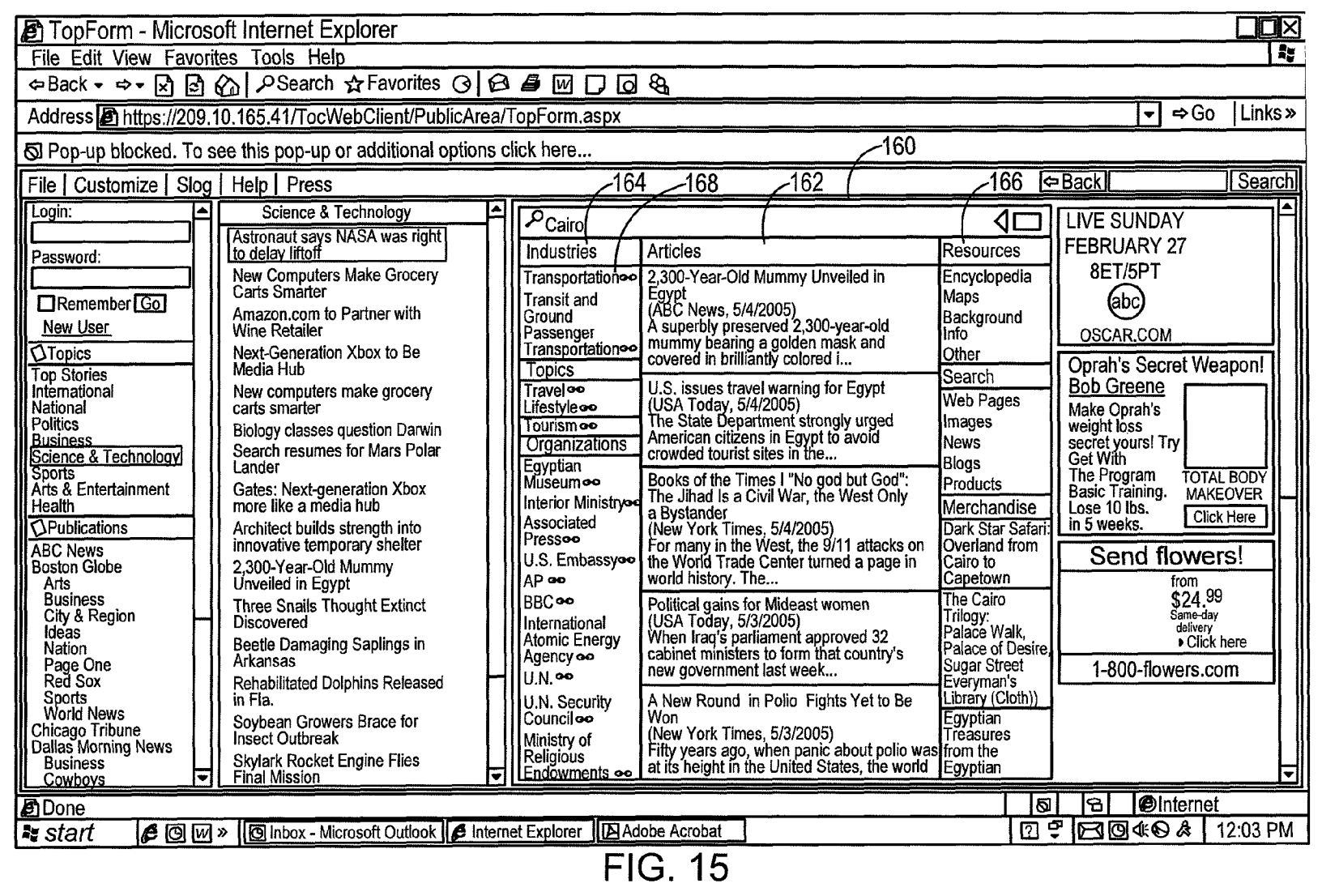

As shown in FIG. 15, when a user selects one of the elements from a pull-down menu, a knowledge discovery display 160 appears in the main display section 148. The knowledge discovery display is preferably entitled with the element of interest selected from the pull-down menu 154. Thus, as shown in FIG. 15, since the user has selected "Cairo" for further knowledge discovery, the knowledge discovery display 160 is entitled "Cairo". The display generator 140 retrieves articles which include the element of interest using the information provided in the element score database 134 and populates the knowledge discovery display 160 with the titles of and corresponding hyperlinks to the articles. These related articles may be listed under a related articles section 162 of the knowledge discovery display 160, as shown in FIG. 15. Also, using the time/date listed in the document link database 120 in conjunction with the element score database 134, the display generator 140 may select only the articles that are dated within a specified time frame and which include the element of interest. An example of code that may be implemented to retrieve articles within a specified time frame and which include an element of interest is provided below in Listing 2.

Listing 2: Exemplary code for retrieving articles dated within specified time period and which include element of interest.

```
CREATE PROCEDURE dbo.FasArticlesRelatedToCanonical
@CanID int
AS
declare @count int
set @count = (select count (distinct DocumentID) from Entity where CanonicalID = @CanID)
if (@count> 15)
begin
set @count= (select count(distinct DocumentID) from Entity where CanonicalID = @CanID and relevance
> 85 )
if (@count>15)
begin
print 'Good results'
select top 15 Identifier, Title, DateAdded, PublicationName, Substring(ArticlePrinterFriendlyContent, 1,
100) AS Subtext
from document, Articles, Sections, Publications where Articles.SectionID=Sections.SectionID AND
Sections.PublicationID = Publications.PublicationID AND Articles.ArticleID=Document.Identifier AND
DocumentID in
    (select Distinct top 30 DocumentID from Entity where CanonicalID=@CanID and
    relevance >85 order by DocumentID desc)
    and Title not in (
    select distinct Title from document where DocumentID in
    (select Distinct top 30 documentID from Entity where CanonicalID=@CanID and
    relevance >85 order by DocumentID desc) group by (title) having count(title) > 1)
    ORDER BY Identifier DESC --Jack
end
else
begin
    print 'semi good results'
```

```
select  top  15  identifier,  Title  DateAdded,  PublicationName,
Substring(ArticlePrinterFriendlyContent, 1, 100) AS Subtext
from document, Articles, Sections, Publications where Articles.SectionID = Sections.SectionID
AND
Sections.PublicationID=Publications.PublicationID AND Articles.ArticleID=Document.Identifier
AND DocumentID in
    (select Distinct top 30 documentID from Entity where CanonicalID=@canID order by
DocumentID desc)
    and Title not in (
select distinct Title from document where DocumentID in
(select Distinct top 30 documentID from Entity where CanonicalID=@CanID
order by DocumentID desc) group by (title) having count(title) > 1)
ORDER BY Identifier DESC --Jack
```

The order of articles related to the element of interest listed in the knowledge discovery display 160 may be determined using an algorithm that uses a variety of factors, such as, for example, recentness of the article, credibility of the source, and whether a publisher pays a fee for higher placement of the article on the list. The importance of an article to a user is correlated to the credibility of the source. Publications and/or authors may be tiered into different levels of credibility. Credibility may be determined by, for example, (i) the system administrator's decision as to what is credible, (ii) publicly available circulation or readership statistics and/or (iii) user ratings, which may be aggregated through a feedback mechanism on the site. Formula 1, provided below, may be used to determine the order of displayed articles.

$$\text{Article Order}=[(\text{Recentness})(\text{Weight})]+[(\text{Relevance})(\text{Weight})]+[(\text{Article Credibility})(\text{Weight})] \quad (1)$$

$$\text{Recentness}=10-\{(\#\text{hours old individual article})[(\text{base value of }10)/(\#\text{hours oldest article in subset published})]\}$$

$$\text{Relevance}=10-\{(\text{confidence value of individual article})[(\text{base value of }10)/(\text{lowest confidence value in subset of articles})]$$

$$\text{Credibility}=10-\{(\text{tier})[(\text{base value of }10)/(\text{total \# of tiers})]\}$$

X=Standard deviation threshold
Y=Number of articles to be displayed in the menu bar
Z=Minimum confidence value All articles with a relevance value of >X standard deviations from the mean are displayed. The order in which the articles are displayed is determined by using Formula 1, so that the article with the highest article order score is listed first. If <Y number of articles are displayed, the top Y articles will be displayed unless article values dip below Z confidence value. The list of entities can also be manually resorted by recentness, relevance or credibility. The credibility score for publications which pay for placement may be increased in order to surface the articles from those publications to the top of the list.

In an embodiment of the invention, the order of articles may be determined using a "step down" function, where, for example, the system 104 first determines those articles in which the element of interest has a relevance score equal to 100, and then determines those articles in which the element of interest has a relevance score equal to 99, and so on. In order to minimize computing time, the system 104 may be programmed to stop searching for additional articles after a certain number of articles are found which have a score equal to a predetermined score.

The knowledge discovery display 160 also includes a table of contents section 164. The table of contents section 164 provides a list of elements besides the element of interest that appear in the list of articles provided in the related articles section 162. The display generator 160 retrieves the elements in the related articles using the element score database 134, determines the top elements in each category, and displays the top elements organized by category in the table of contents section 164. In the example shown in FIG. 15, the display generator 160 determined that the elements "Travel", "Lifestyle" and "Tourism" are the top elements in the related articles, and thus these elements are listed under the category of "Topics". An element may be determined to be a top element in the collection of related articles based on various factors, such as, for example, prevalence of the element in the articles, and where the element appears in the articles. An exemplary code used to determine a top element is provided below as Listing 3.

Listing 3: Exemplary code for determining a top element.

```
@CanID int
AS
DECLARE @iDocID int
DECLARE @Mycursor CURSOR
DECLARE @rcl int
DECLARE @count int
DECLARE @relevance int
SET @relevance =85
DECLARE @status int
ser @status=0
DECLARE @numResults int
set @numResults=10
SET @Mycursor = CURSOR FAST-FORWARD
FOR
SELECT DISTINCT TOP 9 DocumentID FROM Entity
WHERE CanonicalID=@CanID AND Relevance > 65
ORDER BY DocumentID DESC
OPEN @Mycursor
FETCH NEXT FROM @Mycursor
INTO @iDocID
CREATE TABLE #tmpResults1(CanonicalID int. DocumentID int)
    WHILE (@@FETCH_STATUS = @status)
    BEGIN
        INSERT INTO #tmpResults1
        SELECT DISTINCT CanonicalID, DocumentID
        FROM Entity WHERE DocumentID=@iDocID AND
Relevance > @relevance AND CanonicalID <> @CanID
AND CaregoryID in (9,17,12,20,22,19)
```

In an embodiment of the invention, the relatedness of an element to a selected element may be based on, for example, the frequency with which both elements appear together in articles, the recentness of the article in which the two elements appear and the relevance of the two entities to the articles in which they appear. The method for determining the order of displaying the related elements in the table of contents section 164 may be based on Formula 2, provided below.

$$\begin{aligned}\text{Element Order} =& [(\text{Article 1})(\text{Average relevancy}\\&\text{value*weight})(\text{recentness of article*weight})] +\\&[(\text{Article 2})(\text{Average relevancy value*weight})\\&(\text{recentness of article*weight})] + [(\text{Article 3})(\text{Average relevancy value*weight})(\text{recentness of}\\&\text{article*weight})]\end{aligned} \quad (2)$$

$$\text{Recentness} = 1 - \{(\text{\#hours old individual article})[(\text{base value of 1})/(\text{\#hours oldest article in subset published})]\}$$

A=Relevancy value for evaluating entities
B=Number of entities to be displayed
C=Lowest acceptable relevancy value The subset of articles containing the selected element and all other elements having a relevancy value over A are evaluated. If the number of elements with a relevancy value over A is less than B, then the relevancy value will drop to a minimum of C until B elements are obtained. Formula 2 is then used to determine the element order for each element that appears with the selected element in a number of articles. The top B or less elements are then displayed in the table of contents section 164.

The knowledge discovery display 160 may also include a related links section 166 that provide links to third party resources. The related links section 166 may include, for example, links to research resources such as encyclopedias and maps, links to search pages, and links to merchandise related to the element of interest. In this regard, the element of interest is preferably automatically supplied as an input to the third party resource, so that in the above example, when a user selects the "Maps" link, for instance, the system 100 may link the user to the map resource, which then displays a map of Cairo.

Figure 16:
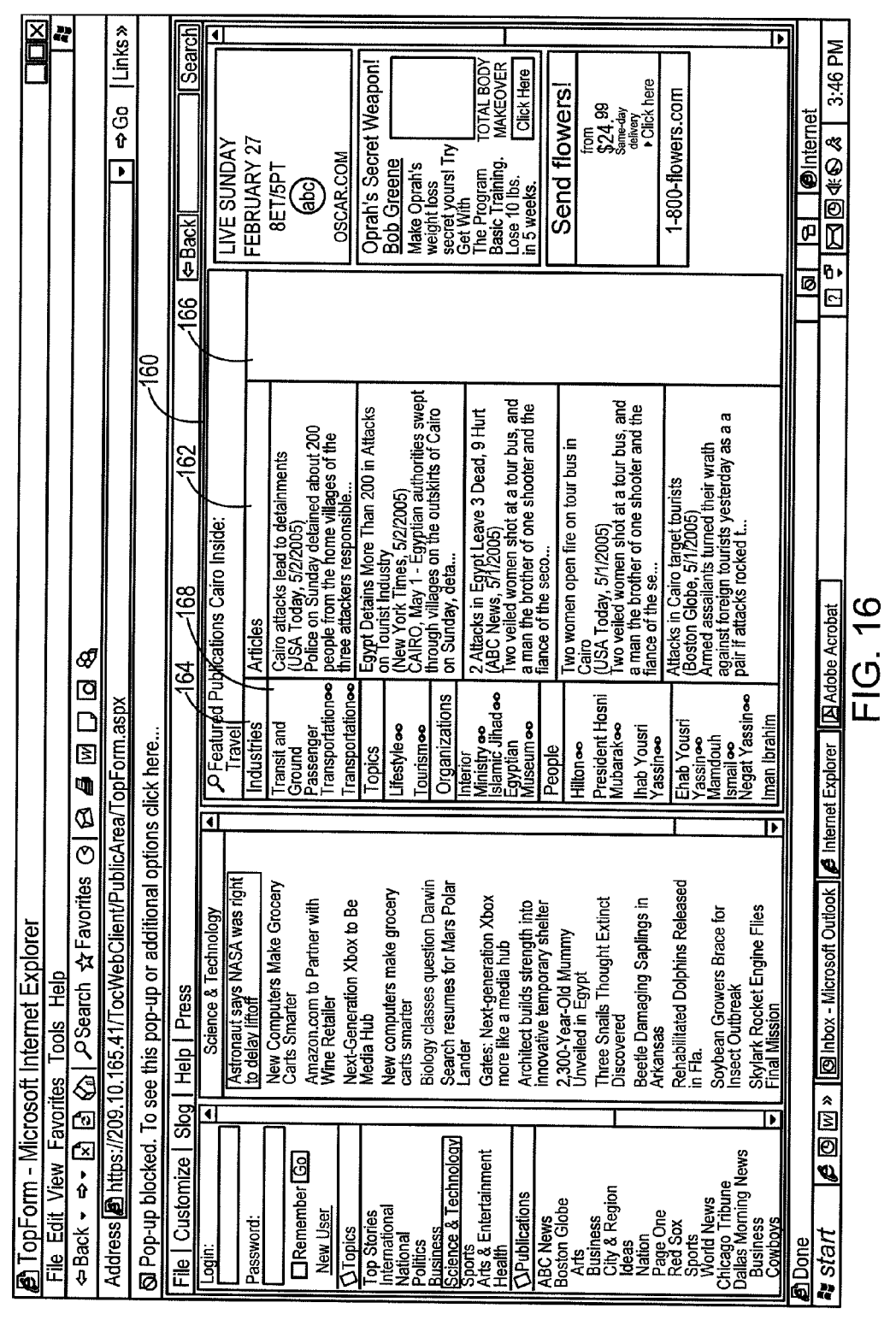

The knowledge discovery display 160 may also allow the user to "link" the element of interest with elements in the table of contents section 164 of the knowledge discovery display 160 to generate another knowledge discovery display screen relating to the linked elements. In this regard, a link symbol 168 may be provided adjacent to each of the elements in the table of contents section 164. In order to link the element of interest with another element in the table of contents section 164, the user selects the link symbol 168 next to the element in the table of contents 164. In the above example, for instance, if the user selects the link symbol 168 adjacent to the "Travel" element in the table of contents section 164, the display generator 140 generates a new knowledge discovery display 160 based on the linked elements of interest, "Cairo" and "Travel", as shown in FIG. 16. This new knowledge discovery display 160 then allows the user to view articles related to the new linked elements of interest, link the linked elements of interest to other elements in the new table of contents section 164, and have access to third party resources related to the linked elements of interest.

Based on the above description, it should be apparent that a user is able to perform top level research on a topic by, for instance, simply viewing the information and documents provided in the knowledge discovery display 160 for the topic, or more in-depth research by, for instance, linking the topic to other topics in the table of contents section 164 or by accessing third party resources. Thus, the system 100 allows a user to easily perform guided research on a particular topic by providing access to various related topics and by displaying ordered documents related to the particular topic. In at least one exemplary embodiment of the invention, the user is given control over the type of content that is displayed in the knowledge discovery display 160. For example, a radio control button may be provided to allow the user to select from "editorialized content", "blog content" or "both". If the user selects "blog content", for instance, only blogs related to the element of interest are displayed in the knowledge discovery display 160, and the table of contents section 164 is updated accordingly. In another embodiment, the user can select how to reorder or view subsets of documents. For example, the user may choose to order the documents by relevance or based on date. Further, the user may be provided the ability to limit the documents shown to only those retrieved from publication to which the user subscribes.

The system 100 may be modified to provide additional features, which may be accessible to a user by logging in using a login ID and password, for example. As an example, a user of the system 100 may "subscribe" to web publications. The index page database 210 may be used to power the subscription engine, so that a user can select any combination of sections and publications. For example, the user may select the Business and the Sports section of the New York Times and the Marketplace section of the Wall Street Journal. Based on the user's selections, an inbox may be provided for the user that provides the documents from the index pages of interest.

Also, a user may create and/or subscribe to interest "channels", which provide links to documents related to the particular interest on a regular basis. In this regard, interests can be identified by (i) the user choosing a predefined channel such as "Exotic Travel" or "Golf", (ii) the elements of interest selected in a knowledge discovery display 160 (which creates a channel based on the elements of interest) or (iii) the user "building" a channel from scratch. When building a channel from scratch, for instance, the user may input a keyword and the system 100 then suggests all of the already "codified" elements that the user might be referring to using the aliases and definitions in the name catalog 130 and topic/industry rule database 130. It is advantageous for the user to then select an element for inclusion rather than running a keyword search so that all of the rules and aliases will be used in finding content of interest for the user. For example, a user wishing to set up a channel for Bill Clinton is given the opportunity to also select the canonical William Jefferson Clinton for inclusion in the channel, which would result in inclusion of all other aliases of the canonical, such as William Clinton, President Clinton, etc.

The interest channels may also be used to enhance the users experience in other ways. When the user is logged in but not looking at an interest channel, the user's reading experience may be prioritized based on the user's predefined interest channel. For example, if the user is looking at the Business section of the NY Times (as a subscribed publication), the background of an article may be shaded red if the article also happens to match the criteria the user has entered for one of their interest channels. Additionally, other articles that may be of interest to the user based on (i) topics related to the user's interest channels, (ii) topics related to the articles viewed by the user in the past, (iii) other user activities, such as previous knowledge discoveries initiated by the user or articles forwarded by the user, or (iv) which articles or topics other users with similar interests as the user have read, forwarded or otherwise taken in interest in, may be shaded pink, suggesting that these articles are less relevant than those with a red background but likely more relevant than those with a regular white background.

As an example of another feature, a user of the system 100 may have the ability to set up community channels in order to re-distribute content. For example, a user may select articles as they are discovered for inclusion in a community channel. The user may then add a comment to the article or author an article for posting to the community channel. The user's community channel may be assigned a personal web address, so that the user may in essence maintain and publish a personalized publication that relates to a topic of interest. Alternatively or additionally, the community channel may have an RSS feed associated with it, so that other users of the system, or users of a third party RSS reader, may have the community channel pushed to their inbox. Further, multiple users may have the ability to contribute to the same community channel.

The system 100 also provides unique opportunities in behavioral targeting. For example, by tracking a user's use of the system 100, a profile of the user's interests may be generated. Tracking opportunities for a user exist, for example, when the user initially signs up for a login and password, when the user subscribes to publications and interest channels, when the user selects elements of interest from the knowledge discovery display 160 and when the user saves and forwards articles. The user's behavior may be tracked over an extended period of time and stored on servers. Conventional "cross publication" behavioral targeting methods typically use cookies which are stored on the user's computer. This is sub-optimal because users (i) often have multiple computers, (ii) delete their cookies frequently, (iii) may be in work environments that do not allow computers to record cookies and (iv) change their computers from time to time. The information tracked by the system 100 can be used to highlight content of interest for each user (i.e. create a customized online news experience without much effort on the part of the user) and finely target each user for advertising placement. All the data regarding the user's interests may be maintained in a database and used to indicate which documents and/or elements may also be of interest to the user. For example, certain documents and/or elements may be highlighted with another color, indicating that these elements may also be of interest. Such determination can be tested by also tracking whether the user selects a document/element that is indicated to be of interest. If the user does click on it, this is a reinforcement and such interest can be weighted even higher. Data stored in the database may be deleted after a certain period of time if the user has not indicated any further interest in a particular item. Further, the relationship between elements/items in the database generally can be used to suggest items. Such relationships may be created manually (e.g. Odessa is inside Ukraine so interest in Odessa might indicate interest in Ukraine) or by virtue of statistical analysis of the relationships in the database (e.g. Hank Greenberg and AIG are heavily correlated, so interest in Hank Greenberg would suggest an interest in AIG).

The system 100 also provides advantages in ad placement. Whereas some publications (such as the New York Times) and sections (such as Travel) are more valuable for advertisement placement, the system 100 provides advertisement value that is equal to or even greater than that of the original publication. For example, a user reading a NY Times article relating to "exotic travel" on the system 100 may decide to conduct further research on "exotic travel in New Zealand", thereby narrowing down the user's particular interest beyond just "exotic travel" and providing a highly-valued placement opportunity for an ad relating to New Zealand tourism.

The system 100 also allows for delivery to a publisher a database of tagged elements that appear in their articles, as the articles are published. The publisher can then use this metadata to make their article page more of a "hub" for the user of their website. For instance, a publisher can use the information that an article is about "tennis" and "Anna Kournikova" to draw right links on the page such as Upcoming Tennis Matches, List of Ranked Tennis Players, Anna Kournikova's Tennis Record, Pictures of Anna Kournikova and a classified ad for US Open Tickets for Sale. These links enhance the publisher's revenue by providing, for example, a fee based service to the end-user, access to web pages which may provide additional ad placement opportunities, access to web pages which may sell an item for which the publisher shares in the revenue and a more valuable user experience which engenders long-term loyalty.

The system 100 further allows for delivery to a publisher a dropdown menu feature which can be inserted into the publisher's articles. For example, the drop-down menu feature may include categories such as People, Places, Companies, etc., such that when a particular category is chosen, the system 100 can be used to populate the drop down menus. When the user selects an element in the drop-down menu, the system 100 can then return data to the publisher that can be used by the publisher to create additional pages. These additional pages may include lists of articles from that publisher that are related, lists of articles from any selection of publishers that are related, such as other publications under common ownership or of a specific credibility characteristic, or lists of articles from all publishers. The data provided by the system 100 may also be used by the publisher to generate pages similar to the table of contents section 164. Pin-point feeds based on any of the elements in the system 100 may also be delivered to redistributors, thereby allowing them to use the data to populate specific areas of their site.

Figure 17:
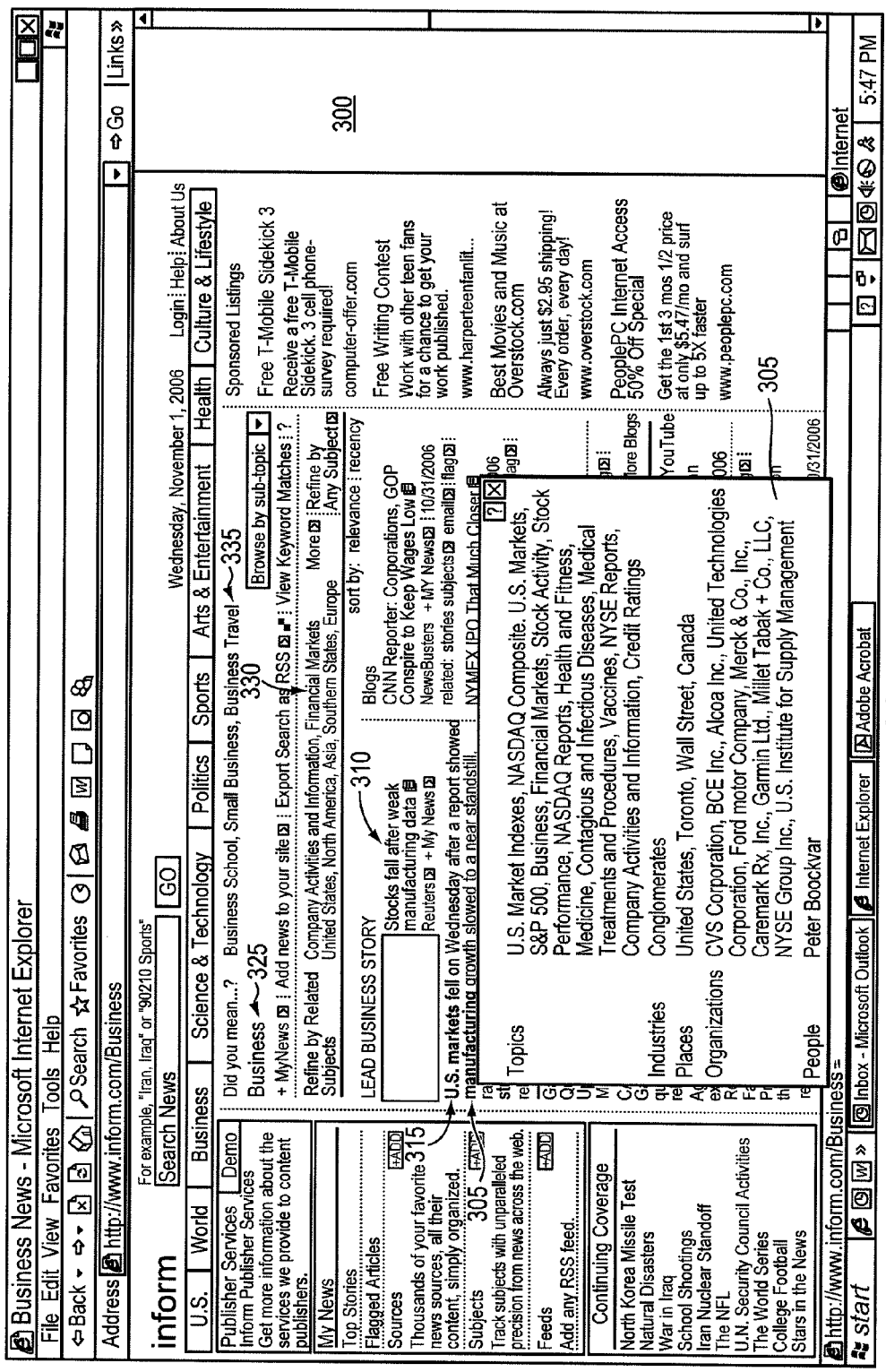

FIG. 17 illustrates an exemplary screenshot 300 which includes a dropdown menu feature 305 which is inserted at the bottom of a publisher's article 310. The article 310 is entitled "Stocks fall after weak manufacturing data" and the publisher is Reuters. When the user clicks on the related subjects link at the bottom of the article, the dropdown menu feature 305 is displayed. The feature 305 includes additional subjects that are related to the article 310. Each of the terms listed in the feature is a link to a search that produces content related to that specific term. For example, if the user selected CVS Corporation in the Organizations element, the system 100 returns articles, blogs, video, and other related content specific to CVS Corporation. The user can advantageously receive content of interest with very few interactions and no entering of search terms. FIG. 18 illustrates an exemplary screenshot 340 which includes a dropdown menu feature 345 which is inserted at the bottom of a publisher's article 350. The article 350 is entitled "Garmin Reports Record Third Quarter: Revises Annual Guidance Upward" and the publisher is MSN Money. The feature 345 includes additional subjects that are related to the article 350 and is different from feature 305. Each feature is populated based on the processing of the content of the article with which that feature is associated.

Referring back to FIG. 17, the article 310 also has highlighted terms US Markets 315 and manufacturing 320. Clicking on these terms also generates a search to find related content based on those elements. Again, while reading the excerpt of the article 310, the user can initiate a search for related content in a single click and without entering a search term.

To arrive at the set of articles displayed in the screenshot 300, the user selected the topic Business, as indicated in area 325. In making the searching of related content simple and quick, the screenshot 30 includes an area 320 to refine the topic and an area 335 to enable manual disambiguation. The area 335 includes "Did you mean?" text, along with the topics business schools, small business, and business travel. These represent slightly different topics that have business in their name, but are more specific. Clicking on any of these changes the displayed articles to articles highly associated with the selected topic.

Figure 19:
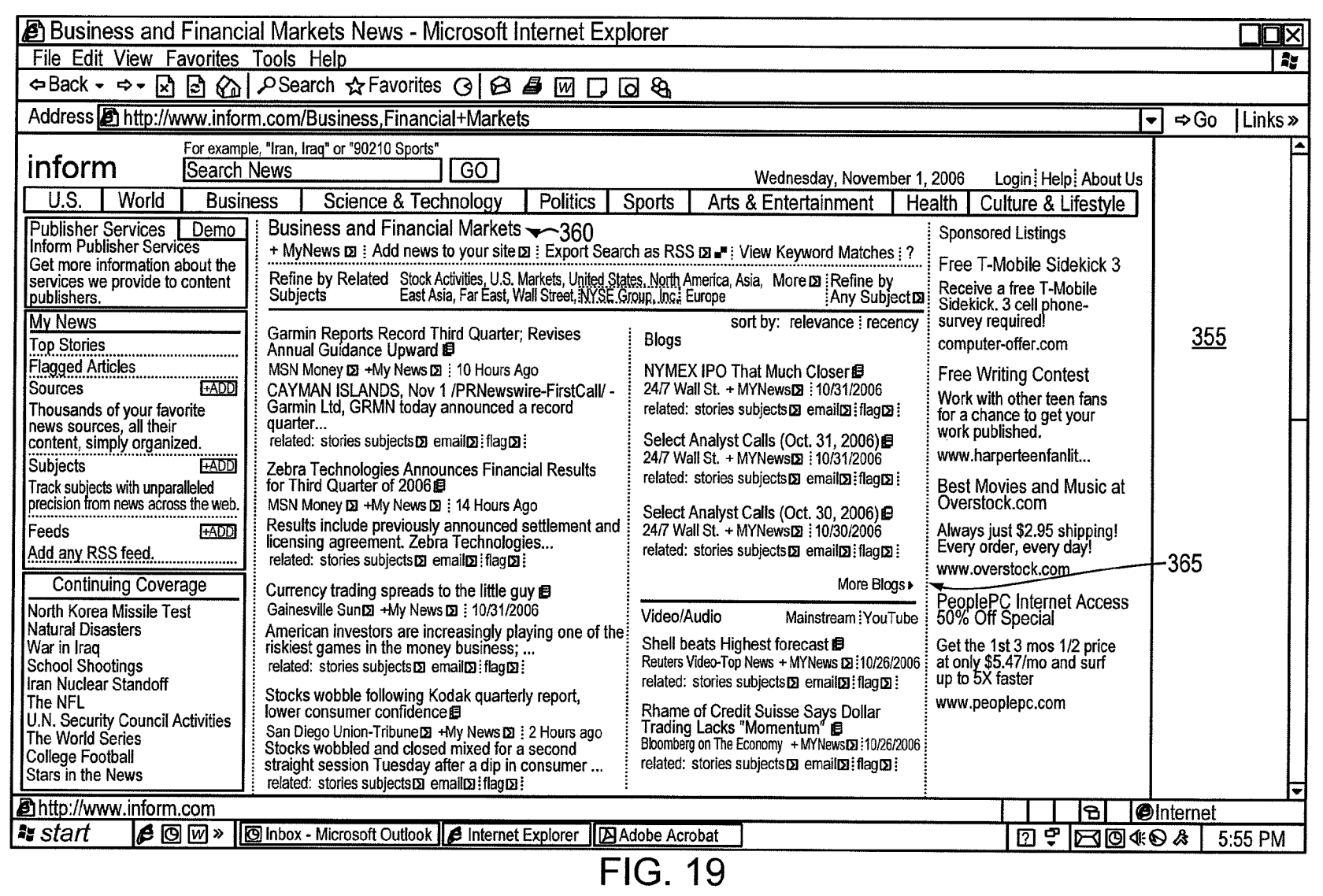

The area 330 allows the user to refine the displayed articles by joining the topic business with a term that the system 100 has found to have a relationship to the topic business, based on the processing of the articles by the system 100. For example, the system 100 can examine the stored tables in the database(s) and determine which elements co-occurred with each other and with what frequency. Then, the highest co-occurrences can be displayed in the area 330 for user selection, since they seem to have a natural relationship based on the processed content. FIG. 19 illustrates a screenshot 355 that is generated when a user selects the "Financial Markets" link in the area 330. Area 360 displays the new joined topic of Business and Financial Markets. Area 365 shows the content (e.g., articles, blogs, and video/audio content) that is related to the new joined topic.

Figure 20:
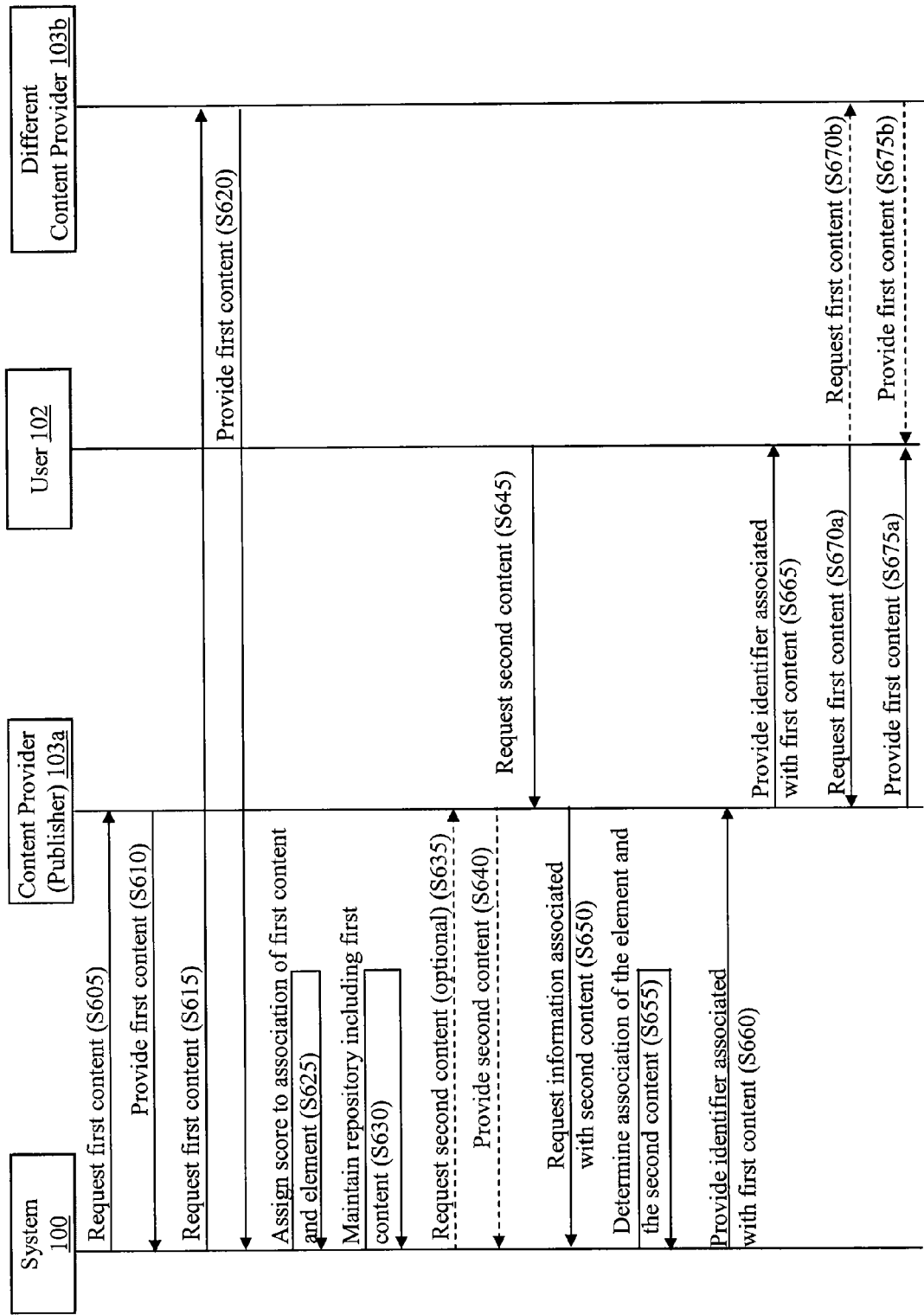
FIG. 20 is a sequence diagram showing the determining and presenting of related content.

FIG. 20 illustrates more specifically various examples of how the system 100 (e.g., through the use of one or more servers 104) can provide (e.g. deliver) the information related to content (e.g., an article), often referred to as related content. FIG. 20 and its respective description use the terms "first content" and "second content" to differentiate between two separate pieces of content, with the second content being the displayed publisher content and the first content being the related content. The use of first and second, however, are simply to differentiate between two pieces of content and no meaning should be inferred to the adjectives first and second. As described above, the system 100 maintains a repository including content. As used herein, content can refer to the data that is displayed on the screen, such as text and images, for example the text of a displayed article, and content can also refer to links to that text and/or images, e.g., hyperlinks and/or URLs associated with text and/or images. As described above, the system 100 can request and receive content and/or links from a primary content provider 103a (e.g., a web site of the publisher), as shown in steps S605 and S610 and/or from a different content provider (e.g., a web site of a party affiliated with the publisher or unrelated to the publisher), as shown in steps S615 and S620. The content provider (e.g., 103a and/or 103b) can be a website, a news web site, a Really Simple Syndication (RSS) feed, a weblog, audio/video provider, and/or any entity that publishes content to the Internet, WAN, LAN, or the like.

As described above, the content, typically the textual portion of the content, is processed to accurately determine what the content is about. As shown in step S625, the processing includes relating the content to one or more elements and determining a score representing the strength of the association between the content and a related element. The elements can include topics, industries, people, organizations, products, and places. Examples of the elements are described herein, for example with the descriptions of FIG. 8 and FIG. 9. In these examples, scores are assigned to the association between elements and content, e.g., the relevance of a particular piece of content to the element and/or the relevance of the element to the piece of content (see, e.g., the CanonicalsToArticles database table 134 depicted in FIG. 9). In some implementations the repository includes elements associated with the content. In other implementations, elements are stored in a separate repository, or separate portion of the repository. The system 100 maintains the first content in the repository as illustrated in step 630. The maintenance can include, for example, keeping track of the date of the first content and deleted the first content from the repository after a certain period of time, for example after a few days. The system 100 can repeat steps S605-S630 for many pieces of content, so that the system 100 can develop a large repository of content, so that the repository includes content that is related to each of the many elements that have been defined by the system 100.

The system 100 can receive the content that the publisher 103a will display (e.g., an article), referred to in FIG. 20 as the second content, in various ways. One way is that the system 100 searches for the second content (e.g., using a web crawler) as the publisher 103a publishes the second content to the network (e.g., posts the article). In this case the "web crawling" is very directed and specific, as the system 100 is watching the content posted by the publisher to immediately detect new postings as they are posted. This is illustrated in steps S635 and S640, marked as optional because this is only one of the possible ways to accomplish this. In this example, once the system 100 retrieves the second content, the system 100 relates the second content to one or more elements and determines a score representing the strength of the association between the content and a related element as illustrated in step S655. As described above, the elements can include topics, industries, people, organizations, products, and places. In some embodiments the association between an element and the second content is implemented by creating an entry in the CanonicalsToArticles database table 134 for the association between the element and the second content, e.g., "article". If necessary, the system creates new elements and assigns the elements to a category, e.g., by creating an entry in the Canonicals table (also depicted in FIG. 9), if the second content is associated with elements not found in the element repository. It is worth noting that the order described for this example is somewhat different than the order illustrated in FIG. 20. As is true throughout the specification, the order of some of the steps described in the processes herein can be changed without departing from the scope and spirit of the inventive techniques described herein.

When a user at one of the clients 102 requests the second content (e.g., clicks on a hyperlink to the associated article), a request is sent to the content provider 103a (e.g., the publisher) for that article as shown in step S645. The content provider 103a begins to generate a web page that includes the requested second content. The content provider 103a makes a request over the network (e.g., the network 106) to the system 100 (e.g., to the server 104 or a web server in communication with the server 104), as shown in step S650. The request can take multiple forms. For an illustrative example, the request is a request for related articles from the publisher's web site as well as from other third party sites. The request includes as an input an identifier (e.g., a URL) of the article (second content) for which the publisher 103a wants related content, in this example, related articles.

Upon receiving this request, the system 100 uses the URL to identify the second content in the repository associated with that URL. In steps S635, S640, and S655, the system 100 had previously analyzed the second content and identified at least one element with which there was a strong association (e.g., high relevancy score). Using that strongly associated element, or a plurality of associated elements, the system 100 searches its repository for other content (first content) that is associated with the same element or plurality of elements. Once the related content is determined, the system 100 provides to the content provider 103a one or more identifiers identifying one or more pieces of content that are related, as shown in step S660. This identifier can include a link, such as a hyperlink or URL, a title of the related article, a date of the related article, a snippet from the related article, and/or the name of the content provider from whom the related article has been obtained.

The content provider 103a receives the one or more identifiers for the related articles and inserts this information into its web page being generated in response to the request from the user 102 in step S645. The content provider 103a serves the web page to the user 102, as indicated in step S665, so the user can view the requested article along with related articles which should be of high interest to the user. The user can then select (e.g., click a hyperlink) a related article of interest and that selected related article will be served by the content provider 103a or a different content provider 103b as applicable and shown in steps S670a, S670b, S675a, and 675b.

When the content provider 103a receives the one or more identifiers for the related articles from the system 100 in step S660, the content provider 103a can cache this information for a certain time period, such as 30 minutes. This provides several advantages. First, the content provider 103a can subsequently process any requests from users for the same article immediately, without having to wait for steps S650 and S660 to be performed, since the results of related articles are now in cache. Second, the system 100 can process requests from other content providers for related content more easily and without congestion since in this example, the content provider 103a is only requesting related content on a periodic basis and not with every request from a user.

An illustrative example of the depicted process of FIG. 20 can be provided using FIG. 14 and FIG. 15. As shown in FIG. 14, the content provider is ABC News and the article selected by the user is titled "2,300-Year-Old Mummy Unveiled in Egypt." Here, ABC News sends a request to the service provided by the system 100 for articles related to this article by providing the URL of the article. The system 100 finds the article in its repository, determines the elements associated with that article and returns to ABC News a list of identifiers for related articles. ABC News displays the identifiers, as shown in section 162 of FIG. 15. The related articles shown are from AC news, the publisher itself, and from other content providers, such as USA Today and New York Times. The request can indicate whether the articles should be limited, such as only related articles from the publisher's web site (e.g., in this case, only from ABC News), such as related articles from the publisher's web site and affiliated web sites, and/or related articles from unrelated third parties. The box of related articles can be generated by ABC News or by the system 100. In the case where the system 100 generates the box, the system 100 returns to the publisher (e.g., in this case ABC News), for example, a customizable HTML/JavaScript block that the publisher can place anywhere in its delivered page.

Typically, the administrator of the system 100 is unrelated to the publisher 103a or any of the other content providers 103 on the network 106. The administrator of the system 100 can provide the services described herein on a contractual basis where items such as cache time and a maximum number of articles processed per day can be defined. In many examples, the system 100 provides these services using a web services paradigm. In such examples, the services can be defined using the Web Services Description Language (WSDL).

The form of the request to the system 100 and the information returned in response to a request can take on several variations. One variation is how the second content (e.g., the article that is being displayed) is identified to the system 100. In the description above with respect to FIG. 20, the URL of the second content was provided to the system 100 and the system 100 matched that URL to an article the system 100 had previously retrieved and processed (e.g., optional steps S635, 640, and step 655). As an alternative, the system 100 can receive the text of the article as part of the request (e.g., step S650). In such examples, the system 100 receives the text of the article and processes that received text to determine associated elements as indicated in step S655.

The requests can include a token used by the system 100 to authenticate and track the requests. Typically the value of the token parameter used in the request is provided to the publisher from the administrator of the system 100. The requests can also include a search prefix. The search prefix is a hyperlink prefix to a search engine on the publisher's web site that the service 100 can append as a prefix to one or more elements associated with an article to generate predefined search strings specific to a publisher's web site that the publisher can use to enable a user to find related content on the publisher's web site.

The form of the requests can vary. For example, different method calls can be used to make a request, where each result in different information being returned. For example, one request can be of the form ExtractAll(int Token, string ArticleText, string SearchPrefix), where Token is an integer representing the provided token, ArticleText is a string of actual text that the system 100 processes upon receipt, and optional SearchPrefix is the a prefix to the search engine on the publisher's web sight. The output form the system 100 upon receiving an ExtractAll request from a publisher includes an enriched article. The enriched article can include, for example, hyperlinks in the text that, upon selection, take the user to additional related content related to the linked term. For example, the text of the mummy article in FIG. 14 can be submitted as the ArticleText parameter of the ExtractAll method. The supplied text can be "2,300-Year-Old Mummy Unveiled in Egypt By PAUL GARWOOD, Associated Press Writer SAQQARA, Egypt—Wednesday, May 4, 2005 A superbly preserved 2,300-year-old mummy bearing a golden mask and covered in brilliantly colored images of . . . ."

The text of the enriched article can be as follows:
2,300-Year-Old Mummy Unveiled in Egypt
By PAUL GARWOOD, Associated Press Writer
SAQQARA, Egypt—Wednesday, May 4, 2005
A superbly preserved 2,300-year-old mummy bearing a golden mask and covered in brilliantly colored images of . . . .

where the underlined terms represent hyperlinks to related content. For example, the hyperlink for the term mummy can be the SearchPrefix supplied by the publisher in the method parameters, along with the elements added by the system 100 to serve as search terms to help find related content. Other information can also be provided from the system 100 in response to the ExtractAll method, such as related elements (e.g., topics, industries, people, places, organizations, products) and query strings.

Another exemplary method call can be GetRelatedArticles (string URL). As described above, when the value of the URL is a particular article, then the system 100 returns related articles. In some examples, this method can be restricted to returning only related content from the publisher's web site. In such examples, there can be an additional method, such as Related WebContentToURL(string URL) that provides related content from content providers other than the publisher making the request. Such a method can also return, in addition to related articles, blogs, audio files, and video files.

Other exemplary method calls can be RelatedArticlesToSubject(string subject) and RelatedWebContentToSubject (string subject). In these methods, the subject corresponds to an element (e.g., topics, industries, people, places, organizations, products) and the system 100 returns articles or web content that are related to the subject. For example, as shown in FIG. 15, in section 164, one of the topics related to the mummy article is travel. If travel is selected by the user, then the publisher can use the RelatedArticlesToSubject(string subject) method to obtain related articles for the topic travel. The returned identifiers for the related articles are shown in section 162 of FIG. 16. The related articles all are related to traveling in Egypt. In this example, the subject is more complex than simply travel. The subject parameter is a combination of multiple entities to target related articles that are directly on point. In this example, the subject included the elements topic=travel and place=Egypt.

Advantageously, the publisher did not need to construct the complex subject. The complex subject is generated by the system 100 when the publisher uses another exemplary method SubjectsForURL(string URL, string prefix, string suffix). In this request, the publisher places the URL of the article in the parameters and the system 100 determines the subject for that article identified with the URL. Returning back to the example of FIG. 14 and FIG. 15, when the publisher requested subjects for the mummy article, the system 100 generated the subjects displayed in section 164. When the system 100 generated, for example, the hyperlink for the "travel" topic displayed, the system 100 included in the link the method RelatedArticlesToSubject(topic=travel and place=Egypt) so that upon selection, the publisher's web server would make a call to the system 100 using the included method to have returned very relevant and desired information.

Figure 21:
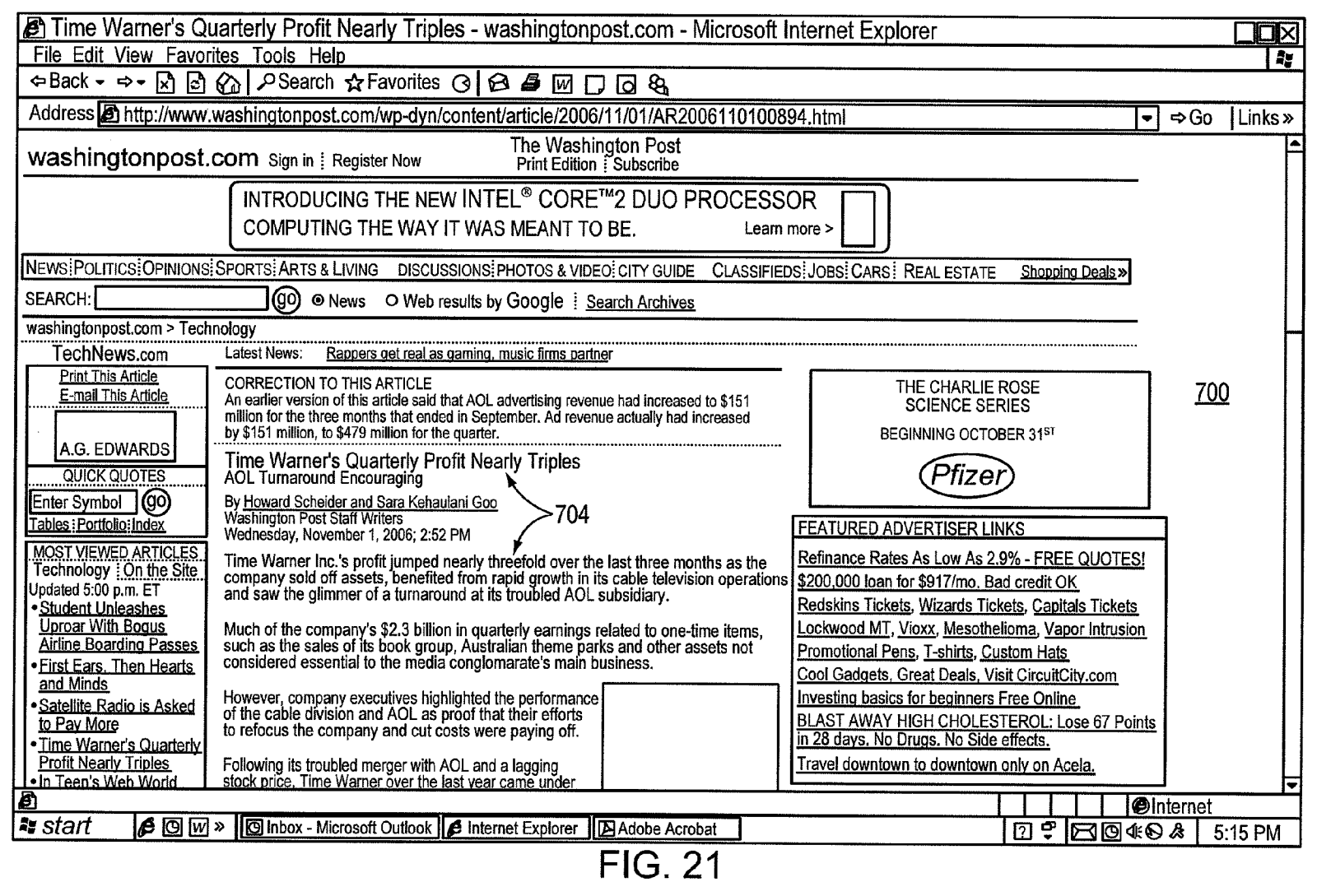
Figure 22:
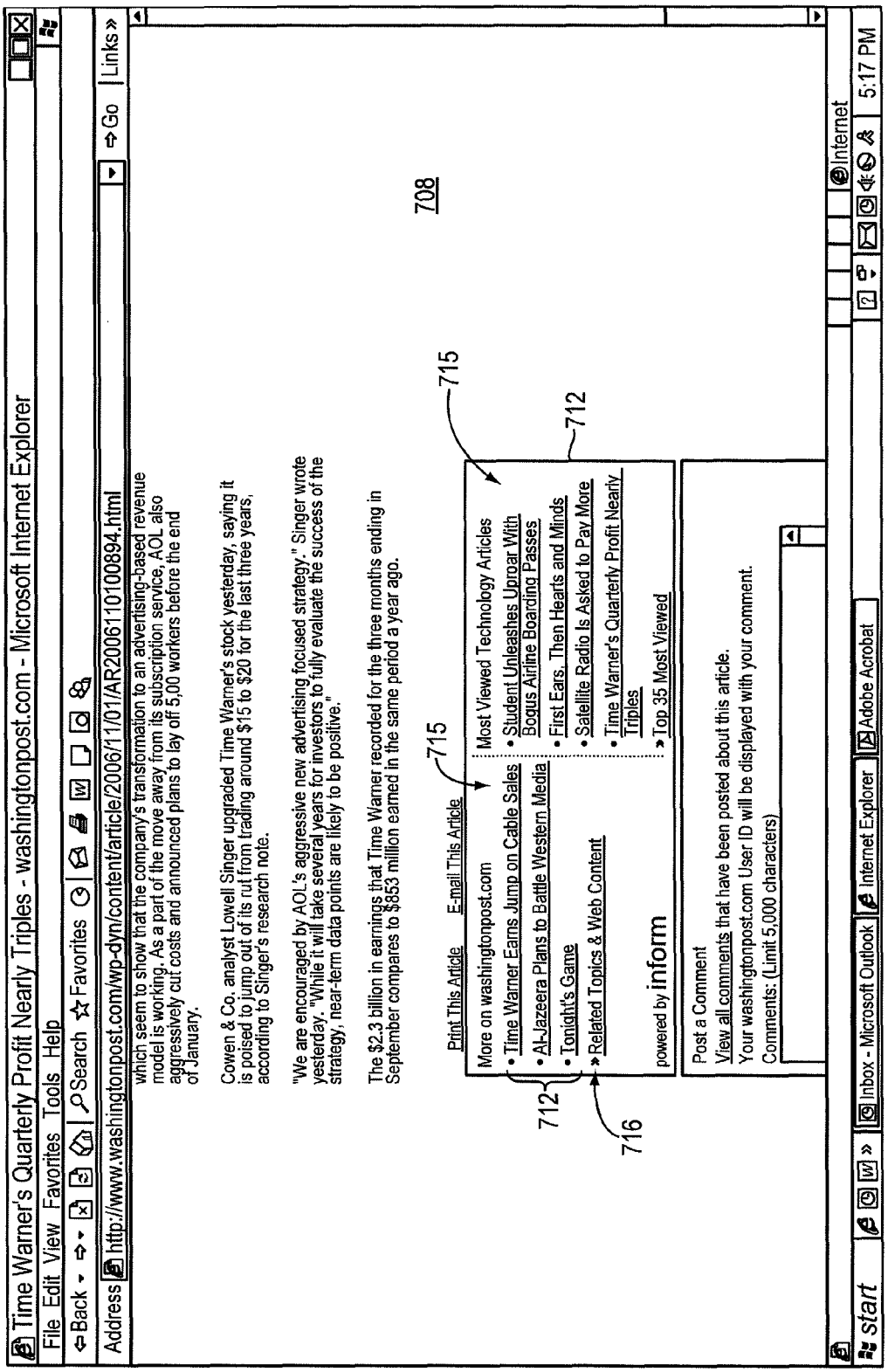

FIGS. 21-26 illustrate screenshots from publishers (content providers) illustrating different examples, in addition to the screenshots of FIGS. 14-16, of how the related content can be displayed to a user when that user requests an article. In FIG. 21, a screenshot 700 includes an article 704 selected by a user. The article is entitled "Time Warner's Quarterly Profit Nearly Triples." FIG. 22 illustrates screenshot 708, which is the bottom half of the selected article. At the bottom of the article is a related content box that includes several links to related content provided to the publisher for display with this article using the network services (e.g., exemplary method calls) described above. The right hand side 715 of the box 712 includes links to the most viewed technology articles. The technology topic was chosen because the system 100 determined, when preprocessing the content of the article 704, that there was a strong association with the subject technology. The articles on the left had side 718 of the box 712 include links to content from the publisher. The first three links 712 are articles. The bottom link 716 is a link to related topics and Web content.

When the user selects link 716, an exemplary screenshot 725 of FIG. 23 is generated by the publisher, using data obtained from the system 100 using the network services (e.g., exemplary method calls) described above. The screenshot 725 includes the title of the selected article, a small description of the article and its authors in area 730. Similar to the knowledge discovery display 160, the screenshot 725 includes a related topics area 734, a related entities area 738, a related articles on the Web area 742, a related blogs area 746, a related video area 750, and a related audio area 754. The related topics area 734 and the related entities area 738 include topics and entities, respectively, that are related to the selected article. A selection of any of these will cause a search on the publishers Web site, where publisher articles are returned that have been determined to be related to the selected topic or entity. The related articles on the Web area 742, the related blogs area 746, the related video area 750, and the related audio area 754 include links to related content that is available on other sites. As the names indicate, the related content can be articles, blogs, video (images), and/or audio. A selection of any of these will cause the browser to request the corresponding content from the provider's Web site of that content. What can also be included is an area for related articles from an affiliate (e.g., sister or subsidiary company) of the publisher. Such content helps strength the page views of the publisher and its related companies.

Figure 24:
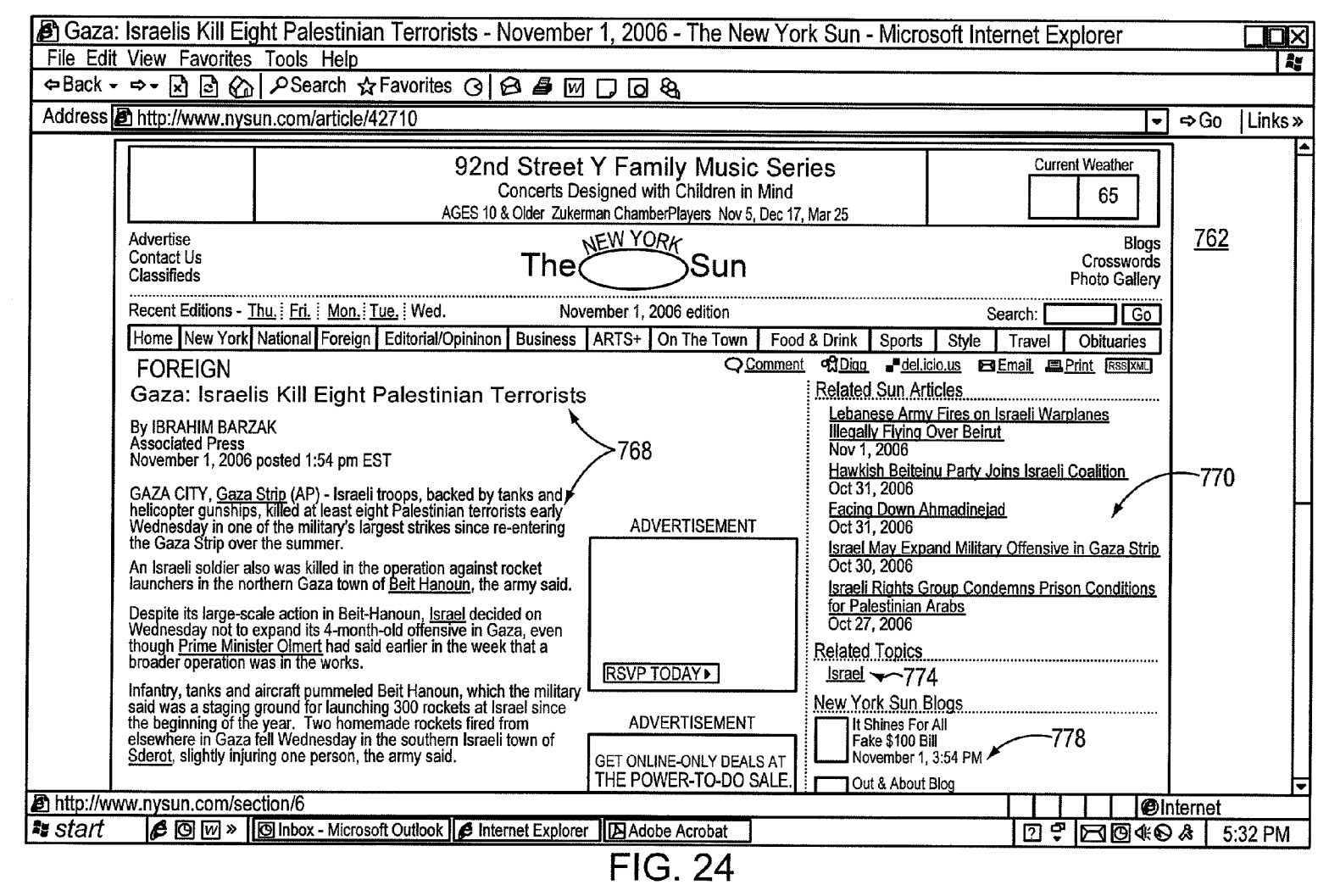

FIG. 24 illustrates a screenshot 762 displayed from the Web site of another publisher that also uses the network services described above. The screenshot 762 includes an article 768 selected by a user. The article is entitled "Gaza: Israelis Kill Eight Palestinian Terrorists." For this publisher, the results from the service of the related articles that are from the publisher's Web site are included in a related Sun articles area 770 to the right of the selected article. Also included are a related topics area 774 and a New York Sun blogs area 778.

Figure 25:
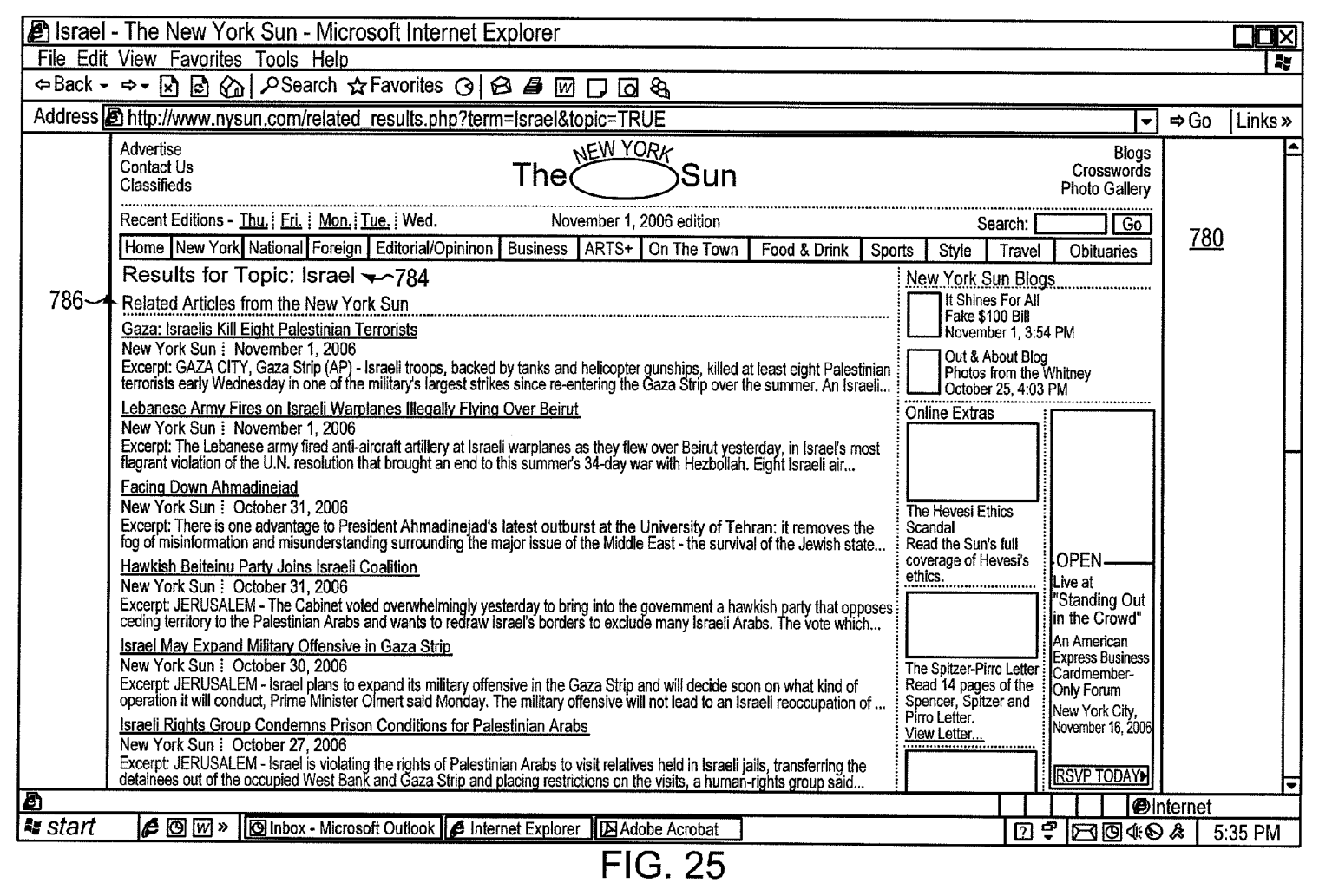
Figure 26:
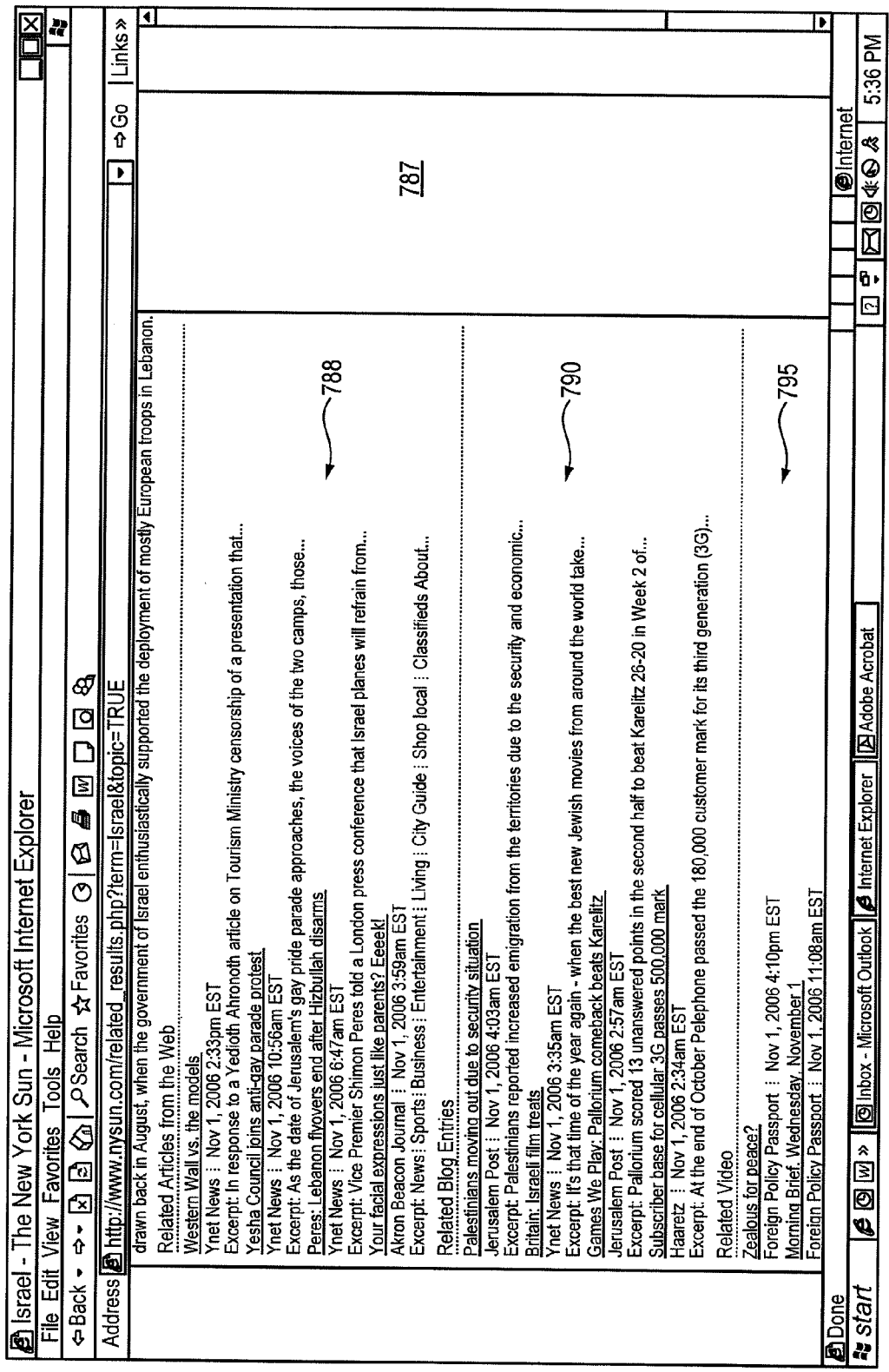

FIG. 25 illustrates a screenshot 780 that is generated for the user when the user selects the "Israel" topic link in the related topics area 774. At a summary area 784 at the top of the page, what is being displayed is summarized. In this example, the summary indicates that what follows is related content results from the system 100 related to the topic Israel. The first area 786 includes related articles from the publisher. The related articles links include a title, a content provider identification, which in this case is the publisher, a date of the content, and an excerpt so that the user can view a little about the content of the article to help the user in deciding whether to select that piece of content. FIG. 26 illustrates a screenshot 787, which is the bottom half of the screenshot 780. The screenshot 787 includes a related articles from the Web area 788, a related blog entries area 790 and a related video area 795. The areas identifying textual content (e.g., 788 and 790) include links that include a title, a content provider identification, a date of the content, and an excerpt so that the user can view a little about the content of the article. The related video area 795 includes links that include a title, a content provider identification, and a date of the content. Advantageously, the publisher can obtain this information by simply using the network services provided by the system 100. The publisher does not need to obtain this information nor process its own content to determine its context. The system 100 performs all of those processes. The publisher simply uses the defined methods to obtain all the related content (or links thereto).

To provide responses to the methods described above from the publishers in real time with little or no delay, the system 100 advantageously preprocesses content into what can be referred to conceptually as buckets. These buckets are defined to minimize the search space and optimize the results that are returned (e.g., return highly related content quickly). As described above, these buckets can be defined using categories, for example, industries, topics, and/or entities, where entities can refer to people, places, organizations, and products. Preferably, a taxonomy is defined using some number of buckets that is large enough to allow content to be separated with a granularity that enables highly related content to be put in the same buckets, but small enough so that the search space is small and quickly searchable and all buckets become associated with some content. In some examples, this number can be about 1000-1500 buckets.

Figure 27:
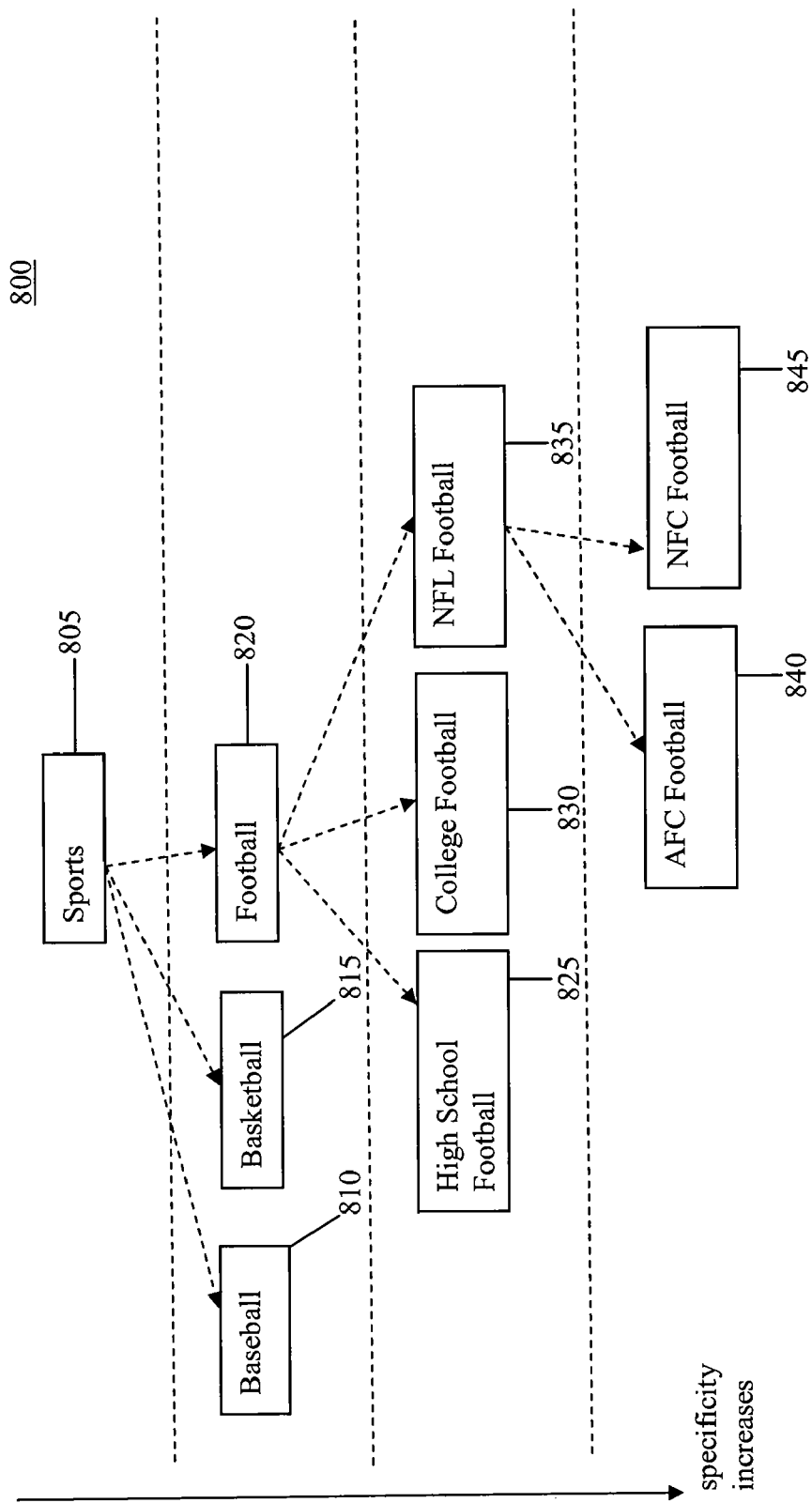
FIG. 27 is a block diagram showing the different specificity levels of some topics in a portion of a defined taxonomy.

FIG. 27 illustrates a portion 800 of a taxonomy that can be defined for a service provider. The levels represent the levels of specificity of each of the buckets. For example, a sports bucket 805 is very general and shown on the top level. The next level is more specific than the sports bucket 805 and includes a baseball bucket 810, a basketball bucket 815, and a football bucket 820. The next level includes a high school football bucket 825, a college football bucket 830, and a NFL football bucket 835. These buckets 825, 830 and 835 are more specific than the football bucket 820. On the next level, there are an AFC football bucket 840 and a NFC football bucket 845. These buckets are even more specific than the NFL football bucket 835.

Typically, a service provider servicing multiple content providers uses a single taxonomy for all its content providers, although multiple taxonomies can be used. The taxonomy is defined by an administrator who defines buckets based on the various factors. For example, as described with respect to step S410 above, the processes used for extracting and scoring elements can influence the taxonomy, where the numerous topics and industries may be predefined based on a set of rules listed in a rule database (e.g., 129). The type of clients that the service provider is servicing can also influence the taxonomy. For example, if servicing a sports content provider, the topic/industry "football" can be more specifically defined as the topics/industries "high school football", "college football", and "NFL football" because there is so much football related content that can be better separated at the topic/industry level. Historical usage may also influence the taxonomy.

In some examples, the buckets are defined using topic and industry elements, and depending on the specificity of the defined topic or industry, entities can be used to further define the semantic content for enabling the finding of highly related content. Tables 1 and 2 provide an illustrative example. Table 1 shows a portion of a taxonomy that is defined for a service provider.

TABLE 1

| CategoryID | Topic/Industry Element Name | Entities Required? |
|---|---|---|
| 229 | Bird Flu | N |
| . | | |
| . | | |
| . | | |
| 250 | State Budgets | Y |
| . | | |
| . | | |
| . | | |
| 450 | Politics | Y |

When a new bucket is defined (e.g., entered into a database by an administrator), the bucket definition includes at least three pieces of information. The first is an identifier. In Table 1, the bucket is assigned a Category ID which is numerical, making searching and processing very quick. A different category ID is assigned to each topic and industry defined in the taxonomy. For example, each bucket 805, 810, 815, 820, 825, 830, 835, 840, and 845 of the portion 800 of the taxonomy receives its own CategoryID. The second piece of information is the name of the bucket. In Table 1, this is the name of the topic or industry. For example, bucket 805 of the portion 800 is assigned the name sports. The third piece of information is whether entities are required for that bucket. In Table 1, a letter Y is used if entities are needed and a letter N is used if entities are not needed. Typically entities are not needed when the topic or industry is so specific that any articles falling in that bucket are going to be highly related. In Table 1, the topic Bird Flu is so specific that entities are not needed to further differentiate the content. Another example might be a topic named serial killers, which is also very specific. On the other hand, all of the buckets illustrated in FIG. 27 are still general enough and would be associated with enough content that entities would be required to further relate articles. For example, the content in the most specific AFC bucket 840 can be further related based on teams, locations, players, coaches, etc.

TABLE 2

| ArticleID | CategoryID | Entity Element Name |
|---|---|---|
| 1 | 229 | |
| 2 | 250 | (NY) |
| 2 | 250 | (NJ) |
| 2 | 250 | (CA) |
| 3 | 250 | (NY) |
| 3 | 250 | (NJ) |
| 3 | 250 | (CT) |
| 4 | 229 | |

Table 2 shows 4 articles that have been processed and stored in a repository for quick retrieval when related articles need to be found. In Table 2, articles 1 and 4 have been associated with ArticleIDs 1 and 4, respectively, and with CategoryID 229, which according to Table 1 is the topic/industry bird flu. Articles 2 and 3 have been associated with ArticleIDs 2 and 3, respectively, and with CategoryID 250, which according to Table 1 is the topic/industry State Budgets. Article 2 is also associated with the three entities NY, NJ, and CA. Article 3 is associated with the three entities NY, NJ, and CT. Table 2 shows the entities as the two-letter abbreviations for each state. However, as described above in association with FIG. 8, a CanonicalID can be used to represent an entity that might be identified in several different ways in an article. For example, the state of Connecticut might appear in an article as Connecticut, CT, the nutmeg state, the constitution state, etc. The use of the CanonicalID disambiguates any of these identifiers for the state of Connecticut and associates them all with the same entity.

With the content stored in Table 2, the system 100 can easily respond to a request over the network. For example, the method GetRelatedArticles(string <<URL for article 2>>) is received by the system 100. A query of Table 2 returns the result that article 2 is associated with CategoryID 250. The system 100 queries Table 2 to retrieve all of the articles associated with CategoryID 250. In this example, article 3 is returned. If there were a large number of articles, then further processing of the results can narrow that list. For example, the entities of article 2 can be retrieved and then matching can be performed to determine the most highly related articles to article 2. For example if 100 articles were associated with CategoryID 250, then the system 100 can find any articles that have the same three entity matches, and/or 2 of the 3 entity matches, etc. until the list was reduced the number needed to return data for the received method call. The values of the scores can also be used to filter. Although each of the queries is described individually, any and all of the queries can be combined. The associations in Table 2, performed before the method call is received, advantageously allow a small search space, which enable a response to the method very quickly and without using much computational resources.

The associations in Table 2 are made based on the scoring of elements. As described above in association with FIG. 5, the system 100 identifies topics and/or industries elements and the entity elements associated with a particular content and scores them (e.g., the group of steps in box 404 and step S422). The scoring of the topic/industry elements can include, for example, both a relevancy score and a specificity score. As described above, the relevancy score is higher if the content is particularly relevant to that industry or topic element. The specificity score is higher when a topic or industry is more specific. For example, in relation to FIG. 27, the more specific level a bucket is on, the higher its specificity score. The football bucket 820 would have a higher specificity score than the sports bucket 805 and the college football bucket 830 would have a higher specificity score than the football bucket 820. In some examples, the relevancy score is multiplied by the specificity score to arrive at the total score for the topic/industry element.

To determine the bucket with which each article is associated, a certain number of the top scores of elements are used. In Table 2, the top scoring topic/industry was used to associate an article with a particular bucket, and the three top scoring entities were used to further distinguish the article in a bucket, when entities were required for that bucket. Other examples use other numbers of top scores. For example, an article may be associated with two buckets. This advantageously provides more articles in each of the different buckets. In such examples, the buckets can be designated as primary and secondary. For example, article 2 can also be associated with the politics topic, CategoryID 450, as a secondary bucket. This adds more possible articles in the politics bucket. More or less entities can be saved as cost of computing resources become less or more expensive. In some examples, Table 2 is included in the element score database.

In the examples above, the content described is focused on articles. Of course other content is also applicable, such as blogs, video clips, audio clips, and the like. Further, such a described system and techniques can be used where the content is targeted advertising. In other examples, any of this alternative content can be added to or substituted for the terms articles and content.

Figure 28:
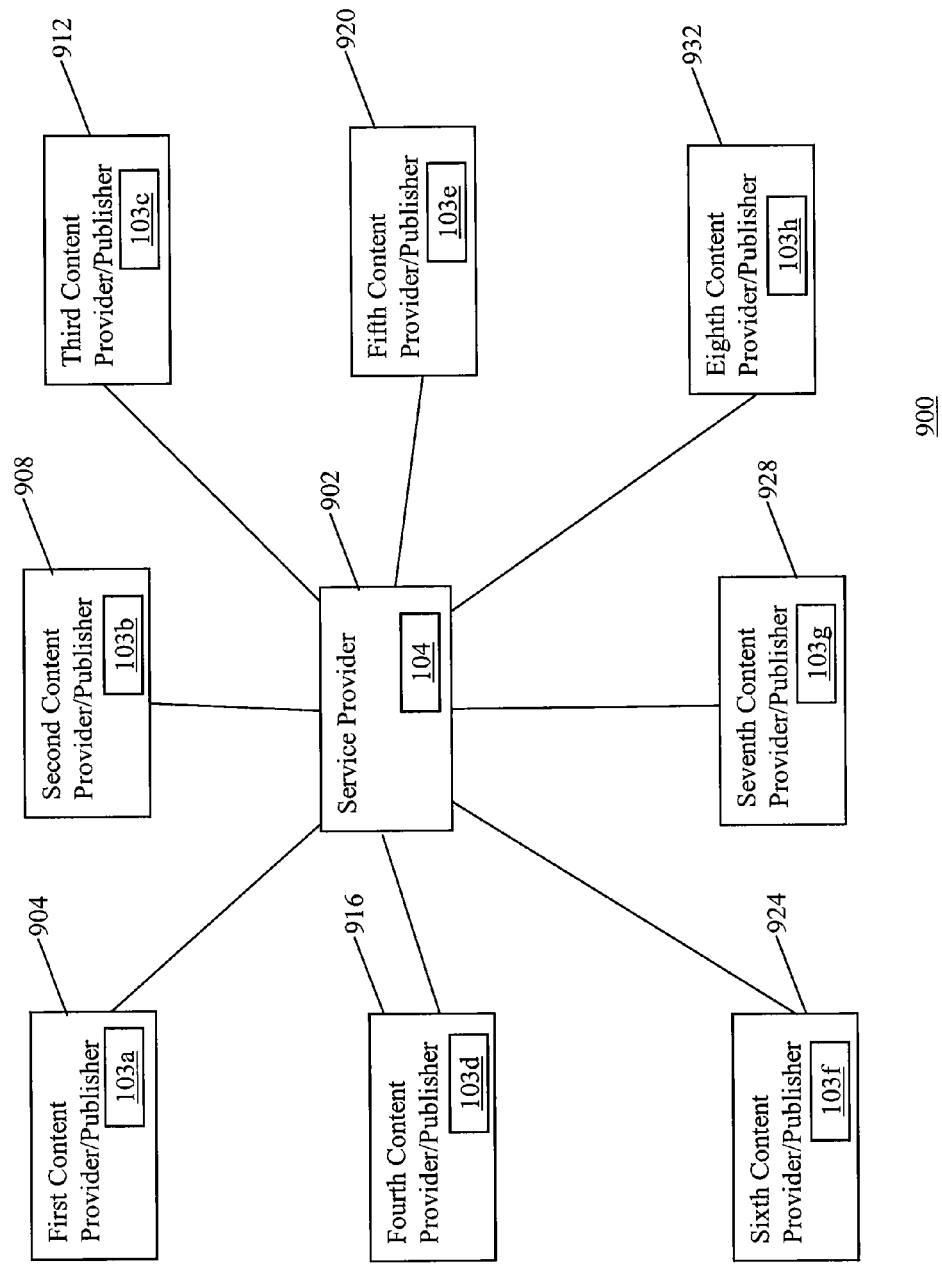
FIG. 28 is a block diagram of a system for retrieving and displaying information relating to an electronic document available from an informational network.

FIG. 28 illustrates a different view 900 of a portion of the system shown in FIG. 1. The exemplary view 900 includes a service provider 902, which includes the server computer 104. The view 900 also includes eight content providers 904-932, which include content sources 103*a*-103*h*, respectively. As described above, the service provider 902 provides network services, such as returning related articles in response to a request (e.g., a GetRelatedArticles(string URL)method call), to all of the content providers 904-932. In this example, the service provider 902 becomes responsible for determining a portion of what is going to be displayed on a Web page based on the article displayed by the content provider. Stated in other words, the service provider 104 has access to each page view of each to the content providers 904-932 that the service provider 902 services. This aggregation provides the service provider with much larger page view count than any single content provider has. The enables the service provider 902 to have greater leverage negotiating with advertisers than any single content provider might have.

Further, in addition to a larger page view count, the service provider 902 also understands the context of the displayed article and the related content links, thus the advertising can quite easily be context focused. As explained above, the determination of context, through the use of a taxonomy of over 1000 topics and industries enables the advertising to be well focused and more precise than a content provider might enable, typically having the context related to a few of its high level indices on its page, such as US, world, sports, entertainment, weather, travel, science, and health. For example, the service provider 902 may have access to 700,000,000 aggregated page views. Further, the service provider 902 knows that 100,000,000 are related to cars and half of those are related to American cars. The service provider 902 can approach an American car manufacture and negotiate advertising placement using this data. Typically companies will pay more for advertising on a contextual basis. Similarly, the service provider can approach a beer distributor and have the power to say that for these eight content providers, we can put your ad on every page related to football.

If the service provider 902 is able to monetize the use of space on a Web page for advertising, the service provider 902 can provide the services described above (e.g., the method calls) in exchange for advertising space on the Web page. Such a scenario advantageously allows the content provider to receive these valuable services of identifying related content and providing a rich user experience without having to pay for such services, and the service provider 902 obtains a larger page view count for its network, which increases leverage and monetization rates. It is a scenario which is beneficial to both parties.

Figure 29:
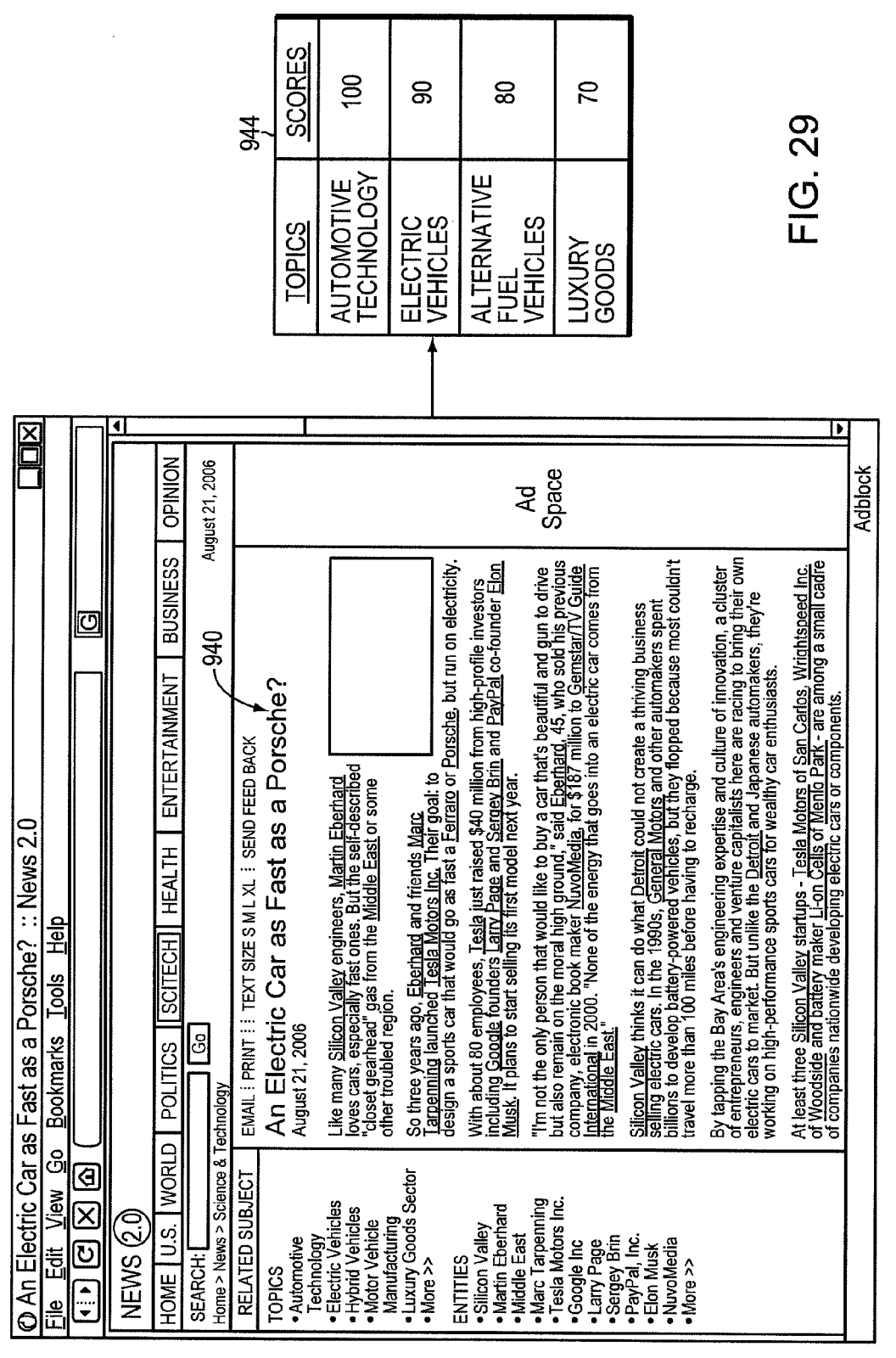
Figure 30:
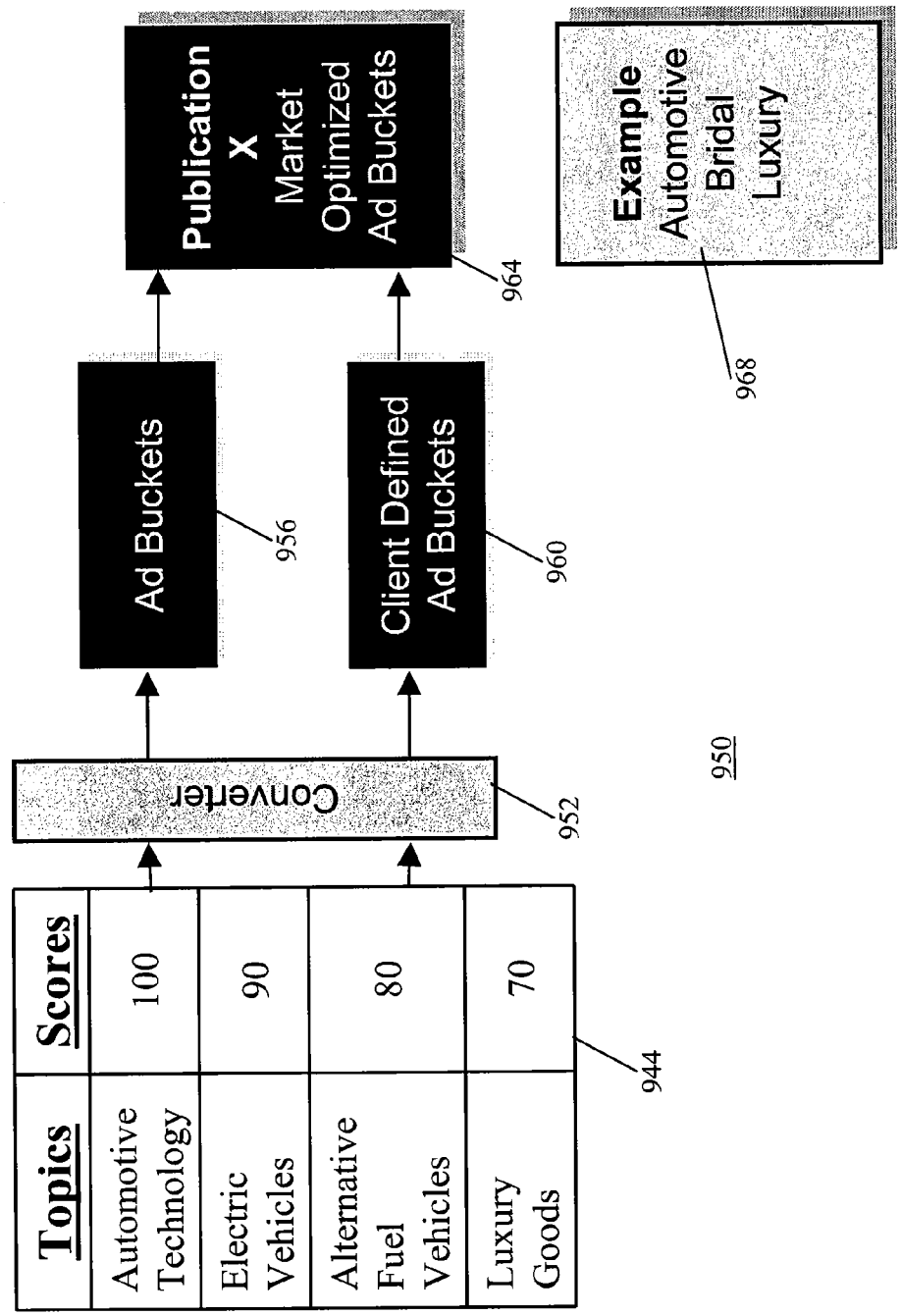
Figure 31:
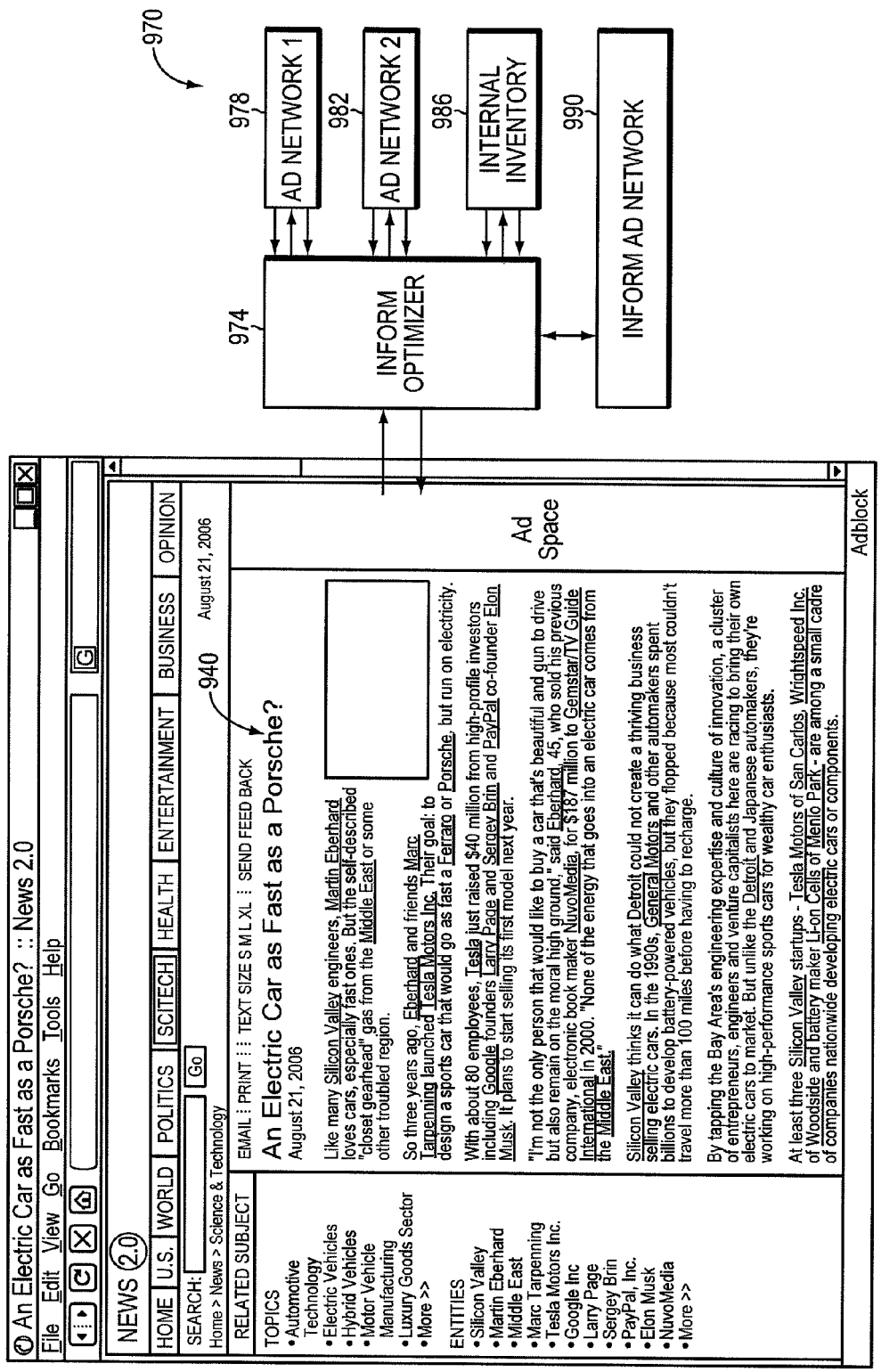

FIGS. 29-31 illustrate several examples of how advertising can be accomplished with the system 100. FIG. 29 illustrates an article 940 that is generated by a content provider (e.g., 904). The article 940 is entitled "An Electric Car as Fast as a Porsche?". The service provider process the article as described above (e.g., process 400 of FIG. 5) and the 4 highest scoring topics are shown in a table 944. In some examples, using the table 944, the service provider 902 can help the content provider (e.g., 904), or the content provider's advertising partner, determine what advertisements should be placed in an ad space area 948. For example, the content provider, without the benefit of the services from the service provider 902, might categorize this article under its technology section of its Web site. Therefore, the content provider indicates to its advertising partner that this article is a "technology" article and so the ad space 948 should be populated according to a technology basis. This is very general.

The service provider 902 can use the table 944 to indicate to the content provider, or directly to its advertising partner, more specifically what the article is about. FIG. 30 illustrates a process 950 of providing a content provider, or its advertising partner, a narrowed, more focused result. A converter 952 maps the table 944 to a taxonomy of predefined ad buckets 956 and/or specific ad buckets 960 defined by the client (e.g., the content provider). The content provider, or its advertising partner, uses the ad buckets (e.g., ad related topics) to choose advertising to be displayed in the ad space (e.g., 948). Box 968 shows an example where the table 944, through process 950 is mapped to the ad buckets of automotive, bridal and luxury. These ad buckets are more narrowed than the "technology" bucket that would be used without the process 950. The process of determining content and its corresponding "buckets" can be as described above for identifying related content for articles.

In other examples, using the table 944, the service provider 902 can determine and place advertisements in ad space area 948 as part of its provided services (e.g., in addition to the method calls described above). The revenues the service provider 902 receives can be the compensation for the services it provides to the content provider, and depending on revenues, the service provider 902 can share some portion of the advertising revenues with the content provider. Such a scenario makes it even more beneficial for the content provider to use the services of the service provider (related content and advertising), which in turn gives the service provider 902 more page views, which translates to higher negotiating leverage and maximizing monetization of the advertising.

FIG. 31 illustrates an exemplary system 970 that optimizes ad placement to maximize the revenue stream for advertising. The system 970 includes an optimizer module 974 that is in communication with a first ad network 978, a second ad network 982, and internal inventory module 986, and third ad network 990, which is administered by the service provider 902. As described above, the optimizer module 974 determines the context of the article 940 (e.g., the results in table 944). Based on that, the optimizer module 974 queries the ad networks 978, 982, 990 and the internal inventory 986 on price points of ads in each of the determined ad buckets to determine which ad placements will generate the maximum revenue for this particular article 940.

As described above, the system 100 and its associated advertising solutions enable a more focused targeting by context and better behavior recognition. Because the service provider 902 has visibility across content provider Web sites, the service provider 902 can track the user's behavior across those Web sites, something a content provider can't do itself. The optimizer module 974 can also track cookies for behavioral targeting.

As another illustrative example of provided network services, an implementer of the system 100 can maintain as part of its repository a database of content from a content provider, e.g., XYZNewspaper.com, the website for the print newspaper XYZ. The content, e.g., articles, audio and/or video segments, is typically provided by the content provider as a data feed. Additionally or alternatively, the system 100 utilizes a "web crawler" to follow hyperlinks on the content provider's website, downloading each file that is linked to as each link is traversed. After content is downloaded or received and stored in the database, software on the system 100 is executed that parses the content into elements (e.g., topics, industries, and/or entities). For example, an article from XYZNewspaper.com that is stored in the database has content related to "Bush," Iraq," and "Cheney." The software on the system 100 associates the article with an appropriate bucket, for example, the topic to politics and the entities in the article to the people George W. Bush and Dick Cheney and the place Iraq. The software on the system 100 then assigns a score to the association between the topic and entities and the article, e.g., if the article focused on an anti-terror summit that Vice President Dick Cheney oversaw, and mentions that President Bush did not attend because he was attending to matters involving Iraq, the score assigned to the association of the article and Vice President Cheney would be high, whereas the score associated with the article and President Bush (or Iraq) would be low. The score for each association is stored in the database.

Then, as part of a data collection routine, e.g., crawling the XYZNewspaper.com website, the system 100 requests articles not previously stored in the database (the system determines which articles are not previously stored using methods described herein with respect to determining if articles are identical or are generally the same article). When an article is retrieved that was not previously in the database, the software determines an appropriate bucket.

When a user requests the article about the foiled terrorist plot from XYZNewspaper.com, a request is sent from the XYZNewspaper.com website to the system 100 for information associated with the requested article. Because the requested article has a high association with politics and Vice President Cheney, the system 100 provides the XYZNewspaper.com website with identifiers, e.g., hyperlinks, associated with the first article stored in the database, i.e., the article related to the summit, because that article has a high association with politics and Vice President Cheney. Additionally, articles in the politics bucket with a high association with George W. Bush are also returned. In some embodiments, XYZNewspaper.com caches the returned results for some short period of time, e.g., thirty minutes. Caching the results for the related content (e.g., the returned identifiers) allows XYZNewspaper.com to service requests for its content without having to send the corresponding requests for related content to the system 100 each time a user requests an article. Then, once the period of time has expired and the content provider makes another request, via the web service, for related content for a particular article, the associations between elements and new content are provided to the primary content provider.

Caching related content at the content provider, e.g., temporarily storing the scores of associations between elements and articles, is beneficial in that the content provider is not requesting related content from the system 100 every time a user requests a particular article or piece of content. Rather, once the related content for that article is provided by the system 100 to the content provider, the content provider does not request related content for that article for a period of time, instead relying for that period of time on the results provided by the system 100 from the original request. This enables the primary content provider to serve web pages with cached related identifiers, thereby speeding up the process of serving web pages to primary content providers' users. In some embodiments, the system 100 is repeatedly adding content to the system and updating the scores of associations between elements and articles, regardless of caching by the primary content provider. In these embodiments an assigned relevancy between an article and an element may change several times between requests for related content from the primary content provider.

In some versions, however, when the article about the foiled terrorist plot is requested by the user, rather than a related article, the related entity "Dick Cheney" is returned. If the user then requests "Dick Cheney" (e.g., selects the hyperlink), a listing of articles related to Dick Cheney are returned. The listing would include the article related to the summit and the article related to the CIA where Vice President Cheney is quoted because both articles have high associations with Vice President Cheney.

To prevent stagnant links from being provided, in some embodiments, only articles that have been published within a certain time period (e.g., the last four days) are provided as related links. Additionally or alternatively, the identifiers returned are displayed as a search results page, where a listing of people, places, organizations, industries, and/or products associated with the entity or article are presented to the user. Further, in some embodiments where links associated with third-party content providers' content are stored in the database, the links to the third-party content providers is additionally presented to the user. The third-party content may be presented alongside content from the primary content provider, e.g., the XYZNewspaper.com, or the content may be segregated into an area of the results page under a heading "Related Articles from the Web." In either scenario, the system 100 beneficially provides related articles and entities to users based on content the user requested.

The equipment for performing the processing described herein can be distributed in any fashion. For example, all or part of the system 100 can be installed on premises administered by the publisher receiving services from the service provider.

While the foregoing invention has been described in some detail for purposes of clarity and understanding, it will be appreciated by one skilled in the art from a reading of the disclosure that various changes in form and detail can be made without departing from the true scope of the invention in the appended claims.

What is claimed is:

1. A method of determining advertising placement based on preprocessed content comprising:
retrieving a first content available over a network;
identifying one or more first-type elements associated with the first content using a rule-based algorithm that selects the one or more first-type elements from a plurality of predefined elements associated with a topic, industry, or any combination thereof;

assigning a relevancy score to the one or more first-type elements based on relevancy of the one or more first-type elements to the first content; and providing a narrower scope of an ad related topic based on the relevancy scores of the one or more first-type elements, wherein the plurality of predefined elements comprise a plurality of levels of specificity, and the assignment of the relevancy score includes multiplying the relevancy score for the first-type element by a level of specificity for the one or more first-types of elements.

2. The method of claim 1 wherein the plurality of predefined elements are based on a predefined taxonomy.

3. The method of claim 1 wherein providing a narrower scope comprises mapping the one or more first-type elements to one or more ad related topics.

4. The method of claim 3 wherein the one or more ad related topics comprise one or more topics defined by a content provider.

5. The method of claim 1 further comprising providing ad placement related services to a plurality of content providers.

6. The method of claim 5 further comprising generating increased advertising revenues based on access to aggregated page views of the plurality of content providers.

7. The method of claim 6 wherein the plurality of content providers are unrelated organizations.

8. The method of claim 5 further comprising tracking user interests across the plurality of content providers.

9. The method of claim 8 wherein providing a narrower scope of an ad related topic comprises selecting an ad based on tracked user interests.

10. The method of claim 8 further comprising maintaining tracked user interests in a database.

11. The method of claim 8 wherein tracking comprises tracking user interests across the plurality of content providers using a cookie.

12. The method of claim 8 further comprising weighting a first user interest higher if an associated user selects such first user interest when presented with such user interest.

13. The method of claim 1 further comprising saving associations between the first content and the one or more first-type elements in a database table.

14. The method of claim 1 further comprising: identifying a top scored first-type element from the one or more first-type elements; and associating the first content with the top scored first-type element.

15. The method of claim 1 wherein the first content comprises an electronic document associated with the content provider's web site, a syndicated news feed, an electronic document associated with a third-party web site, an electronic document associated with a weblog, or any combination thereof.

16. A system for determining advertising placement based on preprocessed content comprising one or more computing devices configured to:

retrieve a first content available over a network;

identify one or more first-type elements associated with the first content using a rule-based algorithm that selects the one or more first-type elements from a plurality of predefined elements associated with a topic, industry, or any combination thereof;

assign a relevancy score to the one or more first-type elements based on relevancy of the one or more first-type elements to the first content; and provide a narrower scope of an ad related topic based on the relevancy scores of the one or more first-type elements, wherein the plurality of predefined elements comprise a plurality of levels of specificity, and the assignment of the relevancy score includes multiplying the relevancy score for the first-type element by a level of specificity for the one or more first-types of elements.

17. A computer program product, tangibly embodied in a non-transitory data storage medium, the computer program product including instructions being operable to cause a data processing apparatus to:

retrieve a first content available over a network;

identify one or more first-type elements associated with the first content using a rule-based algorithm that selects the one or more first-type elements from a plurality of predefined elements associated with a topic, industry, or any combination thereof;

assign a relevancy score to the one or more first-type elements based on relevancy of the one or more first-type elements to the first content; and provide a narrower scope of an ad related topic based on the relevancy scores of the one or more first-type elements, wherein the plurality of predefined elements comprise a plurality of levels of specificity, and the assignment of the relevancy score includes multiplying the relevancy score for the first-type element by a level of specificity for the one or more first-types of elements.

* * * * *